(12) United States Patent
Matsumoto

(10) Patent No.: US 8,843,432 B2
(45) Date of Patent: Sep. 23, 2014

(54) DATA ANALYZING COMPUTER PRODUCT, DATA ANALYZING METHOD, AND DATA ANALYZING APPARATUS

(75) Inventor: Kazuhiro Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 13/350,881

(22) Filed: Jan. 16, 2012

(65) Prior Publication Data

US 2012/0239599 A1  Sep. 20, 2012

(30) Foreign Application Priority Data

Mar. 17, 2011  (JP) .................................. 2011-059561

(51) Int. Cl.
*G06N 99/00* (2010.01)

(52) U.S. Cl.
CPC ..................................... *G06N 99/005* (2013.01)
USPC .......................................................... 706/52

(58) Field of Classification Search
USPC ............................................................ 706/12
See application file for complete search history.

(56) References Cited

U.S. PATENT DOCUMENTS

| | | | |
|---|---|---|---|
| 2004/0088240 A1 | 5/2004 | Komaki et al. | |
| 2008/0120263 A1* | 5/2008 | Maeda | 706/46 |
| 2010/0241598 A1* | 9/2010 | Yuta | 706/12 |

FOREIGN PATENT DOCUMENTS

| | | |
|---|---|---|
| JP | 2004-152205 A | 5/2004 |
| JP | 2004-234302 A | 8/2004 |
| JP | 2004-280712 A | 10/2004 |
| JP | 2007-293889 A | 11/2007 |

OTHER PUBLICATIONS

Muramoto, Hideaki et al., "Resolution of Ambiguity of Meaning Category of Proper Name based on Wikipedia and Web Text", The Association for Natural Language Processing (NLP), Research Papers for 17th Annual Conference, Tutorial, Main Conference, Workshop, CD-ROM, Japan, NLP, Mar. 7, 2011, pp. 774-777, with Partial Translation.
Japanese Office Action mailed Jun. 17, 2014 for corresponding Japan Patent Application 2011-059561, with Partial English Translation, 6 pages.

* cited by examiner

*Primary Examiner* — Jeffrey A Gaffin
*Assistant Examiner* — Ola Olude Afolabi
(74) *Attorney, Agent, or Firm* — Fujitsu Patent Center

(57) ABSTRACT

A non-transitory computer-readable medium stores a program that causes a computer, which has a memory device storing a set of measured values that included a set of positive case measured values and a set of negative case measured values, to execute a process. The process includes extracting randomly, a positive case measured value group and a negative case measured value group from the set of measured values; generating based on the positive case measured value group and the negative case measured value group, a prediction equation that predicts the objective variable for a prediction algorithm; first calculating a first predicted value group; second calculating a second predicted value group; first identifying a first coincident-case count of predicted values; second identifying a second coincident-case count of predicted values; computing a weighted correct answer percentage; and outputting a computation result obtained at the computing.

16 Claims, 41 Drawing Sheets

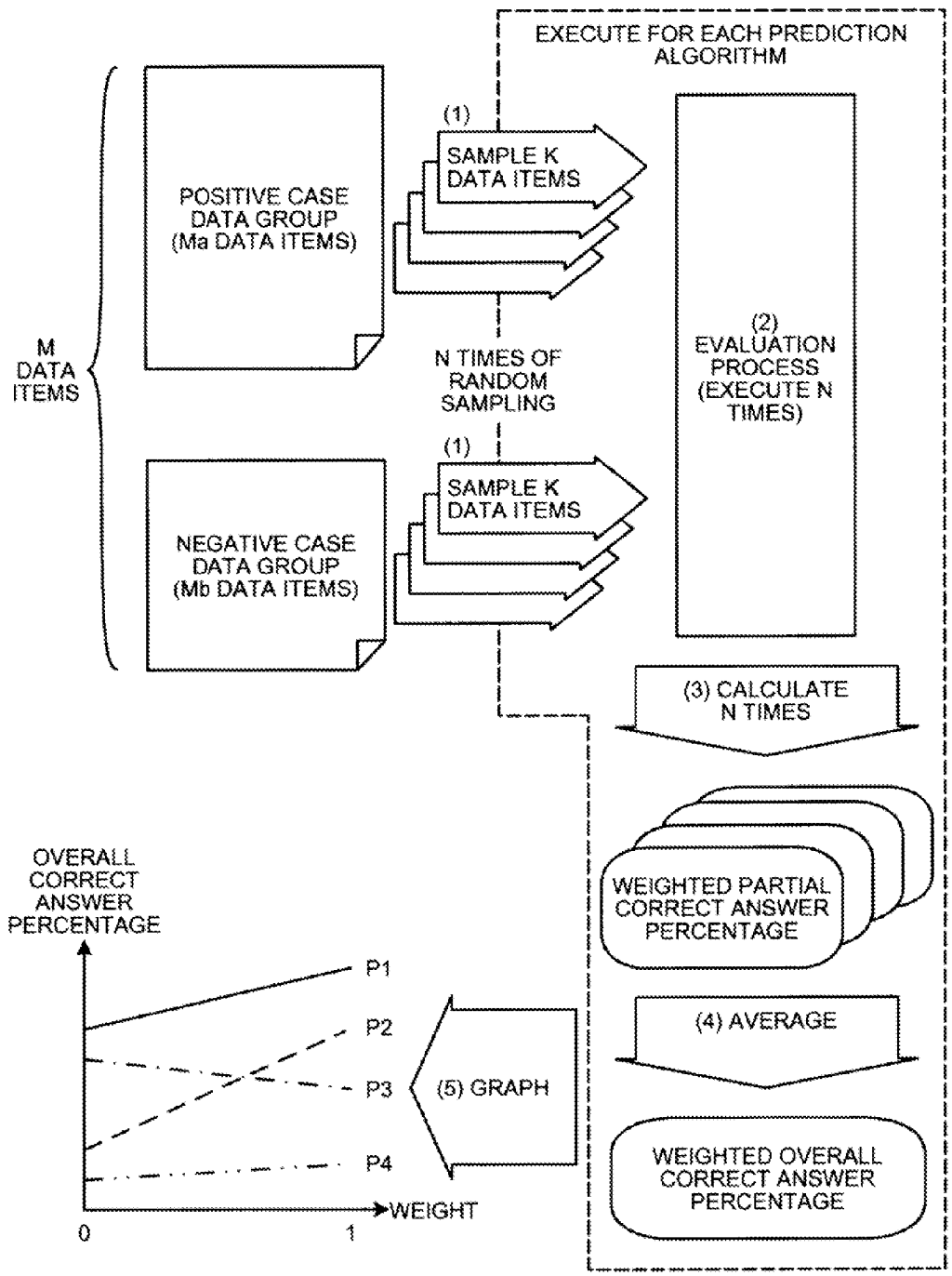

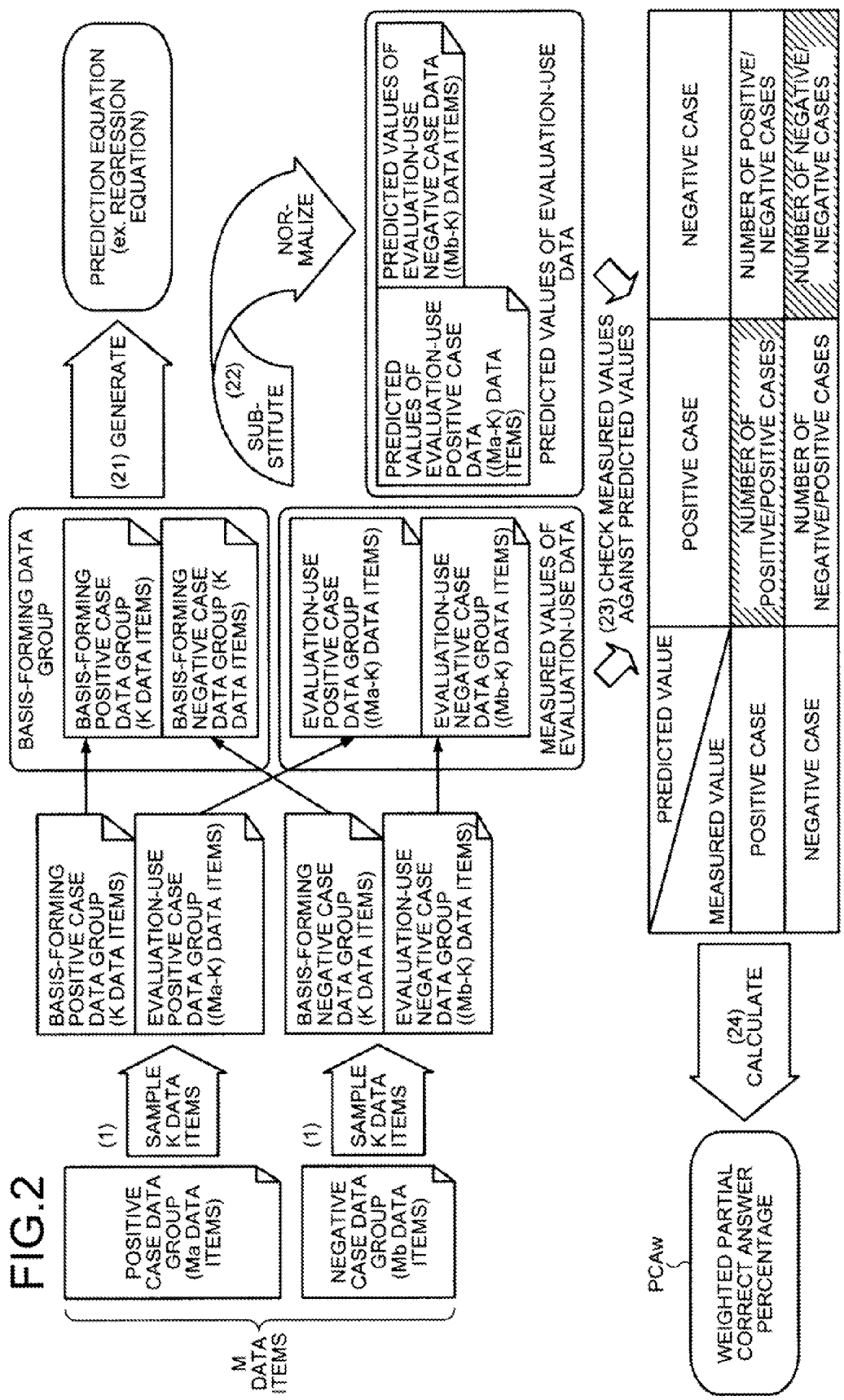

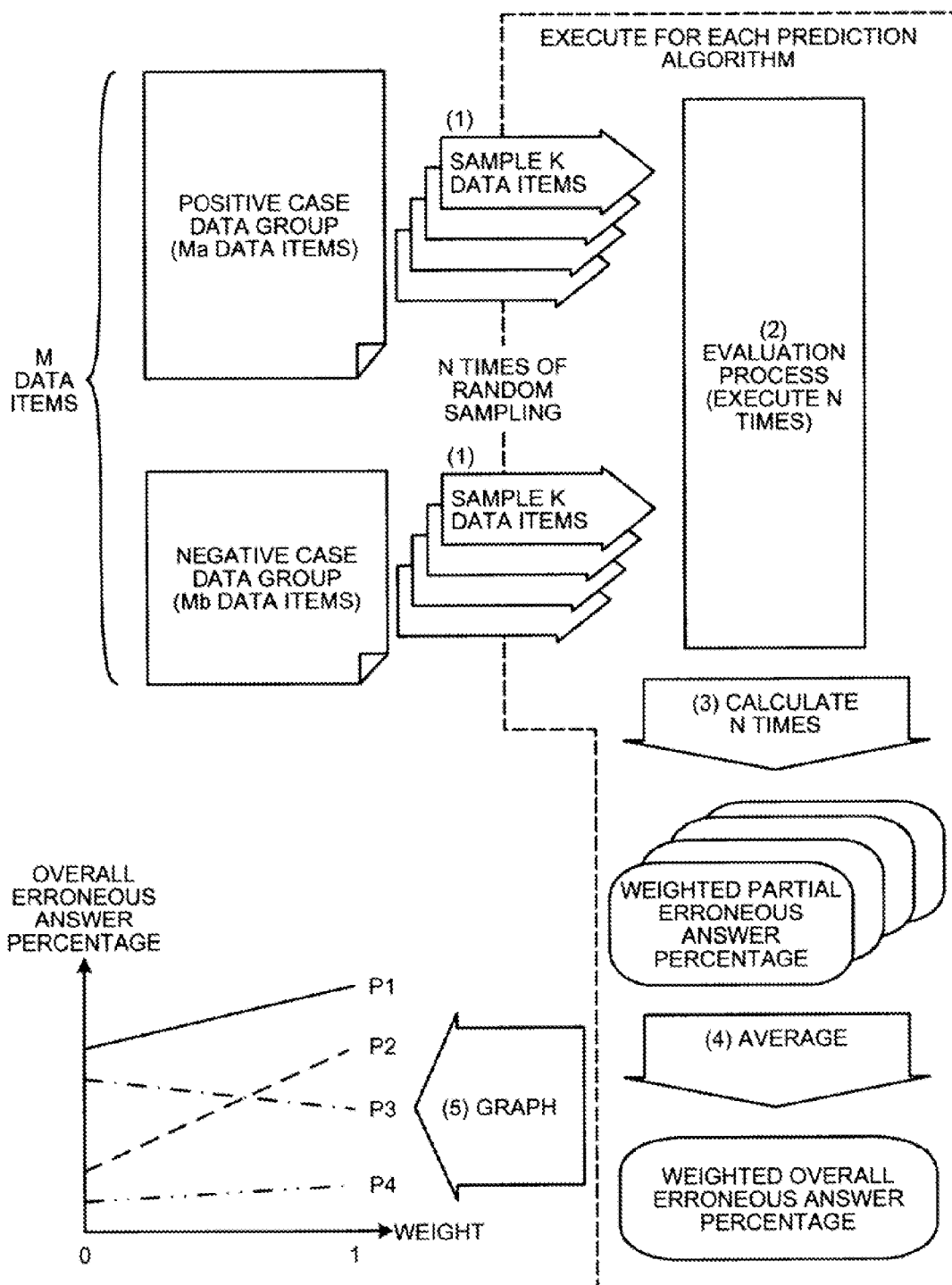

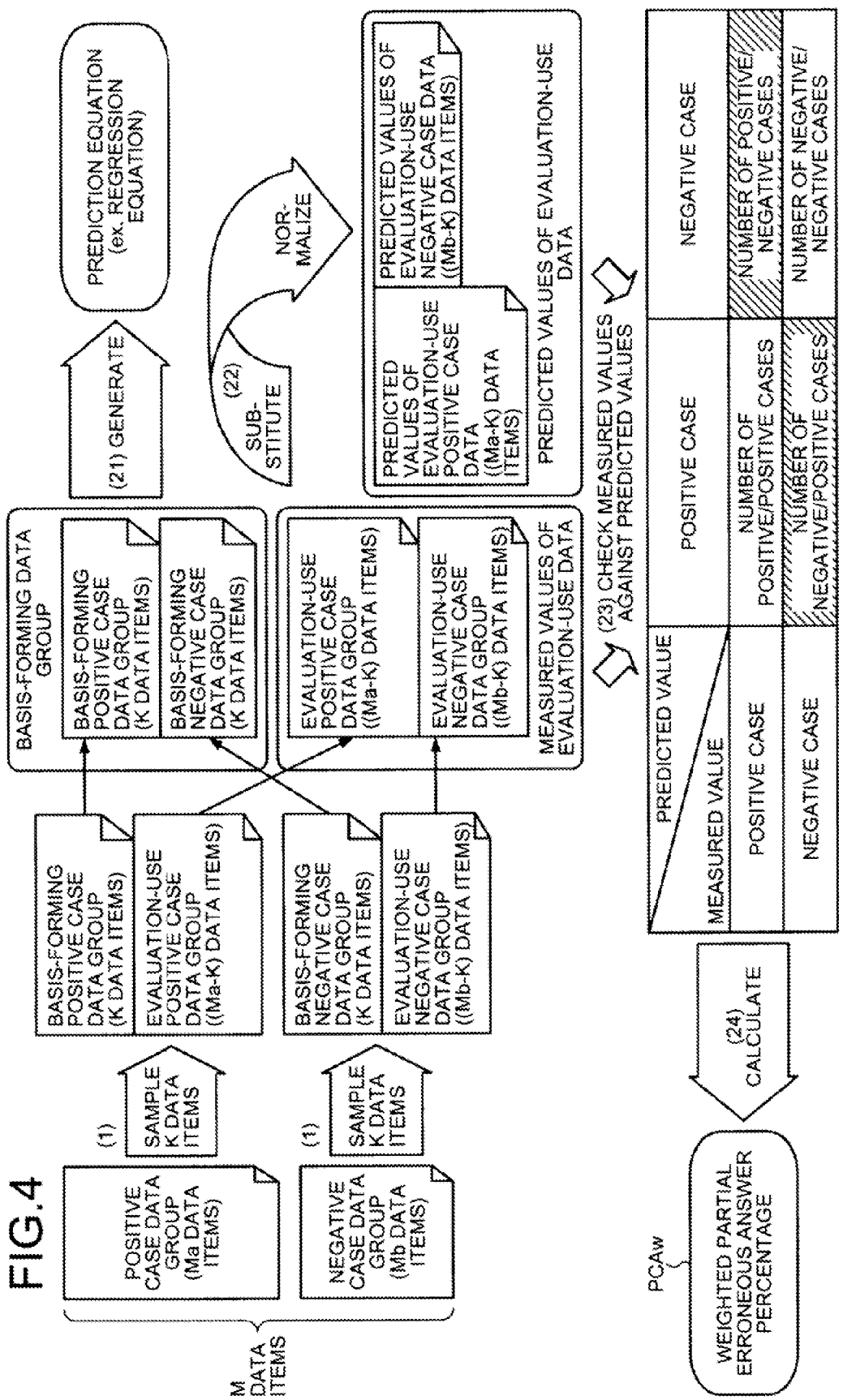

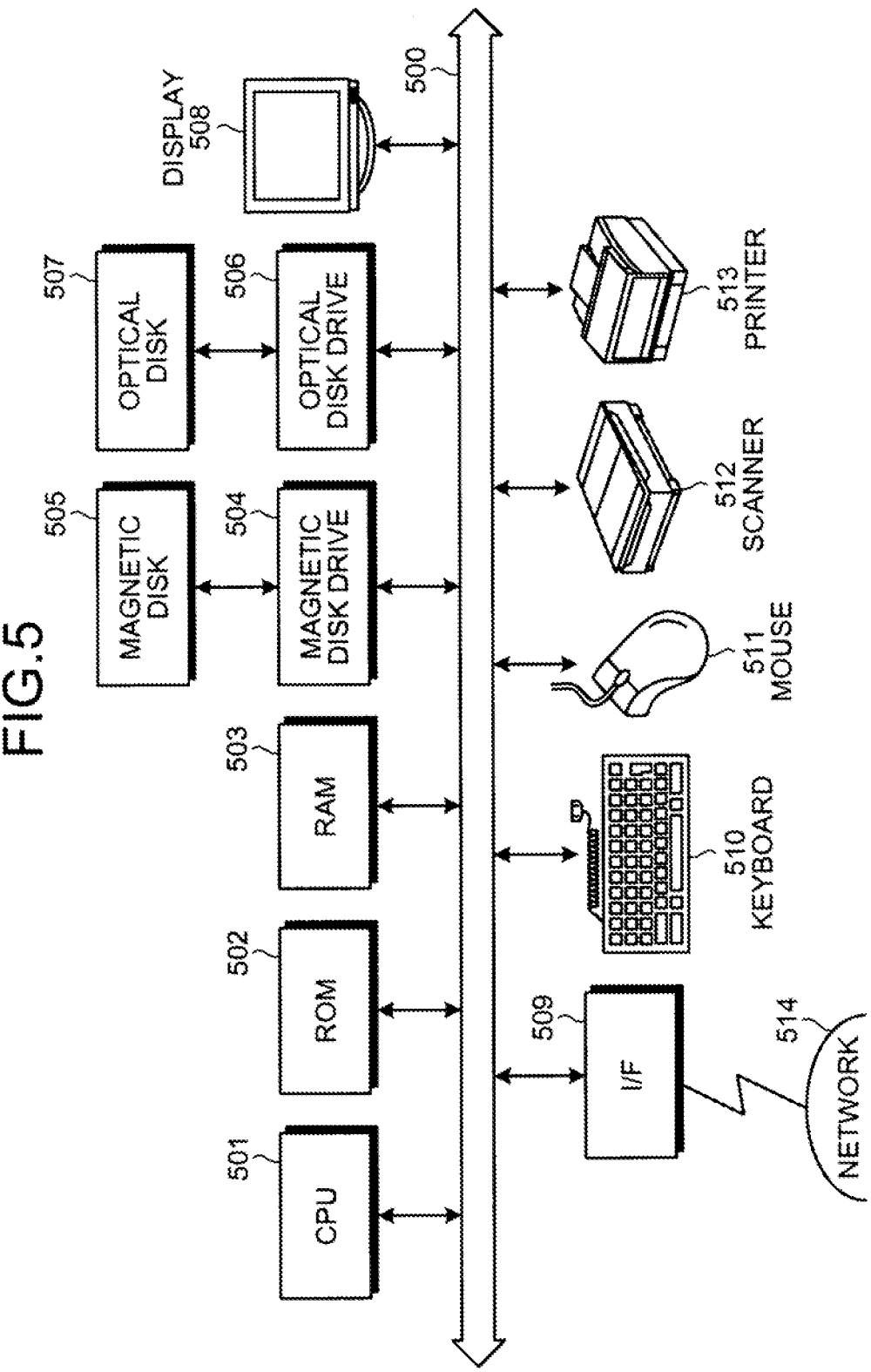

FIG.6

| SAMPLE ID | INTERVAL A | INTERVAL B | INTERVAL C | INTERVAL D | FAILURE FLAG |
|---|---|---|---|---|---|
| 1 | 10 | 20 | 30 | 40 | 0 |
| 2 | 11 | 21 | 31 | 39 | 0 |
| 3 | 9 | 19 | 29 | 41 | 0 |
| 4 | 16 | 20 | 32 | 41 | 1 |
| ⋮ | ⋮ | ⋮ | ⋮ | ⋮ | ⋮ |
| M | 8 | 22 | 28 | 33 | 1 |

FIG.7

| SAMPLE ID | AGE | GENDER | NUMBER OF PURCHASES | AVERAGE PURCHASE AMOUNT | PURCHASE/NON-PURCHASE OF RECOMMENDED PRODUCT |
|---|---|---|---|---|---|
| 1 | 23 | 0 (FEMALE) | 16 | 5000 | 1 (PURCHASED) |
| 2 | 34 | 1 (MALE) | 1 | 12000 | 0 (NOT PURCHASED) |
| 3 | 47 | 0 (FEMALE) | 3 | 8000 | 0 (NOT PURCHASED) |
| 4 | 51 | 1 (MALE) | 8 | 28000 | 1 (PURCHASED) |
| ⋮ | ⋮ | ⋮ | ⋮ | ⋮ | ⋮ |
| M | 29 | 0 (FEMALE) | 24 | 3700 | 1 (PURCHASED) |

FIG.8

| SAMPLE ID | AGE | GENDER | ANNUAL INCOME | ANNUAL HOUSEHOLD INCOME | PAYMENT/NON-REPAYMENT |
|---|---|---|---|---|---|
| 1 | 23 | 0 (FEMALE) | 300 | 300 | 0 (NOT REPAID) |
| 2 | 34 | 1 (MALE) | 560 | 820 | 0 |
| 3 | 47 | 0 (FEMALE) | 700 | 2000 | 1 (REPAID) |
| 4 | 51 | 1 (MALE) | 1000 | 1000 | 1 |
| ⋮ | ⋮ | ⋮ | ⋮ | ⋮ | ⋮ |
| M | 29 | 0 (FEMALE) | 410 | 960 | 0 |

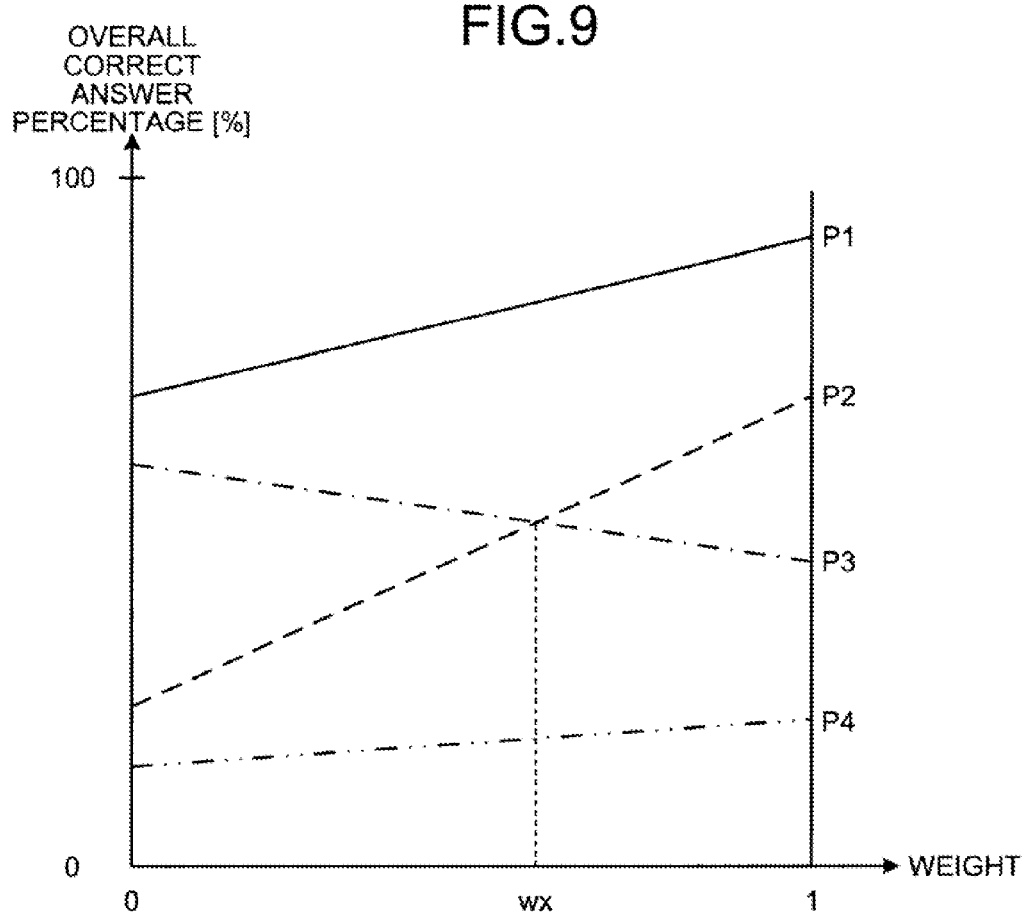

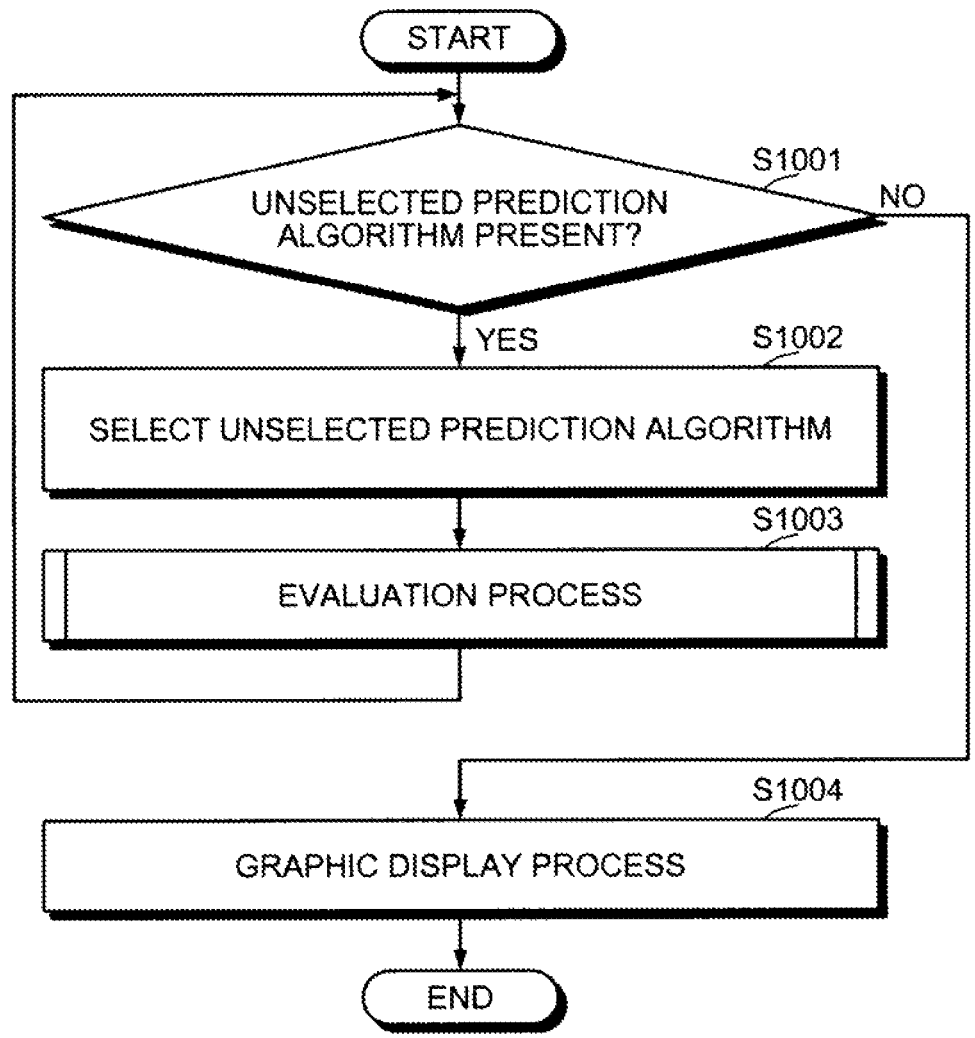

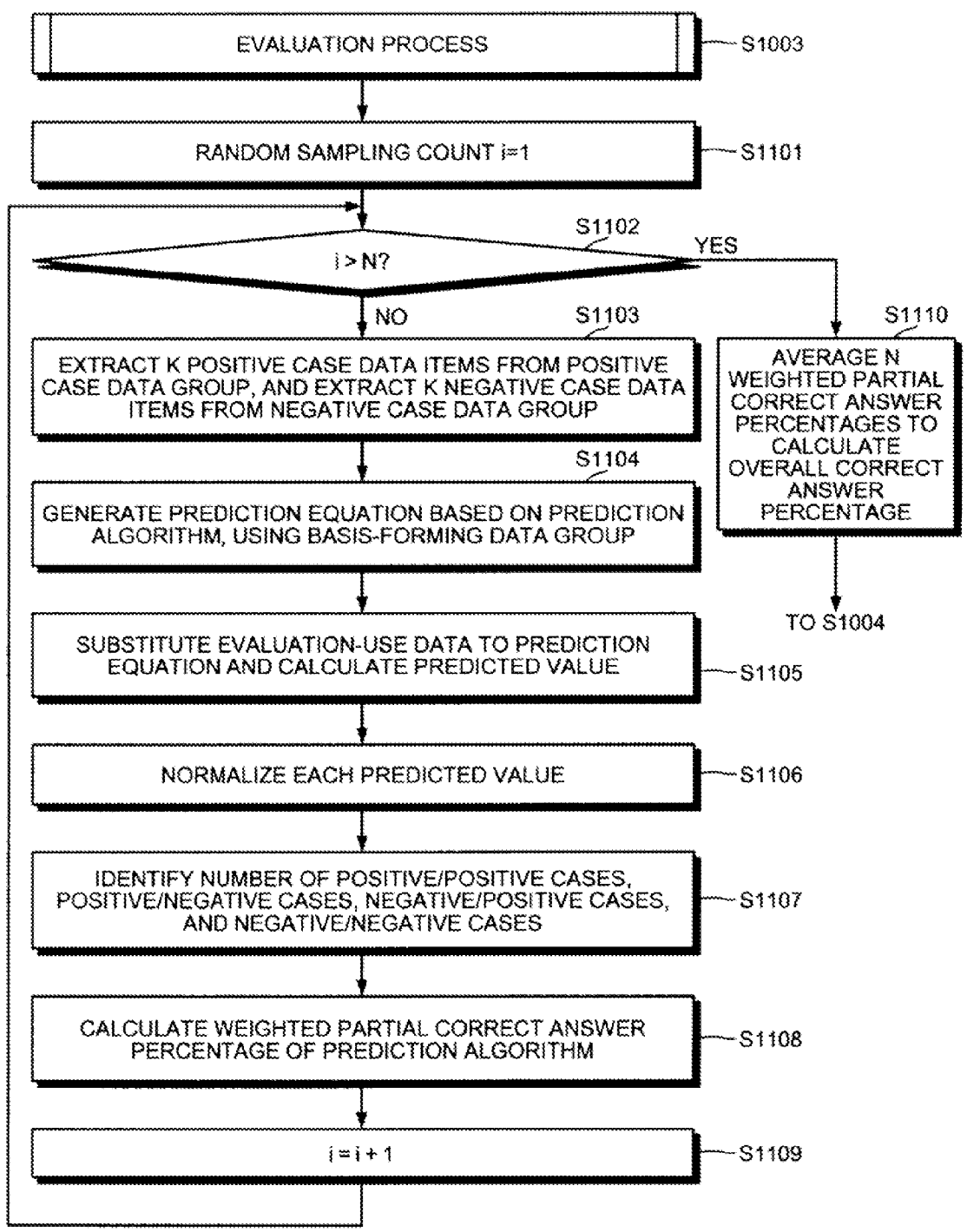

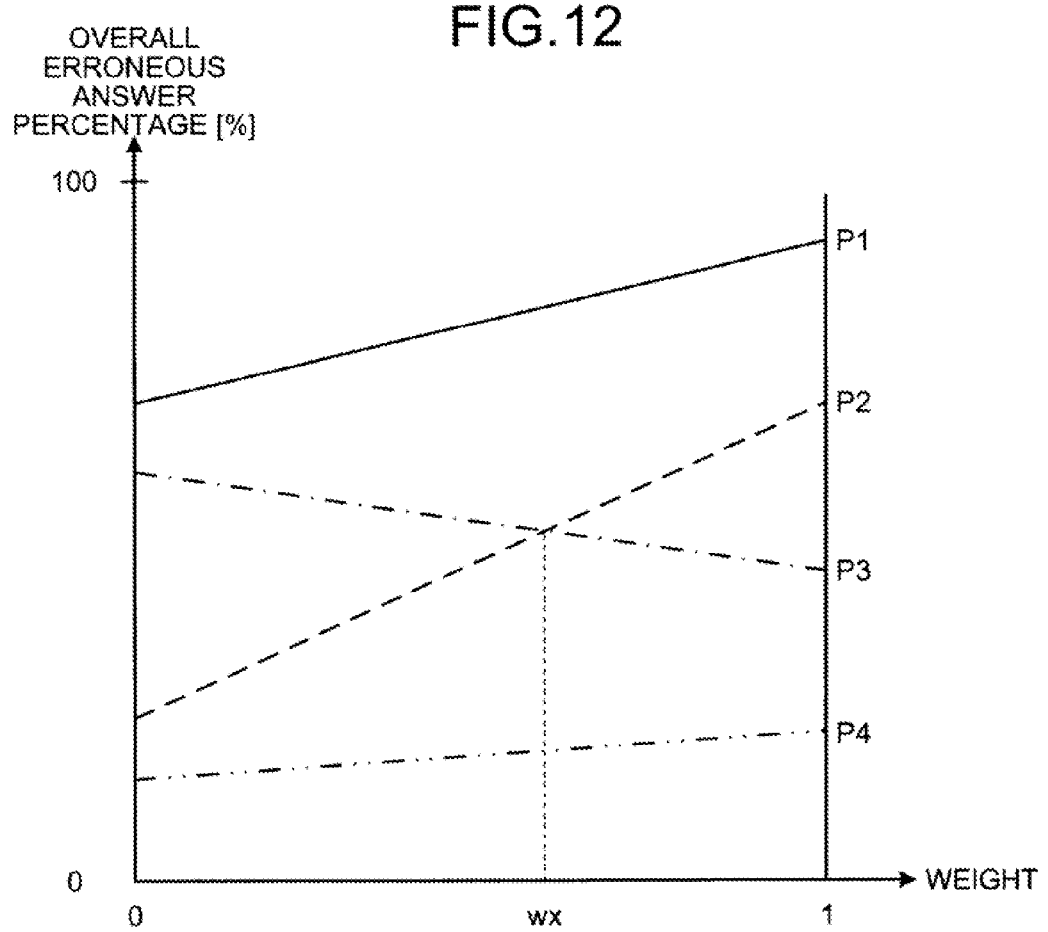

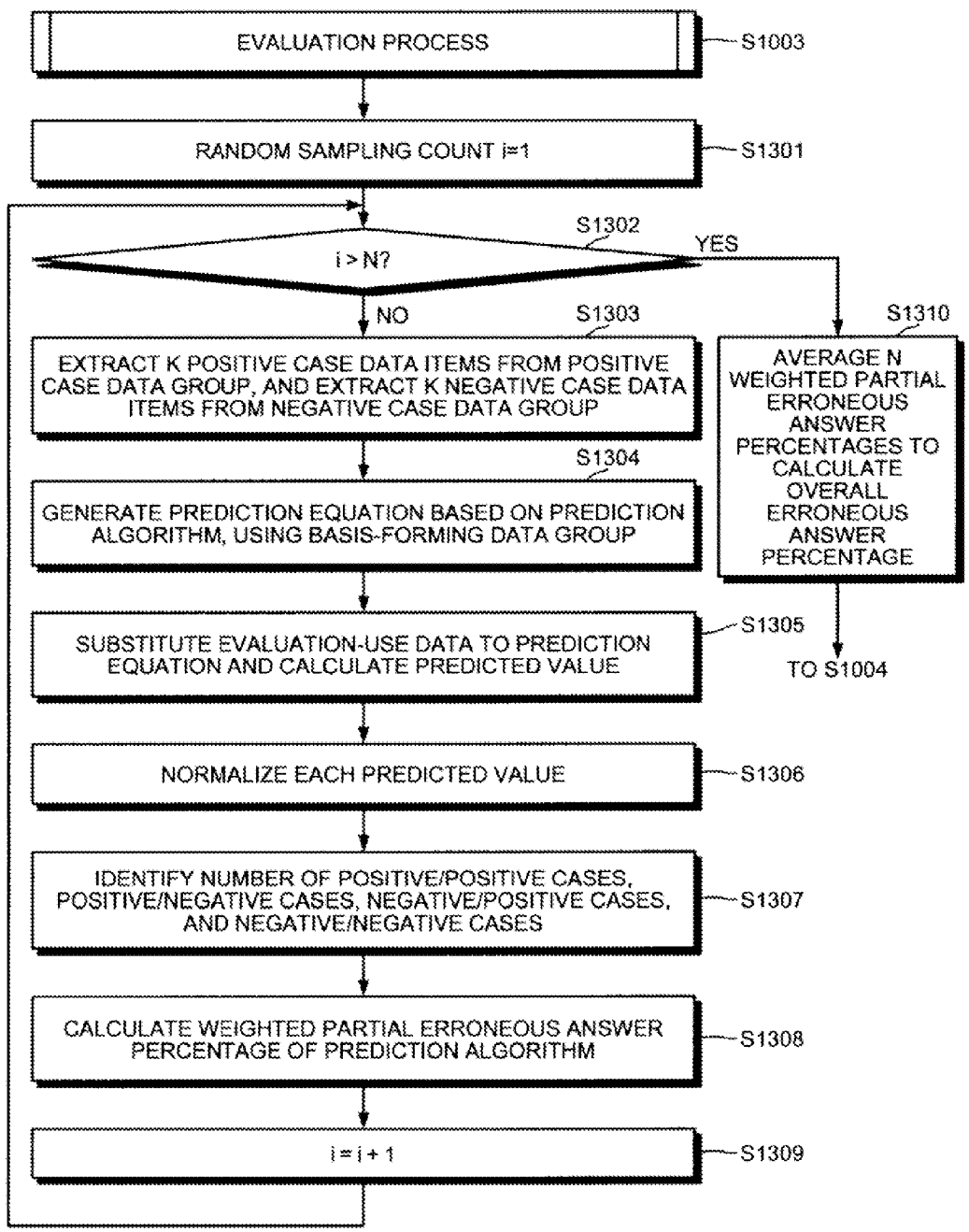

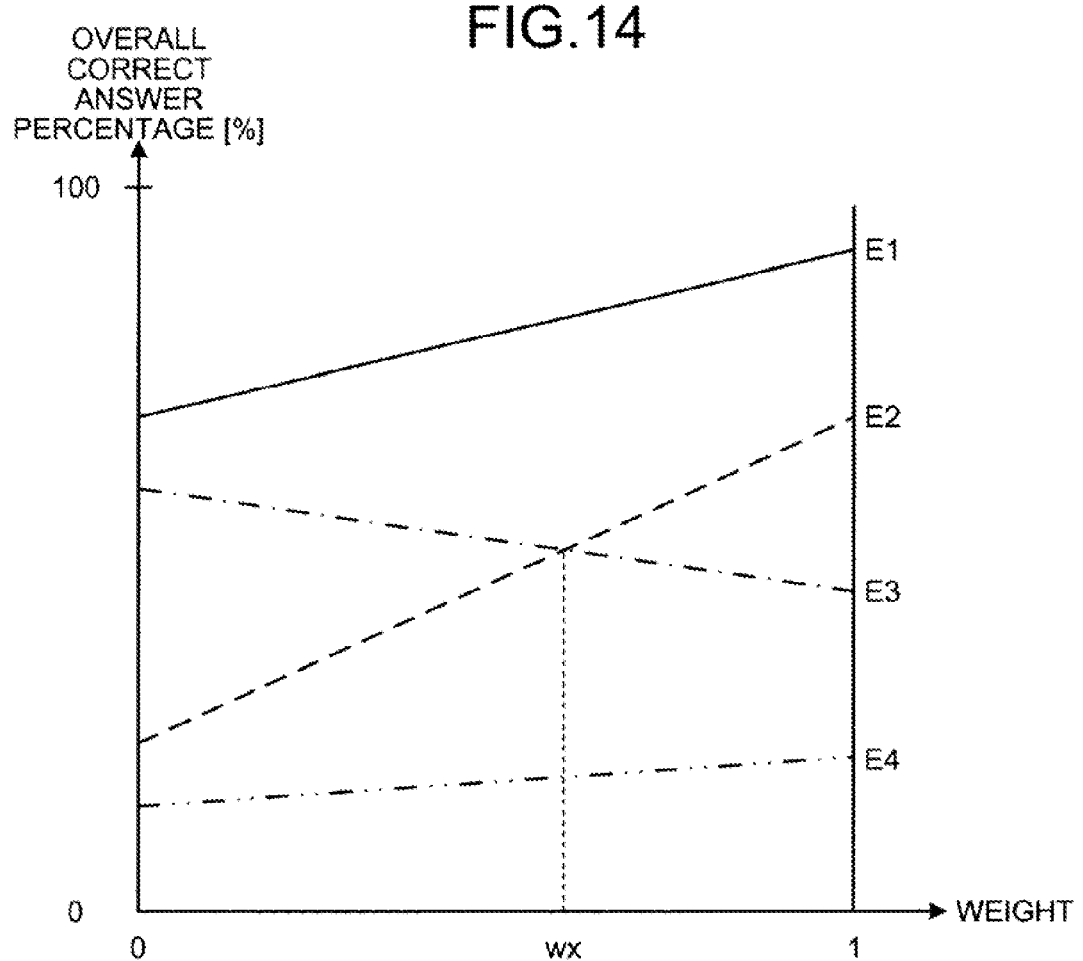

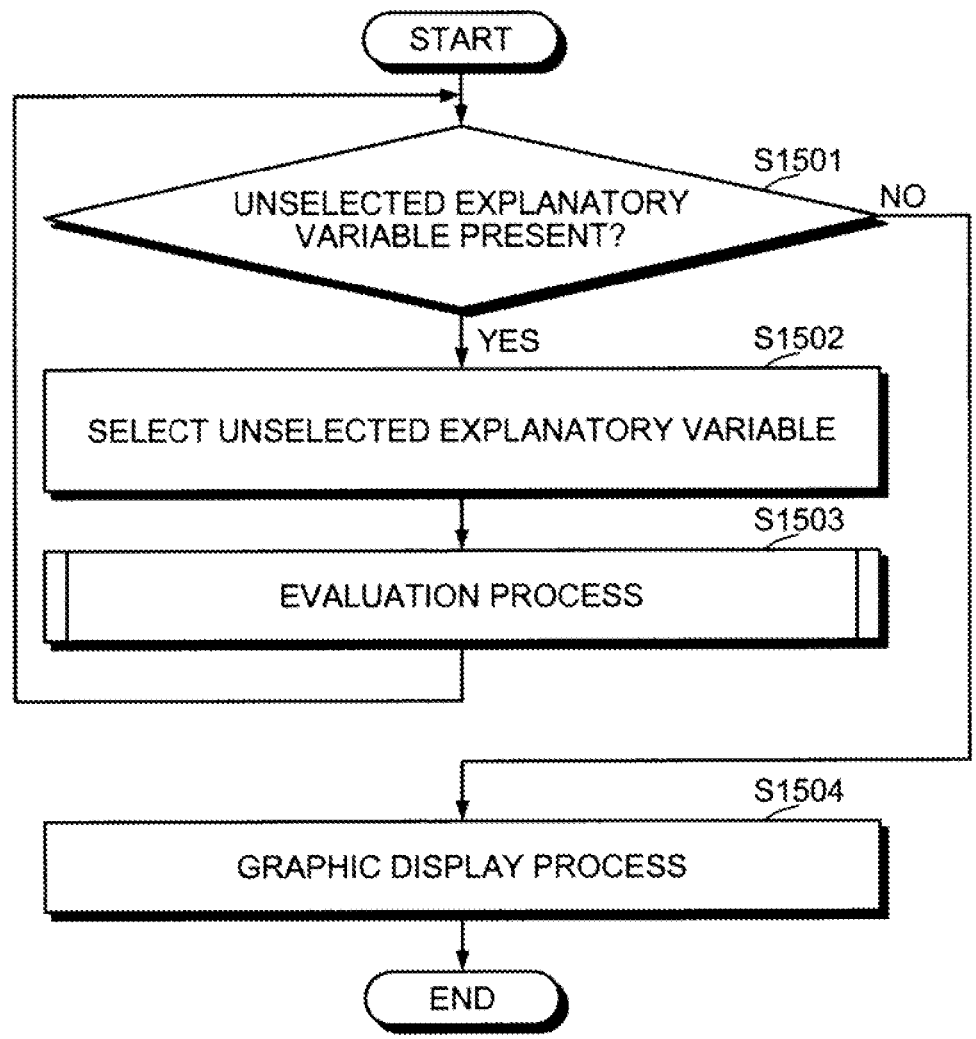

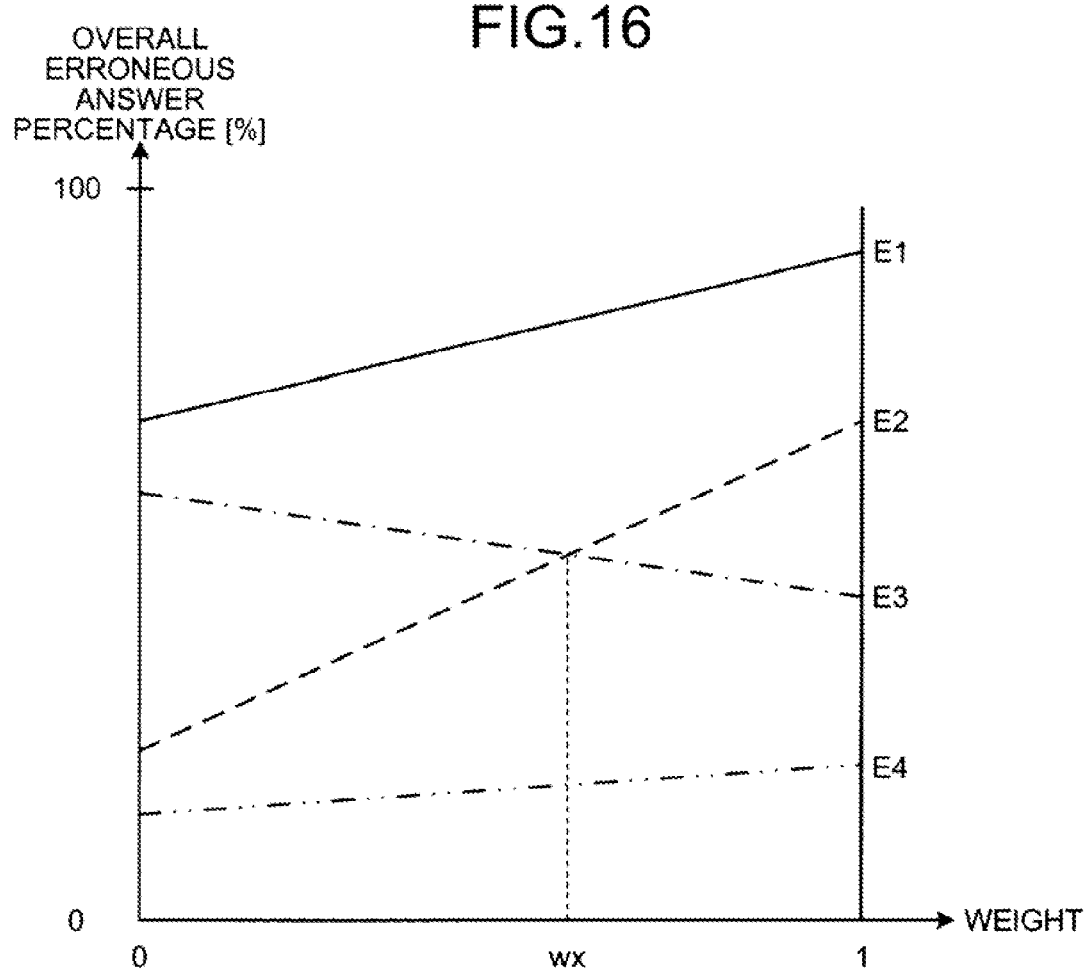

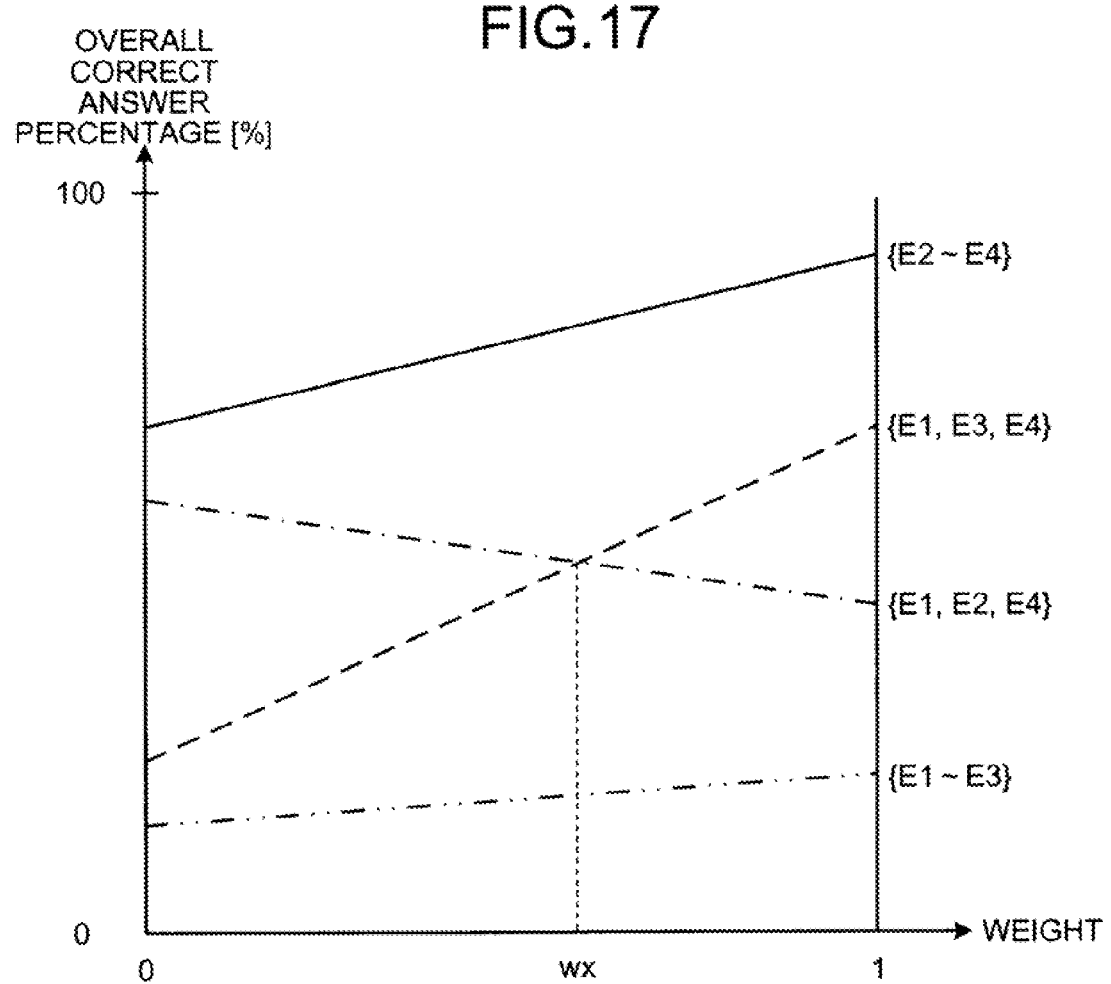

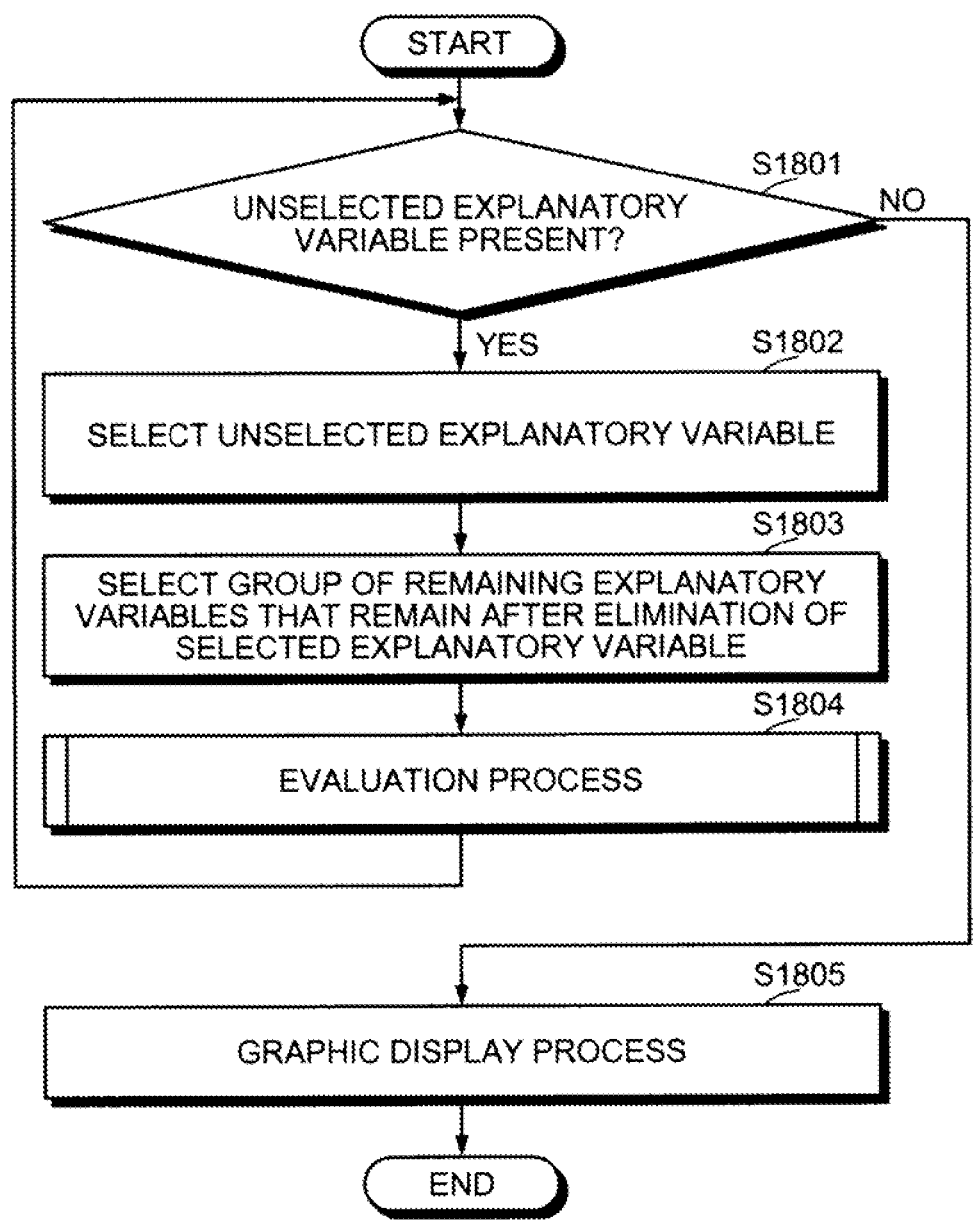

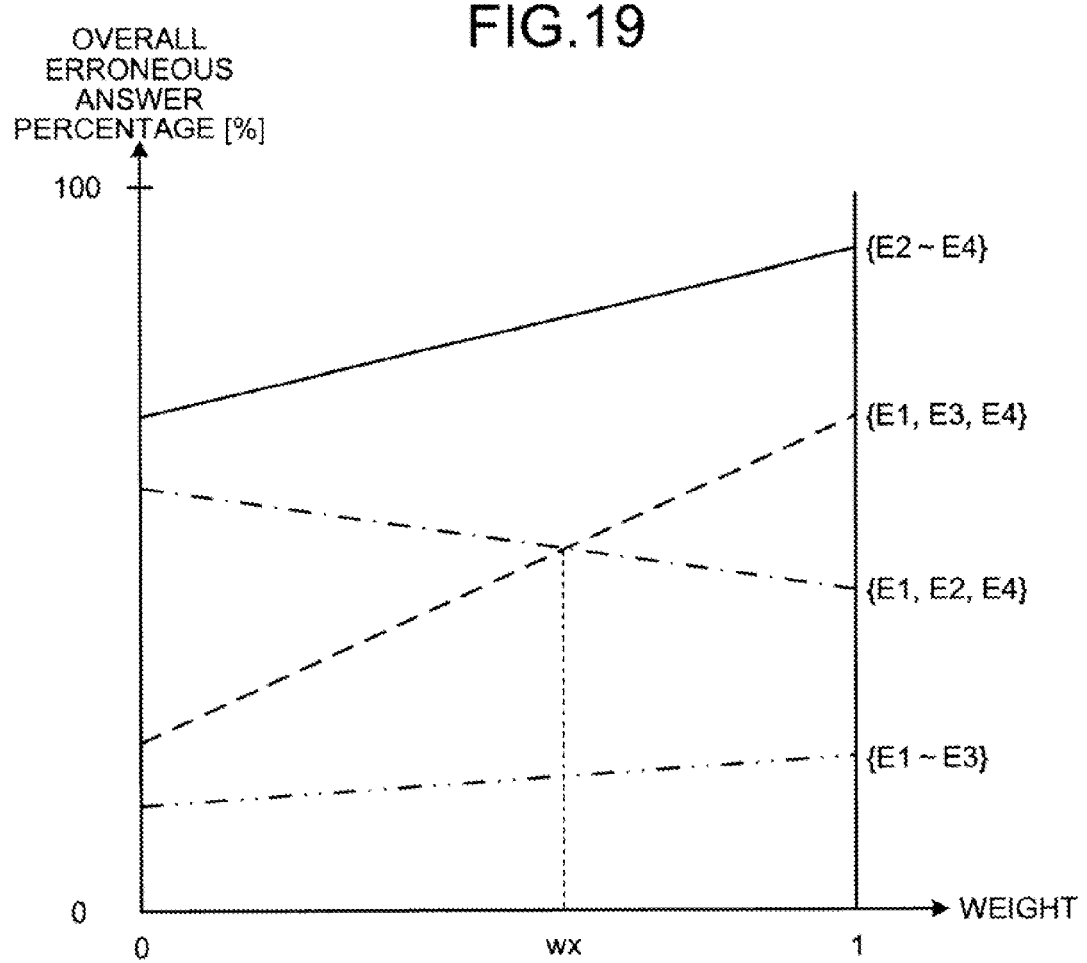

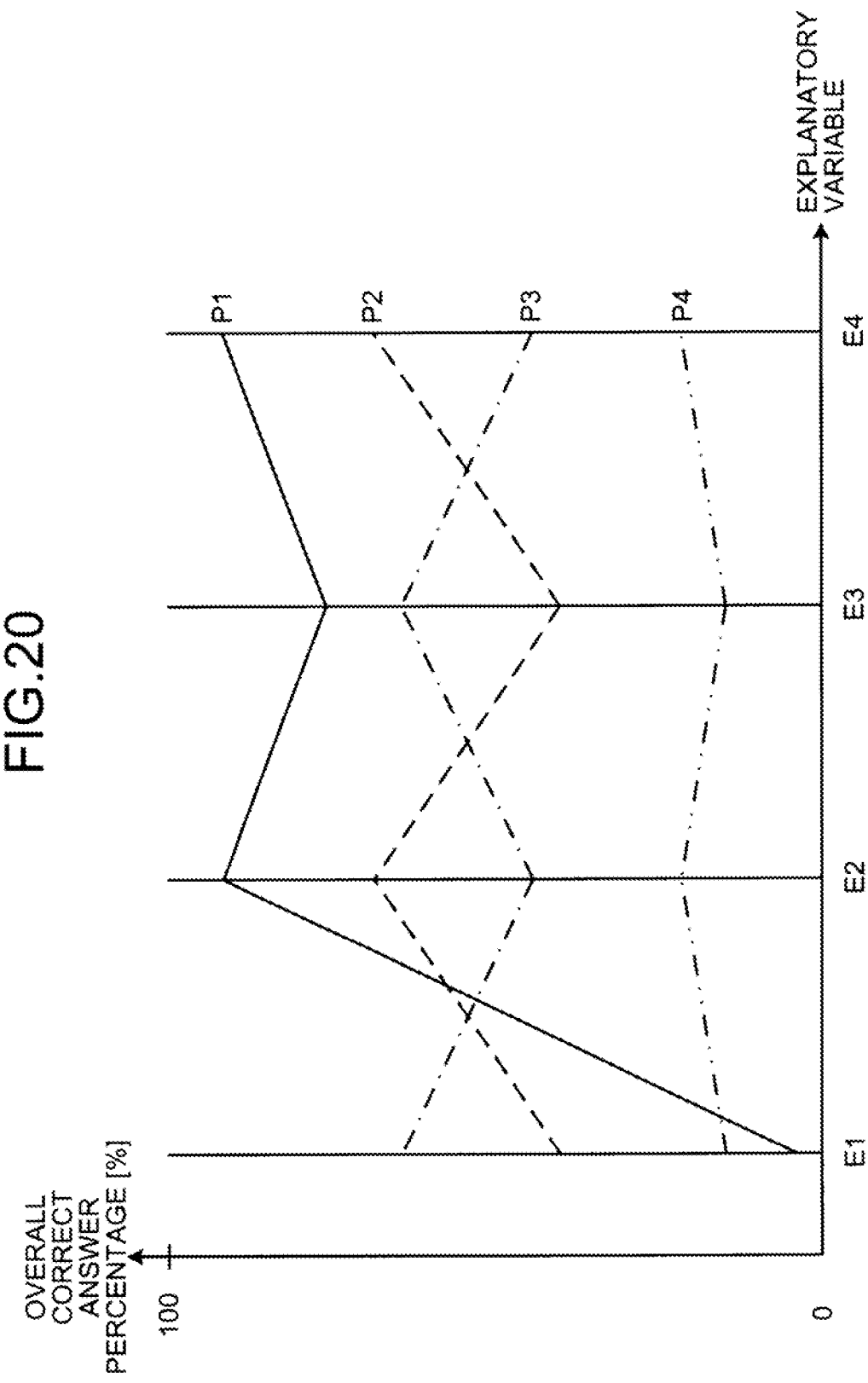

DATA ANALYZING COMPUTER PRODUCT, DATA ANALYZING METHOD, AND DATA ANALYZING APPARATUS

CROSS REFERENCE TO RELATED APPLICATIONS

This application is based upon and claims the benefit of priority of the prior Japanese Patent Application No. 2011-059561, filed on Mar. 17, 2011, the entire contents of which are incorporated herein by reference.

FIELD

The embodiments discussed herein are related to data analysis.

BACKGROUND

Conventionally, data analysis of input data is carried out by approximation using a regression equation, etc. For example, when data analysis is carried out to analyze the cause of a failure of a device, an explanatory variable is given as a candidate for the cause of the failure, and an objective variable is given as a variable indicative of whether the device is normal or is failing. According to this data analysis, a multi-explanatory-variable regression equation for calculating a predicted value for the objective variable based on explanatory variables is created. Based on the magnitude of coefficients of the multi-explanatory-variable regression equation, multiple candidates for the causes of the failure are analyzed to determine which candidate is related to the normal operation or failure of the device. For examples, refer to Japanese Laid-Open Patent Publication Nos. 2004-152205, 2004-234302, and 2007-293889.

In an analysis of a subject, values measured to be positive cases (or negative cases) are greater in number than values measured to be negative cases (or positive cases). For example, in the above data analysis of the cause of failure of the device, the positive (normal operation) cases are greater in number.

According to the above conventional technique, however, a prediction equation, such as a regression equation, is generated on the assumption that values measured to be positive cases (normal cases) and values measured to be negative cases (failure cases) are approximately the same in number. This poses a problem that if values measured for positive cases are overwhelmingly greater in number than values measured for negative cases, the prediction accuracy of the prediction equation drops. The same problem occurs when values measured for negative cases are overwhelmingly greater in number than values measured for negative cases.

According to the conventional technique, the prediction equation is generated using all of the data to be subject to evaluation; and all of the data to be subject to analysis, from which the prediction equation is originally generated, is evaluated using the prediction equation. As a result, determining a predicted value from the already known data that is subject to evaluation gives a predicted value that is the known evaluation subject data. This poses a problem that the predicted value is improperly evaluated to be correct in an excessive manner.

SUMMARY

According to an aspect of an embodiment, a computer-readable medium stores therein a data analyzing program that causes a computer, which has a memory device storing a set of measured values that include a set of positive case measured values for which an objective variable for an explanatory variable group of one or more explanatory variables represents a positive case and a set of negative case measured values for which the objective variable for the explanatory variable group represents a negative case, to execute a process. The process includes extracting randomly, a positive case measured value group and a negative case measured value group from the set of measured values such that the positive case measured values and the negative case measured values extracted are equivalent in number; generating based on the positive case measured value group and the negative case measured value group extracted at the extracting, a prediction equation that predicts the objective variable for a prediction algorithm; first calculating a first predicted value group by substituting into the prediction equation generated at the generating, each remaining positive case measured value group that remains after elimination of the positive case measured value group from the set of positive case measured values; second calculating a second predicted value group by substituting into the prediction equation generated at the generating, each remaining negative case measured value group that remains after elimination of the negative case measured value group from the set of negative case measured values; first identifying among the first predicted value group calculated at the first calculating, a first coincident-case count of predicted values that coincide with the positive case measured values originally substituted into the prediction equation and a first non-coincident-case count of predicted values that do not coincide with the positive case measured values; second identifying among the second predicted value group calculated at the second calculating, a second coincident-case count of predicted values that coincide with the negative case measured values originally substituted into the prediction equation and a second non-coincident-case count of predicted values that do not coincide with the negative case measured values; computing based on identification results obtained at the first and the second identifying, a weighted correct answer percentage that is a correct answer percentage indicative of the degree of coincidence between a measured value and a predicted value for the prediction algorithm and varying depending on a weight variable; and outputting a computation result obtained at the computing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an explanatory diagram of data analysis example A.

FIG. 2 is an explanatory diagram of the details of an evaluation process described in the data analysis example A depicted in FIG. 1.

FIG. 3 is an explanatory diagram of data analysis example B.

FIG. 4 is an explanatory diagram of the details of an evaluation process depicted in the data analysis example B.

FIG. 5 is a block diagram of a hardware configuration of a data analyzing apparatus according to embodiments.

FIG. 6 is an explanatory diagram of a group of data items concerning circuit failure analysis.

FIG. 7 is an explanatory diagram of a group of data related to a recommendation.

FIG. 8 is an explanatory diagram of a group of data items related to financial credit assessment.

FIG. 9 is a graph indicating a weighted overall correct answer percentage for each prediction algorithm calculated in practical example 1A.

FIG. 10 is a flowchart of a data analysis procedure according to the practical example 1A.

FIG. 11 is a flowchart of a detailed procedure of the evaluation process (step S1003) depicted in FIG. 10, according to the practical example 1A.

FIG. 12 is a graph indicating a weighted overall erroneous answer percentage for each prediction algorithm calculated in practical example 1B.

FIG. 13 is a flowchart of a detailed procedure of the evaluation process (step S1003) depicted in FIG. 10, according to the practical example 1B.

FIG. 14 is a graph indicating a weighted overall correct answer percentage for each prediction algorithm calculated in the practical example 2A.

FIG. 15 is a flowchart of a data analysis procedure according to the practical example 2A.

FIG. 16 is a graph indicating a weighted overall erroneous answer percentage for each prediction algorithm calculated in the practical example 2B.

FIG. 17 is a graph indicating a weighted overall correct answer percentage for each remaining explanatory variable in the practical example 3A.

FIG. 18 is a flowchart of a data analysis procedure according to the practical example 3A.

FIG. 19 is a graph indicating a weighted overall correct answer percentage for each explanatory variable in the practical example 3B.

FIG. 20 is a graph 508 indicating an overall correct answer percentage for each combination of a prediction algorithm and an explanatory variable in the practical example 4A.

DESCRIPTION OF EMBODIMENTS

Figure 21:
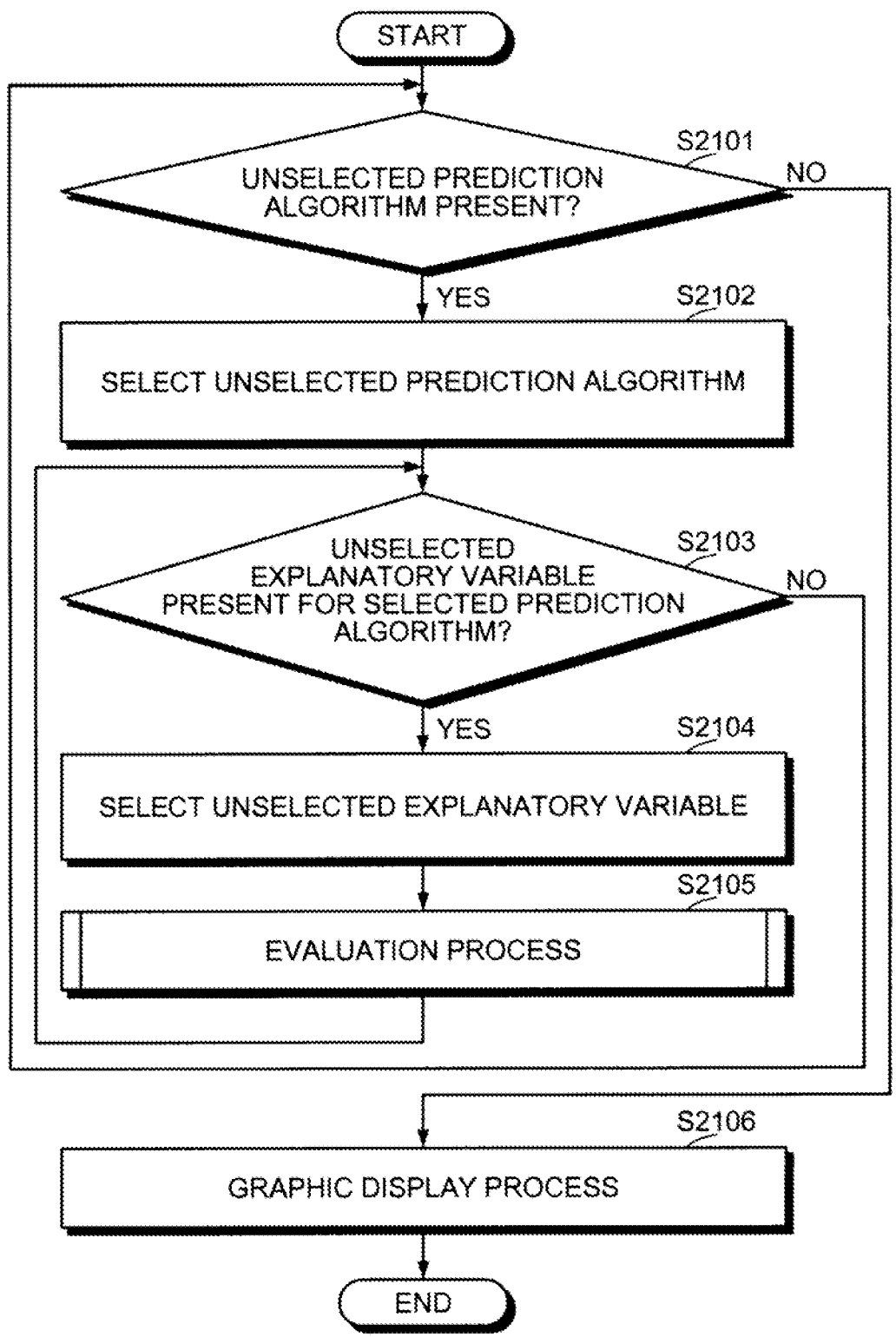
FIG. 21 is a flowchart of a data analysis procedure according to the practical example 4A.

Preferred embodiments of the present invention will be explained with reference to the accompanying drawings. In the embodiments, positive case data means case data (measured values) included in a concept to be studied, and negative case data means case data (measured values) not included in the concept to be studied. For example, in failure analysis of circuits obtained from the same design data, determination results indicating that a location subject to analysis is normal is equivalent to positive case data, while determination results indicating the location subject to analysis has failed is equivalent to negative case data. Both positive data and negative case data have one or more explanatory variables and objective variables. In the above failure analysis, for example, the wiring width at a location subject to analysis is an explanatory variable, and normal operation or failure is an objective variable.

A data analysis example A is an example in which a correct answer percentage is determined as a data analysis result. A correct answer percentage is a percentage representing the degree of coincidence between a measured value for positive case data and a predicted value obtained by substituting the positive data into a statistical prediction equation, and is a percentage representing the degree of coincidence between a measured value for negative case data and a predicted value obtained by substituting the negative data into a statistical prediction equation. In other words, a correct answer percentage represents the probability of predicting a positive case that is actually a positive case and a negative case that is actually a negative case.

FIG. 1 is an explanatory diagram of the data analysis example A. In the data analysis example A depicted in FIG. 1, a data group of M data items is used. The data group is composed of a positive case data group of Ma positive case data items and a negative case data group of Mb negative case data items.

(1) First, K positive case data items are randomly sampled from the positive case data group. In the same manner, K negative case data items are randomly sampled from the negative case data group. (2) Subsequently, according to the data analysis example A, an evaluation process is executed using the K positive case data items and K negative case data items. The evaluation process is executed in accordance with a given prediction algorithm. A prediction algorithm is a program for calculating a predicted value using a statistical prediction equation. This prediction algorithm is provided as, for example, a known approximation algorithm, such as regression analysis, step-wise regression analysis, Support Vector Machine (SVM) regression analysis, regression tree analysis, and random forest regression analysis. The details of the evaluation process will be described in FIG. 2.

(3) The evaluation process is executed to produce a weighted partial correct answer percentage. A weighted partial correct answer percentage is a correct answer percentage that is obtained when the evaluation process is executed on data extracted by one random sampling from the positive case data group and negative case data group. The weighted partial correct answer percentage varies depending on a weight variable w ($0 \leq w \leq 1$).

An analysis cycle of (1) to (3) is executed N times. N denotes the number of times set by a user. The analysis cycle of (1) to (3) is executed N times to calculate N weighted partial correct answer percentages. (4) According to the data analysis example A, N weighted partial correct answer percentages are averaged to calculate a weighted overall correct answer percentage. In FIG. 1, analysis contents enclosed by a dotted line are executed for each prediction algorithm. A weighted overall correct answer percentage is, consequently, calculated for each prediction algorithm.

(5) Since a weighted overall correct answer percentage is calculated for each prediction algorithm, according to the data analysis example A, the weighted overall correct answer percentage is graphed for each prediction algorithm. This enables the user to intuitively understand which prediction algorithm offers better prediction accuracy.

FIG. 2 is an explanatory diagram of the details of the evaluation process described in the data analysis example A depicted in FIG. 1. FIG. 2 depicts an example of the analysis cycle (1) to (3) depicted in FIG. 1 being executed once. In FIG. 2, a group of K positive case data items sampled from the positive case data group is referred to as a basis-forming positive case data group, and the rest of the positive case data group is referred to as an evaluation-use positive case data group. Likewise, the group of K negative case data items sampled from the negative case data group is referred to as a basis-forming negative case data group, and the rest of negative case data group is referred to as an evaluation-use negative case data group.

(21) In the evaluation process, a prediction equation is generated using a basis-forming data group obtained by combining the basis-forming positive case data group with the basis-forming negative case data group. A prediction equation is a function expressing a prediction algorithm, and is generated for each prediction algorithm. This prediction equation is provided as, for example, a known prediction equation, such as a regression equation, SVM, and decision tree. For example, in a case of a single-explanatory-variable regression equation $y = \alpha x + \beta$, the value of each explanatory variable and that of each objective variable of the basis-forming data group are substituted in the explanatory variable x and objective variable y of the single-explanatory-variable regression equation, and the values of the coefficients $\alpha$ and $\beta$ of the single-explanatory-variable regression equation are determined by the least square method.

Subsequently, the value of each explanatory variable (measured value) of the evaluation-use data group is substituted for the explanatory variable of the prediction equation generated in (21) to calculate a predicted value for an objective variable for each data of the evaluation-use data group. In the above failure analysis, a measured value for each objective variable of the evaluation-use data group is "0" when the objective variable represents "normal", and is "1" when the objective variable represents "failure". Because the predicted value for the objective variable ranges from 0 to 1, the predicted value is normalized. For example, the predicted value for the objective variable is rounded off at the first decimal place to obtain the predicted value for the objective variable as "0" or "1".

Measured objective-variable values obtained by substituting a measured explanatory-variable value in the prediction equation for each data item among the evaluation-use positive case data group are referred to as predicted values of evaluation-use positive case data. Likewise, measured objective-variable values obtained by substituting a measured explanatory-variable value into the prediction equation for each data item among the evaluation-use negative case data group are referred to as predicted values of evaluation-use negative case data.

(23) Measured values of evaluation-use data and predicted values of evaluation-use data are then checked against each other. A table depicted in FIG. 2 indicates coincidence and non-coincidence of measured values and predicted values of evaluation-use data. In the case of evaluation-use data of a given positive case, when a measured value for the positive case coincides with a predicted value for the positive case, the evaluation-use data for the positive case is counted as the number of positive/positive cases. This means that the number of positive/positive cases represents the number of evaluation-use data that have made correct prediction on measured values for positive cases. For example, in the above failure analysis, the number of positive/positive cases represents the number of cases of predicting data as data of normal operation, which data has been proven data of normal operation in actual measurement.

Likewise, in the case of evaluation-use data of a given negative case, when a measured value for the negative case coincides with a predicted value for the negative case, the evaluation-use data of the negative case is counted as the number of negative/negative cases. This means that the number of negative/negative cases represents the number of evaluation-use data that have made correct prediction on measured values for negative cases. For example, in the above failure analysis, the number of negative/negative cases represents the number of cases of predicting data as data of failure, which data has been proven data of failure in actual measurement.

In contrast, in the case of evaluation-use data of a given positive case, when a measured value for the positive case does not coincide with a predicted value for the positive case, the evaluation-use data of the positive case is counted as the number of positive/negative cases. This means that the number of positive/negative cases represents the number of evaluation-use data that have made incorrect prediction on measured values for positive cases. For example, in the above failure analysis, the number of positive/negative cases represents the number of cases of predicting data as data of failure, which data has been proven data of normal operation in actual measurement.

Likewise, in a case of evaluation-use data for a given negative case, when a measured value for the negative case does not coincide with a predicted value for the negative case, the evaluation-use data of the negative case is counted as the number of negative/positive cases. This means that the number of negative/positive cases represents the number of evaluation-use data that have made incorrect prediction on measured values for negative cases. For example, in the above failure analysis, the number of negative/positive cases represents the number of cases of predicting data as data of normal operation, which data has been proven data of failure in actual measurement. In the evaluation process, the number of positive/positive cases, the number of negative/negative cases, the number of positive/negative cases, and the number of negative/positive cases are each counted.

(24) Based on each of the counted number of cases, according to the evaluation process, a weighted partial correct answer percentage is calculated using equation (1).

$$PCAw = w \times Npp/(Npp+Npn) + (1-w) \times Nnn/(Nnn+Nnp) \quad (1)$$

where PCAw is the weighted partial correct answer percentage, w is a weight variable, Npp is the number of positive/positive cases, Npn is the number of positive/negative cases, Nnn is the negative/negative cases, and Nnp is the number of negative/positive cases. The weight variable w varies in a range of $0 \leq w \leq 1$. The number of positive/positive cases hatched in FIG. 2 is the numerator of the first term of the right side of the equation, and the number of negative/negative cases hatched in FIG. 2 is the numerator of the second term of the right side of the equation.

In the evaluation process, as indicated at (3) in FIG. 1, the weighted partial correct answer percentage PCAw is calculated each time the random sampling at (1) in FIG. 1 is carried out. The calculated N weighted partial correct answer percentages PCAw are averaged to produce a weighted overall correct answer percentage.

In this manner, by carrying out the processes depicted in FIGS. 1 and 2, a weighted overall correct answer percentage is obtained for each prediction algorithm, so that variations of weighted overall correct answer percentages for individual prediction algorithms can be displayed in an intuitive and understandable manner. An example of displaying a weighted overall correct answer percentage for each prediction algorithm will be described later.

The weight variable w can be set freely by the user. For example, with regard to the relation between the number of positive case data items Ma making up the positive case data group and the number of negative case data items Mb making up the negative case data group, when Ma>Mb is satisfied, the weight variable w is set low to emphasize the number of negative/negative cases. When Ma<Mb is satisfied, the weight variable w is set high to emphasize the number of positive/positive cases.

A data analysis example B will next be described. The data analysis example B is an example in which an erroneous answer percentage is determined as a data analysis result. An erroneous answer percentage is a percentage representing the degree of non-coincidence between a measured value for positive case data and a predicted value obtained by substituting the positive data into a statistical prediction equation, and is a percentage representing the degree of non-coincidence between a measured value for negative case data and a predicted value obtained by substituting the negative data into a statistical prediction equation. In other words, an erroneous answer percentage represents a probability of erroneously predicting a negative case that is actually a positive case and a positive case that is actually a negative case.

FIG. 3 is an explanatory diagram of the data analysis example B. In FIG. 3, analysis contents identical to those depicted in FIG. 1 are denoted by the same reference numerals used in FIG. 1, and description thereof is omitted, whereas differences in analysis contents are described. For example, the data analysis examples A and B are different from each other in that the weighted partial correct answer percentage and the weighted overall correct answer percentage are determined in the data analysis example A while a weighted partial erroneous answer percentage and a weighted overall erroneous answer percentage are determined in the data analysis example B.

FIG. 4 is an explanatory diagram of the details of an evaluation process depicted in the data analysis example B. In FIG. 4, analysis contents identical to those depicted in FIG. 2 are denoted by the same reference numerals used in FIG. 2, and description thereof is omitted, whereas differences in analysis contents are described. In the evaluation process depicted in FIG. 4, based on each of the counted number of cases, a weighted partial erroneous answer percentage is calculated using equation (2).

$$PWAw = w \times Npn/(Npp+Npn) + (1-w) \times Nnp/(Nnn+Nnp) \quad (2)$$

In the equation (2), PWAw is the weighted partial erroneous answer percentage. In FIG. 4, as a result of checking predicted values against measured values at (23), the number of positive/negative cases hatched in FIG. 4 is the numerator of the first term of the right side of the equation, and the number of negative/positive cases hatched in FIG. 4 is the numerator of the second term of the right side of the equation. In the evaluation process, as indicated at (3) in FIG. 3, the weighted partial erroneous answer percentage PWAw is calculated each time the random sampling at (1) in FIG. 3 is carried out. The calculated N weighted partial erroneous answer percentages PWAw are averaged to produce a weighted overall erroneous answer percentage.

In this manner, by carrying out the processes depicted in FIGS. 3 and 4, a weighted overall erroneous answer percentage is obtained for each prediction algorithm, so that variations of weighted overall erroneous answer percentages for individual prediction algorithms can be displayed in an intuitive and understandable manner. An example of displaying a weighted overall erroneous answer percentage for each prediction algorithm will be described later.

The weight variable w can be set freely by the user. For example, with regard to the relation between the number of positive case data items Ma making up the positive case data group and the number of negative case data items Mb making up the negative case data group, when Ma>Mb is satisfied, the weight variable w is set low to emphasize the number of negative/negative cases. When Ma<Mb is satisfied, the weight variable w is set high to emphasize the number of positive/positive cases.

FIG. 5 is a block diagram of a hardware configuration of a data analyzing apparatus according to the embodiments. As depicted in FIG. 5, the data analyzing apparatus includes a central processing unit (CPU) 501, a read-only memory (ROM) 502, a random access memory (RAM) 503, a magnetic disk drive 504, a magnetic disk 505, an optical disk drive 506, an optical disk 507, a display 508, an interface (I/F) 509, a keyboard 510, a mouse 511, a scanner 512, and a printer 513, respectively connected by a bus 500.

The CPU 501 governs overall control of the data analyzing apparatus. The ROM 502 stores therein programs such as a boot program. The RAM 503 is used as a work area of the CPU 501. The magnetic disk drive 504, under the control of the CPU 501, controls the reading and writing of data with respect to the magnetic disk 505. The magnetic disk 505 stores therein data written under control of the magnetic disk drive 504.

The optical disk drive 506, under the control of the CPU 501, controls the reading and writing of data with respect to the optical disk 507. The optical disk 507 stores therein data written under control of the optical disk drive 506, the data being read by a computer.

The display 508 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 508.

The I/F 509 is connected to a network 514 such as a local area network (LAN), a wide area network (WAN), and the Internet through a communication line and is connected to other apparatuses through the network 514. The I/F 509 administers an internal interface with the network 514 and controls the input/output of data from/to external apparatuses. For example, a modem or a LAN adaptor may be employed as the I/F 509.

The keyboard 510 includes, for example, keys for inputting letters, numerals, and various instructions and performs the input of data. Alternatively, a touch-panel-type input pad or numeric keypad, etc. may be adopted. The mouse 511 is used to move the cursor, select a region, or move and change the size of windows. A track ball or a joy stick may be adopted provided each respectively has a function similar to a pointing device.

The scanner 512 optically reads an image and takes in the image data into the data analyzing apparatus. The scanner 512 may have an optical character reader (OCR) function as well. The printer 513 prints image data and text data. The printer 513 may be, for example, a laser printer or an ink jet printer.

Samples of the data groups (positive case data group and negative case data group) depicted in FIGS. 1 and 3 will next be described. In this embodiment, the data group samples will be described by taking examples of circuit failure analysis, data analysis related to a recommendation, and data analysis related to financial credit assessment. For example, the following samples of data groups of FIGS. 6 to 8 are stored, for example, in the memory devices depicted in FIG. 5, such as the ROM 502, the RAM 503, and the magnetic disk 505.

FIG. 6 is an explanatory diagram of a group of data items concerning circuit failure analysis. In FIG. 6, each data item has column for a sample ID, intervals A to D, and a failure flag. The sample ID is an identifier that uniquely identifies the data item. In this case, the sample ID uniquely identifies each of the M circuits that are manufactured based on the same design data. The intervals A to D are wiring intervals at a specific location in a circuit. In FIG. 6, the intervals A to D at four locations are selected as an example. The intervals A to D serve as an explanatory variable group. While four explanatory variables are indicated in FIG. 6, one or more explanatory variables are sufficient. In FIG. 6, the unit of the intervals A to D is [μm].

The failure flag is a flag that indicates normal operation or failure for each data item, where a flag of "0" indicates "normal" (positive case) while a flag of "1" indicates "failure" (negative case). The failure flag serves as the objective variable to the explanatory variable group. The range in which the interval A is normal is determined to be, for example, $8 \leq A \leq 12$. The range in which the interval B is normal is determined to be, for example, $18 \leq B \leq 22$. The range in which the interval C is normal is determined to be, for example, $28 \leq C \leq 32$. The range in which the interval D is normal is determined to be, for example, $38 \leq D \leq 42$. In FIG. 6, for example, if any one of the intervals A to D for a data item is out of the normal range, the data item is regarded as "failure". Hereinafter, for example, the interval A is regarded as an explanatory variable E1, the interval B is regarded as an explanatory variable E2, the interval C is regarded as an explanatory variable E3, and the interval D is regarded as an explanatory variable E4.

FIG. 7 is an explanatory diagram of a group of data related to a recommendation. The group of data items related to recommendation is data indicative of whether a customer has purchased a product recommended to the customer at a given store. In FIG. 7, each data item has a column for sample ID, age, gender, number of purchases, average purchase amount, and purchase/non-purchase of a recommended product. The sample ID is an identifier that uniquely identifies the data item. In this case, the sample ID is an identifier that uniquely identifies each of the M customers. Age represents the age of the customer. Gender represents the gender of the customer, where "0" represents female while "1" represents male.

The number of purchases is the number of times the customer has purchased products at the store and is cumulative. The average purchase amount represents the purchase amount for one purchase and is equivalent to the amount yielded by dividing the total purchase amount by the total number of purchases. The items of age to average purchase amount serve as an explanatory variable group. One or more explanatory variables are sufficient.

The purchase/non-purchase of a recommended product is a flag indicative of whether the customer has purchased a recommend product at the store. A flag of "1" represents "purchased" (positive case), while a flag of "0" represents "not purchased" (negative case). The flag is set to "1" if the customer has purchased the product even once. The purchase/non-purchase of a recommended product serves as the objective variable to the explanatory variable group. Hereinafter, for example, age is regarded as the explanatory variable E1, gender is regarded as the explanatory variable E2, the number of purchases is regarded as the explanatory variable E3, and the average purchase amount is regarded as the explanatory variable E4.

FIG. 8 is an explanatory diagram of a group of data items related to financial credit assessment. The group of data items related to financial credit assessment is data indicative of whether repayment is made in a financing case. In FIG. 8, each data item has a column for a sample ID, age, gender, annual income, annual household income, and repayment/non-repayment. The sample ID is an identifier that uniquely identifies the data item. In this case, it is an identifier that uniquely identifies each of the M customers. Age represents the age of the customer. Gender represents the gender of the customer, where "0" represents female while "1" represents male.

The annual income represents the annual income of the customer. The annual household income represents the annual income of the household of the customer. The annual income and annual household income each means the annual income at the time of application for financing. The items of age to annual household income serve as an explanatory variable group. One or more explanatory variables are sufficient.

The repayment/non-repayment is a flag indicative of whether the customer has repaid a loan. A flag of "1" represents "repaid" (positive case), while a flag of "0" represents "not repaid" (negative case). The repayment/non-repayment serves as the objective variable to the explanatory variable group. Hereinafter, for example, age is regarded as the explanatory variable E1, gender is regarded as the explanatory variable E2, the annual income is regarded as the explanatory variable E3, and the annual household income is regarded as the explanatory variable E4.

A practical example 1A will first be described with reference to FIGS. 9 to 11. The practical example 1A is an example in which a weighted overall correct answer percentage is calculated for each prediction algorithm and displayed as a graph, whereby the prediction algorithm offering better prediction accuracy (correct answer percentage) can be presented to the user in an understandable manner.

FIG. 9 is a graph indicating a weighted overall correct answer percentage for each prediction algorithm calculated in the practical example 1A. In the graph depicted in FIG. 9, the horizontal axis represents the weight variable w, and the vertical axis represents the overall correct answer percentage. This graph is displayed on the display 508 depicted in FIG. 5. In the example depicted in FIG. 9, four types of prediction algorithms (prediction equations) P1 to P4 are used.

In FIG. 9, whatever value the weight variable w takes, the correct answer percentage of the prediction algorithm P1 is the highest among the correct answer percentages of the prediction algorithms P1 to P4. Adopting the prediction algorithm P1, therefore, achieves the best prediction accuracy. As for the prediction algorithms P2 and P3, it is observed that the prediction algorithm P3 offers a better overall correct answer percentage when the weight variable w is in a range of $0 \leq w < wx$, while the prediction algorithm P2 offers a better overall correct answer percentage when the weight variable w is in a range of $wx < w \leq 1$.

For this reason, for example, when the weighted overall correct answer percentage is not determined for the prediction algorithm P1, if the user desires to emphasize the number of positive/positive cases more than the number of negative/negative cases, the user should use the prediction algorithm P2 of which the correct answer percentage becomes better as the value of the weight variable w becomes larger. If the user desires to emphasize the number of negative/negative cases more than the number of positive/positive cases, the user should use the prediction algorithm P3 of which the correct answer percentage (prediction accuracy) becomes better as the value of the weight variable w becomes smaller.

Observing that the prediction algorithm P4 is the lowest in correct answer percentage among the prediction algorithms P1 to P4, the user realizes that it is better not to adopt the prediction algorithm P4.

FIG. 10 is a flowchart of a data analysis procedure according to the practical example 1A. As depicted in FIG. 10, the data analyzing apparatus determines whether an unselected prediction algorithm is present (step S1001). If an unselected prediction algorithm is present (step S1001: YES), the data analyzing apparatus selects the unselected prediction algorithm (step S1002), and executes an evaluation process (step S1003). The details of the evaluation process (step S1003) will be described in FIG. 11.

Following the evaluation process (step S1003), the data analyzing apparatus returns to step S1001, and if an unselected prediction algorithm is not present (step S1001: NO), the data analyzing apparatus carries out the process of displaying a weighted overall correct answer percentage obtained for each prediction algorithm, in a graph, as depicted in FIG. 9 (step S1004), thereby ending the data analysis procedure of the practical example 1A.

FIG. 11 is a flowchart of a detailed procedure of the evaluation process (step S1003) depicted in FIG. 10, according to the practical example 1A. As depicted in FIG. 11, the data analyzing apparatus sets the number of times of random sampling i from a positive case data group and a negative case data group, to i=1 (step S1101). The upper limit to the number of times i is determined to be N, which means random sampling is carried out N times.

The data analyzing apparatus then determines whether i>N is satisfied (step S1102). If i>N is not satisfied (step S1102: NO), the data analyzing apparatus randomly samples K positive case data items and K negative case data items from the positive case data group and the negative case data group, respectively, as indicated at (1) in FIGS. 1 and 2 (step S1103).

The data analyzing apparatus then generates a prediction equation based on a prediction algorithm using basis-forming data groups resulting from the random sampling, as indicated at (21) in FIG. 2 (step S1104). Subsequently, the data analyzing apparatus substitutes evaluation-use data (measured value) into the generated prediction equation to calculate a predicted value for each evaluation-use data, as indicated at (22) in FIG. 2 (step S1105). The data analyzing apparatus then normalizes each calculated predicted value (step S1106).

Subsequently, the data analyzing apparatus identifies the number of positive/positive cases, the number of positive/negative cases, the number of negative/positive cases, and the number of negative/negative cases, as indicated at (23) in FIG. 2 (step S1107). The data analyzing apparatus then calculates a weighted partial correct answer percentage for the selected prediction algorithm, as indicated at (24) in FIG. 2 (step S1108). Subsequently, the data analyzing apparatus increments the value of i by 1 (step S1109), and proceeds to step S1102. The data analyzing apparatus repeats steps S1103 to S1109 until i>N is satisfied. As a result, N weighted partial correct answer percentages are calculated.

When i>N is satisfied (step S1102: YES), the data analyzing apparatus averages the N weighted partial correct answer percentages to calculate a weighted overall correct answer percentage (step S1110). Thus, a weighted overall correct answer percentage is calculated for the selected prediction algorithm. By executing the above evaluation process (step S1003) for each prediction algorithm, a weighted overall correct answer percentage for each prediction algorithm is calculated. Hence, graphic display as depicted in FIG. 9 can be carried out.

In this manner, according to the practical example 1A, the user is allowed to set the weight variable w in accordance with the degree of the user's interest in positive case data. In the practical example 1A, therefore, the prediction accuracy (correct answer percentage) of a prediction algorithm having the value of the weight variable w set by the user can be presented to the user in an understandable manner.

For example, in an application to circuit failure analysis, if the user has a question: "which prediction algorithm is to be adopted to cause the data analyzing apparatus to predict the normal operation of a circuit that is assumed to be normal or which prediction algorithm is to be adopted to cause the data analyzing apparatus to predict the failure of a circuit that is assumed to fail", the answer to the question can be presented in the form of graphic display in an understandable manner.

Whether "predict the normal operation of a circuit that is assumed to be normal" or "predict the failure of a circuit that is assumed to fail" is to be emphasized is determined by the user. For example, when the number of positive case (normal) data items Ma is larger than the number of negative case (failure) data items Mb, it is better to emphasize "predict the failure of a circuit that is assumed to fail". In such a case, the user sets the weight variable w low, and compares overall correct answer percentages of individual prediction algorithms having the value of the weight variable w set by the user.

In contrast, when the number of negative case (failure) data items Mb is larger than the number of positive case (normal) data items Ma, it is better to emphasize "predict the normal operation of a circuit that is assumed to be normal". In such a case, the user sets the weight variable w high, and compares overall correct answer percentages of individual prediction algorithms having the value of the weight variable w set by the user.

In an application to data analysis concerning recommendation of a product, if the user has a question: "which prediction algorithm is to be adopted to cause the data analyzing apparatus to predict 'purchase' by a customer who is expected to purchase the recommended product or which prediction algorithm is to be adopted to cause the data analyzing apparatus to predict 'no purchase' by a customer who is expected to not purchase the recommended product", the answer to the question can be presented in the form of graphic display in an understandable manner. Whether "predict 'purchase' by a customer who is expected to purchase the recommended product" or "predict 'no purchase' by a customer who is expected to not purchase the recommended product" is be emphasized is determined by the user.

For example, when the number of positive case (purchased) data items Ma is larger than the number of negative case (not purchased) data items Mb, it is better to emphasize "predict 'no purchase' by a customer who is expected to not purchase the recommended product". In such a case, the user sets the weight variable w low, and compares overall correct answer percentages of individual prediction algorithms having the value of the weight variable w set by the user.

In contrast, when the number of negative case (not purchased) data items Mb is larger than the number of positive case (purchased) data items Ma, it is better to emphasize "predict 'purchase' by a customer who is expected to purchase the recommended product". In such a case, the user sets the weight variable w high, and compares overall correct answer percentages of individual prediction algorithms having the value of the weight variable w set by the user.

In an application to a data analysis concerning financial credit assessment, if the user has a question: "which prediction algorithm is to be adopted to cause the data analyzing apparatus to predict 'repayment' by a customer who is expected to make repayment or which prediction algorithm is to be adopted to cause the data analyzing apparatus to predict 'no repayment' by a customer who is expected to not make repayment", the answer to the question can be presented in the form of graphic display in an understandable manner. Whether "predict 'repayment' by a customer who is expected to not make repayment" or "predict 'no repayment' by a customer who is expected to not make repayment" is be emphasized is determined by the user.

For example, when the number of positive case (repaid) data items Ma is larger than the number of negative case (not repaid) data items Mb, it is better to emphasize "predict 'no repayment' by a customer who is expected to not make repayment". In such a case, the user sets the weight variable w low, and compares overall correct answer percentages of individual prediction algorithms having the value of the weight variable w set by the user.

In contrast, when the number of negative case (not repaid) data items Mb is larger than the number of positive case (repaid) data items Ma, it is better to emphasize "predict 'repayment' by a customer who is expected to make repayment". In such a case, the user sets the weight variable w high, and compares overall correct answer percentages of individual prediction algorithms having the value of the weight variable w set by the user.

In this manner, according to the practical example 1A, prediction algorithms are compared at overall correct answer percentages corresponding to the degree of the user interest. As a result, a prediction algorithm with better prediction accuracy for the user can be presented in an understandable manner.

A practical example 1B will first be described with reference to FIGS. 12 and 13. The practical example 1B is an example in which a weighted overall erroneous answer percentage is calculated for each prediction algorithm and displayed as a graph, whereby the prediction algorithm offering better prediction accuracy (erroneous answer percentage) can be presented to the user in an understandable manner.

FIG. 12 is a graph indicating a weighted overall erroneous answer percentage for each prediction algorithm calculated in the practical example 1B. In the graph depicted in FIG. 12, the horizontal axis represents the weight variable w, and the vertical axis represents the overall erroneous answer percentage. This graph is displayed on the display 508 depicted in FIG. 5. In the example depicted in FIG. 12, four types of prediction algorithms (prediction equations) P1 to P4 are used.

In FIG. 12, whatever value the weight variable w takes, the erroneous answer percentage of the prediction algorithm P4 is the lowest among the erroneous answer percentages of the prediction algorithms P1 to P4. In other words, the lowest prediction accuracy is favorable. As for the prediction algorithms P2 and P3, it is observed that the prediction algorithm P2 offers a better overall erroneous answer percentage when the weight variable w is in a range of $0 \leq w < wx$, while the prediction algorithm P3 offers a better overall erroneous answer percentage when the weight variable w is in a range of $wx < w \leq 1$.

For this reason, for example, when the weighted overall erroneous answer percentage is not determined for the prediction algorithm P4, if the number of positive/negative cases is to be emphasized more than the number of negative/positive cases, the prediction algorithm P3 of which the erroneous answer percentage becomes better as the value of the weight variable w becomes larger, should be used. If the number of negative/positive cases is to be emphasized more than the number of positive/negative cases, the prediction algorithm P2 of which the erroneous answer percentage becomes better as the value of the weight variable w becomes smaller.

Observing that the prediction algorithm P1 is the highest in erroneous answer percentage among the prediction algorithms P1 to P4, the user realizes that it is better not to adopt the prediction algorithm P1.

A data analysis procedure according to the practical example 1B will next be described. The procedure depicted in FIG. 10 in this data analysis procedure is the same procedure as described in the practical example 1A, and description thereof is omitted. In the practical example 1B, the contents of the evaluation process (step S1003) of the practical example 1A are different and consequently, an evaluation process (step S1303) is executed in place of the evaluation process (step S1003).

FIG. 13 is a flowchart of a detailed procedure of the evaluation process (step S1003) depicted in FIG. 10, according to the practical example 1B. As depicted in FIG. 13, the data analyzing apparatus sets the number of times of random sampling i from a positive case data group and a negative case data group, to i=1 (step S1301). The upper limit to the number of times i is determined to be N, which means random sampling is carried out N times.

The data analyzing apparatus then determines whether i>N is satisfied (step S1302). If i>N is not satisfied (step S1302:

NO), the data analyzing apparatus randomly samples K positive case data items and K negative case data items from the positive case data group and the negative case data group, respectively, as indicated at (1) in FIGS. 3 and 4 (step S1303).

The data analyzing apparatus then generates a prediction equation based on a prediction algorithm using basis-forming data groups resulting from the random sampling, as indicated at (21) in FIG. 4 (step S1304). Subsequently, the data analyzing apparatus substitutes evaluation-use data (measured value) into the generated prediction equation to calculate a predicted value for each evaluation-use data, as indicated at (22) in FIG. 4 (step S1305). The data analyzing apparatus then normalizes each calculated predicted value (step S1306).

Subsequently, the data analyzing apparatus identifies the number of positive/positive cases, the number of positive/negative cases, the number of negative/positive cases, and the number of negative/negative cases, as indicated at (23) in FIG. 4 (step S1307). The data analyzing apparatus then calculates a weighted partial correct answer percentage for the selected prediction algorithm, as indicated at (24) in FIG. 4 (step S1308). Subsequently, the data analyzing apparatus increments the value of i by 1 (step S1309), and proceeds to step S1302. The data analyzing apparatus repeats steps S1303 to S1309 until i>N is satisfied. As a result, N weighted partial erroneous answer percentages are calculated.

When i>N is satisfied (step S1302: YES), the data analyzing apparatus averages the N weighted partial erroneous answer percentages to calculate a weighted overall erroneous answer percentage (step S1310). Thus, a weighted overall erroneous answer percentage is calculated for the selected prediction algorithm. By executing the above evaluation process (step S1003) for each prediction algorithm, a weighted overall erroneous answer percentage for each prediction algorithm is calculated. Hence, graphic display as depicted in FIG. 12 can be carried out.

In this manner, according to the practical example 1B, the user is allowed to set the weight variable w in accordance with the degree of the user's interest in negative case data. In the practical example 1B, therefore, the prediction accuracy (erroneous answer percentage) of a prediction algorithm having the value of the weight variable w set by the user can be presented to the user in an understandable manner.

For example, in an application to circuit failure analysis, if the user has a question: "which prediction algorithm is to be adopted to cause the data analyzing apparatus to predict the failure of a circuit that is assumed to be normal or which prediction algorithm is to be adopted to cause the data analyzing apparatus to predict the normal operation of a circuit that is assumed to be a failure", the answer to the question can be presented in the form of graphic display in an understandable manner.

Whether "predict the failure of a circuit that is assumed to be normal" or "predict the normal operation of a circuit that is assumed to fail" is to be emphasized is determined by the user. For example, when the number of positive case (normal) data items Ma is larger than the number of negative case (failure) data items Mb, it is better to emphasize "predict the normal operation of a circuit that is assumed to fail". In such a case, the user sets the weight variable w low, and compares overall erroneous answer percentages of individual prediction algorithms having the value of the weight variable w set by the user.

In contrast, when the number of negative case (failure) data items Mb is larger than the number of positive case (normal) data items Ma, it is better to emphasize "predict the failure of a circuit that is assumed to be normal". In such a case, the user sets the weight variable w high, and compares overall erroneous answer percentages of individual prediction algorithms having the value of the weight variable w set by the user.

In an application to data analysis concerning recommendation of a product, if the user has a question: "which prediction algorithm is to be adopted to cause the data analyzing apparatus to predict 'no purchase' by a customer who is expected to purchase the recommended product or which prediction algorithm is to be adopted to cause the data analyzing apparatus to predict 'no purchase' by a customer who is expected to purchase the recommended product", the answer to the question can be presented in the form of graphic display in an understandable manner.

Whether "predict 'no purchase' by a customer who is expected to purchase the recommended product" or "predict 'purchase' by a customer who is expected to not purchase the recommended product" is to be emphasized is determined by the user. For example, when the number of positive case (purchased) data items Ma is larger than the number of negative case (not purchased) data items Mb, it is better to emphasize "predict 'purchase' by a customer who is expected to not purchase the recommended product". In such a case, the user sets the weight variable w low, and compares overall erroneous answer percentages of individual prediction algorithms having the value of the weight variable w set by the user.

In contrast, when the number of negative case (not purchased) data items Mb is larger than the number of positive case (purchased) data items Ma, it is better to emphasize "predict 'no purchase' by a customer who is expected to purchase the recommended product". In such a case, the user sets the weight variable w high, and compares overall erroneous answer percentages of individual prediction algorithms having the value of the weight variable w set by the user.

In an application to a data analysis concerning financial credit assessment, if the user has a question: "which prediction algorithm is to be adopted to cause the data analyzing apparatus to predict 'no repayment' by a customer who is expected to make repayment or which prediction algorithm is to be adopted to cause the data analyzing apparatus to predict 'repayment' by a customer who is expected to not make repayment", the answer to the question can be presented in the form of graphic display in an understandable manner.

Whether "predict 'no repayment' by a customer who is expected to not make repayment" or "predict 'repayment' by a customer who is expected to not make repayment" is be emphasized is determined by the user. For example, when the number of positive case (repaid) data items Ma is larger than the number of negative case (not repaid) data items Mb, it is better to emphasize "predict 'repayment' by a customer who is expected to not make repayment". In such a case, the user sets the weight variable w low, and compares overall erroneous answer percentages of individual prediction algorithms having the value of the weight variable w set by the user.

In contrast, when the number of negative case (not repaid) data items Mb is larger than the number of positive case (repaid) data items Ma, it is better to emphasize "predict 'no repayment' by a customer who is expected to make repayment". In such a case, the user sets the weight variable w high, and compares overall erroneous answer percentages of individual prediction algorithms having the value of the weight variable w set by the user.

In this manner, according to the practical example 1B, prediction algorithms are compared at overall erroneous answer percentages corresponding to the degree of the user interest. As a result, a prediction algorithm with better prediction accuracy for the user can be presented in an understandable manner.

A practical example 2A is an example in which when one prediction algorithm is applied to an analysis, a weighted overall correct answer percentage is determined for each explanatory variable of an explanatory variable group and is displayed as a graph. According to this practical example, the explanatory variable that is related to an objective variable can be presented to the user in an understandable manner.

FIG. 14 is a graph indicating a weighted overall correct answer percentage for each prediction algorithm calculated in the practical example 2A. In the graph depicted in FIG. 14, the horizontal axis represents the weight variable w, and the vertical axis represents the overall correct answer percentage. This graph is displayed on the display 508 depicted in FIG. 5. In the example depicted in FIG. 14, four types of explanatory variables E1 to E4 are used.

In FIG. 14, whatever value the weight variable w takes, the correct answer percentage of the explanatory variable E1 is the highest among the correct answer percentages of the explanatory variable E1 to E4. Adopting the explanatory variable E1, therefore, achieves the best prediction accuracy. As for the explanatory variable E2 and E3, it is observed that the explanatory variable E3 offers a better overall correct answer percentage when the weight variable w is in a range of 0≤w<wx, while the explanatory variable E2 offers a better overall correct answer percentage when the weight variable w is in a range of wx<w≤1.

For this reason, for example, when the weighted overall correct answer percentage is not determined for the explanatory variable E1, if the user desires to emphasize the number of positive/positive cases more than the number of negative/negative cases, the user should use the explanatory variable E2 of which the correct answer percentage becomes better as the value of the weight variable w becomes larger. If the user desires to emphasize the number of negative/negative cases more than the number of positive/positive cases, the user should use the explanatory variable E3 of which the correct answer percentage (prediction accuracy) becomes better as the value of the weight variable w becomes smaller.

Observing that the explanatory variable E4 is the lowest in correct answer percentage among the explanatory variable E1 to E4, the user realizes that E4 is the least important explanatory variable.

FIG. 15 is a flowchart of a data analysis procedure according to the practical example 2A. As depicted in FIG. 15, the data analyzing apparatus determines whether an unselected explanatory variable is present (step S1501). If an unselected explanatory variable is present (step S1501: YES), the data analyzing apparatus selects the unselected explanatory variable (step S1502), and executes an evaluation process (step S1503). The details of the evaluation process (step S1503) are identical to those of the evaluation process (step S1003) described in FIG. 11, and description thereof is omitted. The evaluation process (step S1503) is executed on the selected explanatory variable.

Following the evaluation process (step S1503), the data analyzing apparatus returns to step S1501, and if an unselected explanatory variable is not present (step S1501: NO), the data analyzing apparatus carries out the process of displaying a weighted overall correct answer percentage obtained for each explanatory variable, in a graph, as depicted in FIG. 14 (step S1504), thereby ending the data analysis procedure of the practical example 2A.

In this manner, according to the practical example 2A, the user is allowed to set the weight variable w in accordance with the degree of the user's interest in positive case data. In the practical example 2A, therefore, the prediction accuracy (correct answer percentage) of an explanatory variable having the value of the weight variable w set by the user can be presented to the user in an understandable manner.

For example, in an application to circuit failure analysis, if the user has a question: "which explanatory variable is to be adopted to cause the prediction algorithm to predict the normal operation of a circuit that is assumed to be normal or which explanatory variable is to be adopted to cause the prediction algorithm to predict the failure of a circuit that is assumed to fail", the answer to the question can be presented in the form of graphic display in an understandable manner.

Whether "predict the normal operation of a circuit that is assumed to be normal" and "predict the failure of a circuit that is assumed to fail" is to be emphasized is determined by the user. For example, when the number of positive case (normal) data items Ma is larger than the number of negative case (failure) data items Mb, it is better to emphasize "predict the failure of a circuit that is assumed to fail". In such a case, the user sets the weight variable w low, and, for individual explanatory variables, compares overall correct answer percentages of prediction algorithms having the value of the weight variable w set by the user.

In contrast, when the number of negative case (failure) data items Mb is larger than the number of positive case (normal) data items Ma, it is better to emphasize "predict the normal operation of a circuit that is assumed to be normal". In such a case, the user sets the weight variable w high, and compares, for each explanatory variable, overall correct answer percentages of individual prediction algorithms having the value of the weight variable w set by the user.

In an application to data analysis concerning recommendation of a product, if the user has a question: "which explanatory variable is to be adopted to cause the prediction algorithm to predict 'purchase' by a customer who is expected to purchase the recommended product or which explanatory variable is to be adopted to cause the prediction algorithm to predict 'no purchase' by a customer who is expected to not purchase the recommended product", the answer to the question can be presented in the form of graphic display in an understandable manner.

Whether "predict 'purchase' by a customer who is expected to purchase the recommended product" or "predict 'no purchase' by a customer who is expected to not purchase the recommended product" should be emphasized is determined by the user. For example, when the number of positive case (purchased) data items Ma is larger than the number of negative case (not purchased) data items Mb, it is better to emphasize "predict 'no purchase' by a customer who is expected to not purchase the recommended product". In such a case, the user sets the weight variable w low, and compares, for each explanatory variable, overall correct answer percentages of individual prediction algorithms having the value of the weight variable w set by the user.

In contrast, when the number of negative case (not purchased) data items Mb is larger than the number of positive case (purchased) data items Ma, it is better to emphasize "predict 'purchase' by a customer who is expected to purchase the recommended product". In such a case, the user sets the weight variable w high, and compares, for each explanatory variable, overall correct answer percentages of individual prediction algorithms having the value of the weight variable w set by the user.

In an application to a data analysis concerning financial credit assessment, if the user has a question: "which explanatory variable is to be adopted to cause the prediction algorithm to predict 'repayment' by a customer who is expected to make repayment or which explanatory variable is to be adopted to cause the prediction algorithm to predict 'no repayment' by a customer who is expected to not make repayment", the answer to the question can be presented in the form of graphic display in an understandable manner.

Whether "predict 'repayment' by a customer who is expected to not make repayment" or "predict 'no repayment' by a customer who is expected to not make repayment" should be emphasized is determined by the user. For example, when the number of positive case (repaid) data items Ma is larger than the number of negative case (not repaid) data items Mb, it is better to emphasize "predict 'no repayment' by a customer who is expected to not make repayment". In such a case, the user sets the weight variable w low, and compares, for each explanatory variable, overall correct answer percentages of individual prediction algorithms having the value of the weight variable w set by the user.

In contrast, when the number of negative case (not repaid) data items Mb is larger than the number of positive case (repaid) data items Ma, it is better to emphasize "predict 'repayment' by a customer who is expected to make repayment". In such a case, the user sets the weight variable w high, and compares, for each explanatory variable, overall correct answer percentages of individual prediction algorithms having the value of the weight variable w set by the user.

In this manner, according to the practical example 2A, prediction algorithms are compared for each explanatory variable at overall correct answer percentages corresponding to the degree of the user interest. As a result, an explanatory variable improving the prediction accuracy of a prediction algorithm can be presented in a user-friendly manner.

A practical example 2B is an example in which when one prediction algorithm is applied to an analysis, a weighted overall correct answer percentage is determined for each explanatory variable of an explanatory variable group and is displayed as a graph. According to this practical example, the explanatory variable that is related to an objective variable can be presented to the user in an understandable manner.

FIG. 16 is a graph indicating a weighted overall erroneous answer percentage for each prediction algorithm calculated in the practical example 2B. In the graph depicted in FIG. 16, the horizontal axis represents the weight variable w, and the vertical axis represents the overall erroneous answer percentage. This graph is displayed on the display 508 depicted in FIG. 5. In the example depicted in FIG. 16, four types of explanatory variables E1 to E4 are used.

In FIG. 16, whatever value the weight variable w takes, the erroneous answer percentage of the explanatory variable E4 is the lowest among the erroneous answer percentages of the explanatory variable E1 to E4. Adopting the explanatory variable E4, therefore, achieves the best prediction accuracy. As for the explanatory variable E2 and E3, it is observed that the explanatory variable E2 offers a better overall erroneous answer percentage when the weight variable w is in a range of $0 \leq w < wx$, while the explanatory variable E3 offers a better overall erroneous answer percentage when the weight variable w is in a range of $wx < w \leq 1$.

For this reason, for example, when the weighted overall erroneous answer percentage is not determined for the explanatory variable E4, if the user desires to emphasize the number of positive/negative cases more than the number of negative/positive cases, the user should use the explanatory variable E3 of which the erroneous answer percentage becomes better as the value of the weight variable w becomes larger. If the user desires to emphasize the number of negative/positive cases more than the number of positive/negative cases, the user should use the explanatory variable E2 of which the erroneous answer percentage (prediction accuracy) becomes better as the value of the weight variable w becomes smaller.

Observing that the explanatory variable E1 is the highest in erroneous answer percentage among the explanatory variable E1 to E4, the user realizes that E1 is the least important explanatory variable.

A data analysis procedure according to the practical example 2B is identical to the procedure depicted in FIG. 15, excluding the details of the evaluation process (step S1503). In the practical example 2B, the details of the evaluation process (step S1503) is equivalent to the details of the evaluation process (step S1003) depicted in FIG. 13. The evaluation process (step S1503) is executed on a selected explanatory variable.

In this manner, according to the practical example 2B, the user is allowed to set the weight variable w in accordance with the degree of the user's interest in negative case data. In the practical example 2B, therefore, the prediction accuracy (erroneous answer percentage) of an explanatory variable having the value of the weight variable w set by the user can be presented to the user in an understandable manner.

For example, in an application to circuit failure analysis, if the user has a question: "which explanatory variable is to be adopted to cause the prediction algorithm to predict the failure of a circuit that is assumed to be normal or which explanatory variable is to be adopted to cause the prediction algorithm to predict the normal operation of a circuit that is assumed to fail", the answer to the question can be presented in the form of graphic display in an understandable manner.

Whether "predict the failure operation of a circuit that is assumed to be normal" and "predict the normal operation of a circuit that is assumed to fail" is to be emphasized is determined by the user. For example, when the number of positive case (normal) data items Ma is larger than the number of negative case (failure) data items Mb, it is better to emphasize "predict the normal of a circuit that is assumed to fail". In such a case, the user sets the weight variable w low, and, for individual explanatory variables, compares overall erroneous answer percentages of prediction algorithms having the value of the weight variable w set by the user.

In contrast, when the number of negative case (failure) data items Mb is larger than the number of positive case (normal) data items Ma, it is better to emphasize "predict the failure operation of a circuit that is assumed to be normal". In such a case, the user sets the weight variable w high, and compares, for each explanatory variable, overall erroneous answer percentages of individual prediction algorithms having the value of the weight variable w set by the user.

In an application to data analysis concerning recommendation of a product, if the user has a question: "which explanatory variable is to be adopted to cause the prediction algorithm to predict 'no purchase' by a customer who is expected to purchase the recommended product or which explanatory variable is to be adopted to cause the prediction algorithm to predict 'purchase' by a customer who is expected to not purchase the recommended product", the answer to the question can be presented in the form of graphic display in an understandable manner.

Whether "predict 'no purchase' by a customer who is expected to purchase the recommended product" or "predict 'purchase' by a customer who is expected to not purchase the recommended product" should be emphasized is determined by the user. For example, when the number of positive case (purchased) data items Ma is larger than the number of negative case (not purchased) data items Mb, it is better to emphasize "predict 'purchase' by a customer who is expected to not purchase the recommended product". In such a case, the user sets the weight variable w low, and compares, for each explanatory variable, overall erroneous answer percentages of individual prediction algorithms having the value of the weight variable w set by the user.

In contrast, when the number of negative case (not purchased) data items Mb is larger than the number of positive case (purchased) data items Ma, it is better to emphasize "predict 'no purchase' by a customer who is expected to purchase the recommended product". In such a case, the user sets the weight variable w high, and compares, for each explanatory variable, overall erroneous answer percentages of individual prediction algorithms having the value of the weight variable w set by the user.

In an application to a data analysis concerning financial credit assessment, if the user has a question: "which explanatory variable is to be adopted to cause the prediction algorithm to predict 'no repayment' by a customer who is expected to make repayment or which explanatory variable is to be adopted to cause the prediction algorithm to predict 'repayment' by a customer who is expected to not make repayment", the answer to the question can be presented in the form of graphic display in an understandable manner.

Whether "predict 'no repayment' by a customer who is expected to make repayment" or "predict 'repayment' by a customer who is expected to not make repayment" should be emphasized is determined by the user. For example, when the number of positive case (repaid) data items Ma is larger than the number of negative case (not repaid) data items Mb, it is better to emphasize "predict 'repayment' by a customer who is expected to not make repayment". In such a case, the user sets the weight variable w low, and compares, for each explanatory variable, overall erroneous answer percentages of individual prediction algorithms having the value of the weight variable w set by the user.

In contrast, when the number of negative case (not repaid) data items Mb is larger than the number of positive case (repaid) data items Ma, it is better to emphasize "predict 'no repayment' by a customer who is expected to make repayment". In such a case, the user sets the weight variable w high, and compares, for each explanatory variable, overall erroneous answer percentages of individual prediction algorithms having the value of the weight variable w set by the user.

In this manner, according to the practical example 2B, prediction algorithms are compared for each explanatory variable at overall erroneous answer percentages corresponding to the degree of the user interest. As a result, an explanatory variable improving the prediction accuracy of a prediction algorithm can be presented in a user-friendly manner.

A practical example 3A is an example in which when one prediction algorithm is applied to an analysis, weighted overall correct answer percentages are determined for groupings of the explanatory variables. Each group is formed by the explanatory variables that remain after any one explanatory variable is eliminated from the overall group of explanatory variables. The weighted overall correct answer percentages determined for the groups of remaining explanatory variables are displayed as a graph. According to this practical example, an explanatory variable that is insignificant in its relation to an objective variable can be presented to the user in an understandable manner.

FIG. 17 is a graph indicating a weighted overall correct answer percentage for each remaining explanatory variable in the practical example 3A. In the graph depicted in FIG. 17, the horizontal axis represents the weight variable w, and the vertical axis represents the overall correct answer percentage. This graph is displayed on the display 508 depicted in FIG. 5.

In the example depicted in FIG. 17, four types of remaining explanatory variable groups {E2 to E4}, {E1, E3, E4}, {E1, E2, E4}, and {E1 to E3} are used.

In FIG. 17, whatever value the weight variable w takes, the correct answer percentage for a remaining explanatory variable group {E2 to E4} is the highest among correct answer percentages for the remaining explanatory variable groups {E2 to E4}, {E1, E3, E4}, {E1, E2, E4}, and {E1 to E3}. This demonstrates that the explanatory variable E1 is the most insignificant explanatory variable. As for the remaining explanatory variable groups {E1, E3, E4} and {E1, E2, E4}, the explanatory variable group {E1, E2, E4} offers a better correct answer percentage when the weight variable is in a range of $0 \leq w < wx$, while the explanatory variable group {E1, E3, E4} offers a better correct answer percentage when the weight variable is in a range of $wx < w \leq 1$.

For this reason, for example, when the weighted overall correct answer percentage is not determined for the remaining explanatory variable group {E2 to E4}, if the user desires to emphasize the number of positive/positive cases more than the number of negative/negative cases, the user should use the remaining explanatory variable group {E1, E3, E4} of which the correct answer percentage becomes better as the value of the weight variable w becomes larger. If the user desires to emphasize the number of negative/negative cases more than the number of positive/positive cases, the user should use the remaining explanatory variable group {E1, E2, E4} of which the correct answer percentage (prediction accuracy) becomes better as the value of the weight variable w becomes smaller.

Observing that the remaining explanatory variable group {E1 to E3} is the lowest in correct answer percentage among the remaining explanatory variable groups {E2 to E4}, {E1, E3, E4}, {E1, E2, E4}, and {E1 to E3}, the user realizes that it is not good strategy not to select E4.

FIG. 18 is a flowchart of a data analysis procedure according to the practical example 3A. As depicted in FIG. 18, the data analyzing apparatus determines whether an unselected explanatory variable is present (step S1801). If an unselected explanatory variable is present (step S1801: YES), the data analyzing apparatus selects the unselected explanatory variable (step S1802), and selects the group of explanatory variables that remain after elimination of the selected explanatory variable (step S1803). The data analyzing apparatus then executes an evaluation process (step S1804). The details of this evaluation process (step S1804) are identical to those of the evaluation process (step S1003) described in FIG. 11, and description thereof is omitted. The evaluation process (step S1804) is executed on the selected remaining explanatory variable group.

Following the evaluation process (step S1804), the data analyzing apparatus returns to step S1801, and if an unselected explanatory variable is not present (step S1801: NO), the data analyzing apparatus carries out the process of displaying a weighted overall correct answer percentage obtained for each remaining explanatory variable group, in a graph, as depicted in FIG. 17 (step S1805), thereby ending the data analysis procedure of the practical example 3A.

In this manner, according to the practical example 3A, the user is allowed to set the weight variable w in accordance with the degree of the user's interest in positive case data. In the practical example 3A, therefore, the prediction accuracy (correct answer percentage) of an each remaining explanatory variable group having the value of the weight variable w set by the user can be presented to the user in an understandable manner.

For example, in an application to circuit failure analysis, if the user has a question: "which explanatory variable should not be adopted to cause the prediction algorithm to predict the normal operation of a circuit that is assumed to be normal or which explanatory variable should not be adopted to cause the prediction algorithm to predict the failure of a circuit that is assumed to fail", the answer to the question can be presented in the form of graphic display in an understandable manner.

Whether "predict the normal operation of a circuit that is assumed to be normal" and "predict the failure of a circuit that is assumed to fail" is to be emphasized is determined by the user. For example, when the number of positive case (normal) data items Ma is larger than the number of negative case (failure) data items Mb, it is better to emphasize "predict the failure of a circuit that is assumed to fail". In such a case, the user sets the weight variable w low, and, for individual remaining explanatory variable groups, compares overall correct answer percentages of prediction algorithms having the value of the weight variable w set by the user.

In contrast, when the number of negative case (failure) data items Mb is larger than the number of positive case (normal) data items Ma, it is better to emphasize "predict the normal operation of a circuit that is assumed to be normal". In such a case, the user sets the weight variable w high, and compares, for each remaining explanatory variable group, overall correct answer percentages of individual prediction algorithms having the value of the weight variable w set by the user.

In an application to data analysis concerning recommendation of a product, if the user has a question: "which explanatory variable should not be adopted to cause the prediction algorithm to predict 'purchase' by a customer who is expected to purchase the recommended product or which explanatory variable should not be adopted to cause the prediction algorithm to predict 'no purchase' by a customer who is expected to not purchase the recommended product", the answer to the question can be presented in the form of graphic display in an understandable manner.

Whether "predict 'purchase' by a customer who is expected to purchase the recommended product" or "predict 'no purchase' by a customer who is expected to not purchase the recommended product" should be emphasized is determined by the user. For example, when the number of positive case (purchased) data items Ma is larger than the number of negative case (not purchased) data items Mb, it is better to emphasize "predict 'no purchase' by a customer who is expected to not purchase the recommended product". In such a case, the user sets the weight variable w low, and compares, for each remaining explanatory variable group, overall correct answer percentages of individual prediction algorithms having the value of the weight variable w set by the user.

In contrast, when the number of negative case (not purchased) data items Mb is larger than the number of positive case (purchased) data items Ma, it is better to emphasize "predict 'purchase' by a customer who is expected to purchase the recommended product". In such a case, the user sets the weight variable w high, and compares, for each remaining explanatory variable group, overall correct answer percentages of individual prediction algorithms having the value of the weight variable w set by the user.

In an application to a data analysis concerning financial credit assessment, if the user has a question: "which explanatory variable should not be adopted to cause the prediction algorithm to predict 'repayment' by a customer who is expected to make repayment or which explanatory variable should not be adopted to cause the prediction algorithm to predict 'no repayment' by a customer who is expected to not make repayment", the answer to the question can be presented in the form of graphic display in an understandable manner.

Whether "predict 'repayment' by a customer who is expected to not make repayment" or "predict 'no repayment' by a customer who is expected to not make repayment" should be emphasized is determined by the user. For example, when the number of positive case (repaid) data items Ma is larger than the number of negative case (not repaid) data items Mb, it is better to emphasize "predict 'no repayment' by a customer who is expected to not make repayment". In such a case, the user sets the weight variable w low, and compares, for each remaining explanatory variable group, overall correct answer percentages of individual prediction algorithms having the value of the weight variable w set by the user.

In contrast, when the number of negative case (not repaid) data items Mb is larger than the number of positive case (repaid) data items Ma, it is better to emphasize "predict 'repayment' by a customer who is expected to make repayment". In such a case, the user sets the weight variable w high, and compares, for each remaining explanatory variable group, overall correct answer percentages of individual prediction algorithms having the value of the weight variable w set by the user.

In this manner, according to the practical example 3A, prediction algorithms are compared for each remaining explanatory variable group at overall correct answer percentages corresponding to the degree of the user interest. As a result, an unnecessary explanatory variable for improving the prediction accuracy of a prediction algorithm can be presented in a user-friendly manner.

A practical example 3B is an example in which when one prediction algorithm is applied to an analysis, a weighted overall correct answer percentage is determined for each explanatory variable of an explanatory variable group and is displayed as a graph. According to this practical example, the explanatory variable that is related to an objective variable can be presented to the user in an understandable manner.

FIG. 19 is a graph indicating a weighted overall correct answer percentage for each explanatory variable in the practical example 3B. In the graph depicted in FIG. 19, the horizontal axis represents the weight variable w, and the vertical axis represents the overall erroneous answer percentage. This graph is displayed on the display 508 depicted in FIG. 5. In the example depicted in FIG. 19, four types of remaining explanatory variable groups {E2 to E4}, {E1, E3, E4}, {E1, E2, E4}, and {E1 to E3} are used.

In FIG. 19, whatever value the weight variable w takes, the correct answer percentage for a remaining explanatory variable group {E2 to E4} is the highest among erroneous answer percentages for the remaining explanatory variable groups {E2 to E4}, {E1, E3, E4}, {E1, E2, E4}, and {E1 to E3}. This demonstrates that the explanatory variable E1 is the most significant explanatory variable. As for the remaining explanatory variable groups {E1, E3, E4} and {E1, E2, E4}, the explanatory variable group {E1, E3, E4} offers a better erroneous answer percentage when the weight variable is in a range of $0 \le w < wx$, while the explanatory variable group {E1, E2, E4} offers a better erroneous answer percentage when the weight variable is in a range of $wx < w \le 1$.

For this reason, for example, when the weighted overall erroneous answer percentage is not determined for the remaining explanatory variable group {E1 to E3}, if the user desires to emphasize the number of positive/negative cases more than the number of negative/positive cases, the user should use the remaining explanatory variable group {E1, E2, E4} of which the erroneous answer percentage becomes better as the value of the weight variable w becomes larger. If the user desires to emphasize the number of negative/positive cases more than the number of positive/negative cases, the user should use the remaining explanatory variable group {E1, E3, E4} of which the erroneous answer percentage (prediction accuracy) becomes better as the value of the weight variable w becomes smaller.

Observing that the remaining explanatory variable group {E1 to E3} is the lowest in erroneous answer percentage among the remaining explanatory variable groups {E2 to E4}, {E1, E3, E4}, {E1, E2, E4}, and {E1 to E3}, the user realizes that E4 is the least significant explanatory variable.

A data analysis procedure according to the practical example 3B is identical to the procedure depicted in FIG. 18, excluding the details of the evaluation process (step S1804). In the practical example 3B, the details of the evaluation process (step S1804) is equivalent to the details of the evaluation process (step S1003) depicted in FIG. 13. The evaluation process (step S1804) is executed on a selected remaining explanatory variable group.

In this manner, according to the practical example 3B, the user is allowed to set the weight variable w in accordance with the degree of the user's interest in negative case data. In the practical example 3B, therefore, the prediction accuracy (erroneous answer percentage) of an each remaining explanatory variable group having the value of the weight variable w set by the user can be presented to the user in an understandable manner.

For example, in an application to circuit failure analysis, if the user has a question: "lack of which explanatory variable causes the prediction algorithm to predict the failure of a circuit that is assumed to be normal or lack of which explanatory variable causes the prediction algorithm to predict the normal operation of a circuit that is assumed to fail", the answer to the question can be presented in the form of graphic display in an understandable manner.

Whether "predict the failure of a circuit that is assumed to be normal" and "predict the normal operation of a circuit that is assumed to fail" is to be emphasized is determined by the user. For example, when the number of positive case (normal) data items Ma is larger than the number of negative case (failure) data items Mb, it is better to emphasize "predict the normal operation of a circuit that is assumed to fail". In such a case, the user sets the weight variable w low, and, for individual remaining explanatory variable groups, compares overall erroneous answer percentages of prediction algorithms having the value of the weight variable w set by the user.

In contrast, when the number of negative case (failure) data items Mb is larger than the number of positive case (normal) data items Ma, it is better to emphasize "predict the failure of a circuit that is assumed to be normal". In such a case, the user sets the weight variable w high, and compares, for each remaining explanatory variable group, overall erroneous answer percentages of individual prediction algorithms having the value of the weight variable w set by the user.

In an application to data analysis concerning recommendation of a product, if the user has a question: "lack of which explanatory variable causes the prediction algorithm to predict 'no purchase' by a customer who is expected to purchase the recommended product or lack of which explanatory variable causes the prediction algorithm to predict 'purchase' by a customer who is expected to not purchase the recommended product", the answer to the question can be presented in the form of graphic display in an understandable manner.

Whether "predict 'no purchase' by a customer who is expected to purchase the recommended product" or "predict 'purchase' by a customer who is expected to not purchase the recommended product" should be emphasized depends on the user. For example, when the number of positive case (purchased) data items Ma is larger than the number of negative case (not purchased) data items Mb, it is better to emphasize "predict 'purchase' by a customer who is expected to not purchase the recommended product". In such a case, the user sets the weight variable w low, and compares, for each remaining explanatory variable group, overall erroneous answer percentages of individual prediction algorithms having the value of the weight variable w set by the user.

In contrast, when the number of negative case (not purchased) data items Mb is larger than the number of positive case (purchased) data items Ma, it is better to emphasize "predict 'no purchase' by a customer who is expected to purchase the recommended product". In such a case, the user sets the weight variable w high, and compares, for each remaining explanatory variable group, overall erroneous answer percentages of individual prediction algorithms having the value of the weight variable w set by the user.

In an application to a data analysis concerning financial credit assessment, if the user has a question: "lack of which explanatory variable causes the prediction algorithm to predict 'no repayment' by a customer who is expected to make repayment or lack of which explanatory variable causes the prediction algorithm to predict 'repayment' by a customer who is expected to not make repayment", the answer to the question can be presented in the form of graphic display in an understandable manner.

Whether "predict 'no repayment' by a customer who is expected to not make repayment" or "predict 'repayment' by a customer who is expected to not make repayment" should be emphasized is determined by the user. For example, when the number of positive case (repaid) data items Ma is larger than the number of negative case (not repaid) data items Mb, it is better to emphasize "predict 'repayment' by a customer who is expected to not make repayment". In such a case, the user sets the weight variable w low, and compares, for each remaining explanatory variable group, overall erroneous answer percentages of individual prediction algorithms having the value of the weight variable w set by the user.

In contrast, when the number of negative case (not repaid) data items Mb is larger than the number of positive case (repaid) data items Ma, it is better to emphasize "predict 'no repayment' by a customer who is expected to make repayment". In such a case, the user sets the weight variable w high, and compares, for each remaining explanatory variable group, overall erroneous answer percentages of individual prediction algorithms having the value of the weight variable w set by the user.

In this manner, according to the practical example 3B, prediction algorithms are compared for each remaining explanatory variable group at overall erroneous answer percentages corresponding to the degree of the user interest. As a result, an unnecessary explanatory variable for improving the prediction accuracy of a prediction algorithm can be presented in a user-friendly manner.

A practical example 4A is an example in which for each prediction algorithm, an overall correct answer percentage is determined for each explanatory variable and is displayed as a graph. In other words, the practical example 4A is a combination of the practical example 1A and the practical example 2A. In the practical example 4A, the value of the weight variable w is specified in advance. In this example, for each combination of a prediction algorithm and an explanatory variable, indication of which explanatory variable that if adopted would improve the prediction accuracy (correct answer percentage) of which prediction algorithm can be presented to the user in an understandable manner.

FIG. 20 is a graph 508 indicating an overall correct answer percentage for each combination of a prediction algorithm and an explanatory variable in the practical example 4A. In the graph depicted in FIG. 20, the horizontal axis represents the explanatory variable, and the vertical axis represents the overall correct answer percentage. This graph is displayed on the display 508 depicted in FIG. 5. In the example depicted in FIG. 20, four types of predication algorithms P1 to P4 and four types of explanatory variables E1 to E4 are used.

FIG. 20 is a graph that for each of the prediction algorithms P1 to P4, indicates overall correct answer percentages that result when the explanatory variables E1 to E4 are adopted. For example, the prediction algorithm P1 comes to have the best prediction accuracy when the explanatory variables E2 to E4 are adopted, but comes to have the worst prediction accuracy when the explanatory variable E1 is adopted.

In this manner, when Q prediction algorithms and R explanatory variables are present, a graph exhibiting Q×R combinations of prediction algorithms and explanatory variables can be made. Hence, the combination that makes the correct answer percentage better and the combination makes the correct answer percentage worse can be presented in an understandable manner.

FIG. 21 is a flowchart of a data analysis procedure according to the practical example 4A. In FIG. 21, the value of the weight variable w is preliminarily specified. The data analyzing apparatus determines whether an unselected prediction algorithm is present (step S2101). If an unselected prediction algorithm is present (step S2101: YES), the data analyzing apparatus selects the unselected prediction algorithm (step S2102).

Subsequently, the data analyzing apparatus determines whether an unselected explanatory variable is present for the selected prediction algorithm (step S2103). If an unselected explanatory variable is present (step S2103: YES), the data analyzing apparatus selects the unselected explanatory variable (step S2104), and executes an evaluation process (step S2105). The details of this evaluation process (step S2105) are identical to those of the evaluation process (step S1003) described in FIG. 11, and description thereof is omitted. The evaluation process (step S2105) is executed on a combination of the selected prediction algorithm and the selected explanatory variable.

Following the evaluation process (step S2105), the data analyzing apparatus returns to step S2103, and if an unselected explanatory variable is not present (step S2103: NO), the data analyzing apparatus returns to step S2101, and determines whether an unselected prediction algorithm is present (step S2101). If an unselected prediction algorithm is not present (step S2101: NO), the data analyzing apparatus caries out the process of displaying an overall correct answer percentage obtained for each combination of a prediction algorithm and an explanatory variable on a graph, as depicted in FIG. 20 (step S2106), thereby ending the data analysis procedure of the practical example 4A.

In this manner, according to the practical example 4A, with the value of the weight variable w set by the user, the prediction accuracy (correct answer percentage) of the prediction algorithm for each explanatory variable can be presented to the user in an understandable manner, for each prediction algorithm, according to the degree of the user's interest in positive case data.

For example, in an application to circuit failure analysis, if the user has a question: "which explanatory variable and which prediction algorithm should be adopted to cause the prediction algorithm to predict the normal operation of a circuit that is assumed to be normal or which explanatory variable and which prediction algorithm should be adopted to cause the prediction algorithm to predict the failure of a circuit that is assumed to fail", the answer to the question can be presented in the form of graphic display in an understandable manner.

Whether "predict the normal operation of a circuit that is assumed to be normal" or "predict the failure of a circuit that is assumed to fail" is to be emphasized is determined by the user. For example, when the number of positive case (normal) data items Ma is larger than the number of negative case (failure) data items Mb, it is better to emphasize "predict the failure of a circuit that is assumed to fail". In such a case, the user sets the weight variable w low, and compares, for each combination of prediction algorithm and explanatory variable, overall correct answer percentages of individual prediction algorithms having the value of the weight variable w set by the user.

In contrast, when the number of negative case (failure) data items Mb is larger than the number of positive case (normal) data items Ma, it is better to emphasize "predict the normal operation of a circuit that is assumed to be normal". In such a case, the user sets the weight variable w high, and compares, for each combination of prediction algorithm and explanatory variable, overall correct answer percentages of individual prediction algorithms having the value of the weight variable w set by the user.

In an application to data analysis concerning recommendation of a product, if the user has a question: "which prediction algorithm is to be adopted to cause the prediction algorithm to predict 'purchase' by a customer who is expected to purchase the recommended product or which explanatory variable and which prediction algorithm should be adopted to cause the prediction algorithm to predict 'no purchase' by a customer who is expected to not purchase the recommended product", the answer to the question can be presented in the form of graphic display in an understandable manner.

Whether "predict 'purchase' by a customer who is expected to purchase the recommended product" or "predict 'no purchase' by a customer who is expected to not purchase the recommended product" is be emphasized is determined by the user. For example, when the number of positive case (purchased) data items Ma is larger than the number of negative case (not purchased) data items Mb, it is better to emphasize "predict 'no purchase' by a customer who is expected to not purchase the recommended product". In such a case, the user sets beforehand the weight variable w low, and compares, for each combination of prediction algorithm and explanatory variable, overall correct answer percentages of individual prediction algorithms having the value of the weight variable w set by the user.

In contrast, when the number of negative case (not purchased) data items Mb is larger than the number of positive case (purchased) data items Ma, it is better to emphasize "predict 'purchase' by a customer who is expected to purchase the recommended product". In such a case, the user sets beforehand the weight variable w high, and compares, for each combination of prediction algorithm and explanatory variable, overall correct answer percentages of individual prediction algorithms having the value of the weight variable w set by the user.

In an application to a data analysis concerning financial credit assessment, if the user has a question: "which explanatory variable and which prediction algorithm should be adopted to cause the prediction algorithm to predict 'repayment' by a customer who is expected to make repayment or which explanatory variable and which prediction algorithm should be adopted to cause the prediction algorithm to predict 'no repayment' by a customer who is expected to not make repayment", the answer to the question can be presented in the form of graphic display in an understandable manner.

Whether "predict 'repayment' by a customer who is expected to not make repayment" or "predict 'no repayment' by a customer who is expected to not make repayment" is be emphasized is determined by the user. For example, when the number of positive case (repaid) data items Ma is larger than the number of negative case (not repaid) data items Mb, it is better to emphasize "predict 'no repayment' by a customer who is expected to not make repayment". In such a case, the user sets beforehand the weight variable w low, and compares, for each explanatory variable, overall correct answer percentages of individual prediction algorithms having the value of the weight variable w set by the user.

In contrast, when the number of negative case (not repaid) data items Mb is larger than the number of positive case (repaid) data items Ma, it is better to emphasize "predict 'repayment' by a customer who is expected to make repayment". In such a case, the user sets beforehand the weight variable w high, and compares, for each explanatory variable, overall correct answer percentages of individual prediction algorithms having the value of the weight variable w set by the user.

In this manner, according to the practical example 4A, overall correct answer percentages corresponding to the user's degrees of interest are compared for individual combinations of prediction algorithms and explanatory variables. Hence, indication of which combination if adopted would make the correct answer percentage better and which combination if adopted would make the correct answer percentage worse can be presented to the user in an understandable manner.

A practical example 4B is an example in which for each prediction algorithm, an overall erroneous answer percentage is determined for each explanatory variable and is displayed as a graph. In other words, the practical example 4B is a combination of the practical example 1B and the practical example 2B. In the practical example 4B, the value of the weight variable w is specified in advance. In this example, for each combination of a prediction algorithm and an explanatory variable, indication of which explanatory variable that if adopted would improve the prediction accuracy (erroneous answer percentage) of which prediction algorithm can be presented to the user in an understandable manner.

Figure 22:
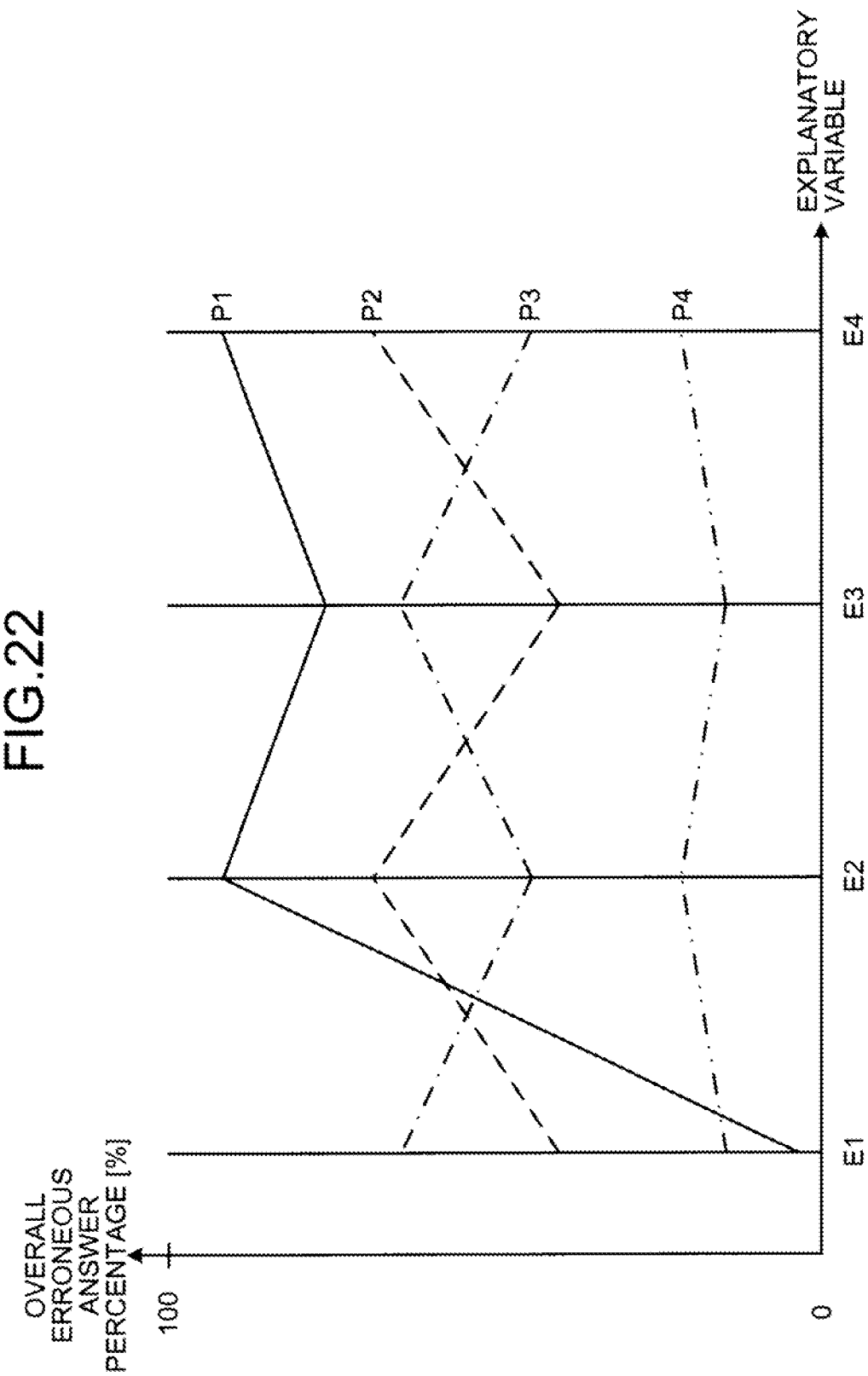
FIG. 22 is a graph 508 indicating an overall erroneous answer percentage for each combination of a prediction algorithm and an explanatory variable in the practical example 4B.

FIG. 22 is a graph 508 indicating an overall erroneous answer percentage for each combination of a prediction algorithm and an explanatory variable in the practical example 4B. In the graph depicted in FIG. 22, the horizontal axis represents the explanatory variable, and the vertical axis represents the overall erroneous answer percentage. This graph is displayed on the display 508 depicted in FIG. 5. In the example depicted in FIG. 22, four types of predication algorithms P1 to P4 and four types of explanatory variables E1 to E4 are used.

FIG. 22 is a graph that for each of the prediction algorithms P1 to P4, indicates overall erroneous answer percentages that result when the explanatory variables E1 to E4 are adopted. For example, the prediction algorithm P1 comes to have the best prediction accuracy when the explanatory variables E2 to E4 are adopted, but comes to have the worst prediction accuracy when the explanatory variable E1 is adopted.

In this manner, when Q prediction algorithms and R explanatory variables are present, a graph exhibiting Q×R combinations of prediction algorithms and explanatory variables can be made. Hence, the combination that makes the erroneous answer percentage better and the combination makes the erroneous answer percentage worse can be presented in an understandable manner.

A data analysis procedure according to the practical example 4B is identical to the procedure depicted in FIG. 21, excluding the details of the evaluation process (step S2105). In the practical example 4B, the details of the evaluation process (step S2105) is equivalent to the details of the evaluation process (step S1003) depicted in FIG. 13. The evaluation process (step S2105) is executed on a combination of a predication algorithm an explanatory variable.

In this manner, according to the practical example 4B, with the value of the weight variable w set by the user, the prediction accuracy (erroneous answer percentage) of the prediction algorithm for each explanatory variable can be presented to the user in an understandable manner, for each prediction algorithm, according to the degree of the user's interest in negative case data.

For example, in an application to circuit failure analysis, if the user has a question: "which explanatory variable and which prediction algorithm cause the prediction algorithm to predict the failure of a circuit that is assumed to be normal or which explanatory variable and which prediction algorithm cause the prediction algorithm to predict the normal operation of a circuit that is assumed to fail", the answer to the question can be presented in the form of graphic display in an understandable manner.

Whether "predict the failure of a circuit that is assumed to be normal" or "predict the normal operation of a circuit that is assumed to fail" is to be emphasized is determined by the user. For example, when the number of positive case (normal) data items Ma is larger than the number of negative case (failure) data items Mb, it is better to emphasize "predict the normal operation of a circuit that is assumed to fail". In such a case, the user sets the weight variable w low, and compares, for each explanatory variable, overall erroneous answer percentages of individual prediction algorithms having the value of the weight variable w set by the user.

In contrast, when the number of negative case (failure) data items Mb is larger than the number of positive case (normal) data items Ma, it is better to emphasize "predict the failure of a circuit that is assumed to be normal". In such a case, the user sets the weight variable w high, and compares, for each explanatory variable, overall erroneous answer percentages of individual prediction algorithms having the value of the weight variable w set by the user.

In an application to data analysis concerning recommendation of a product, if the user has a question: "which prediction algorithm is to be adopted to cause the prediction algorithm to predict 'no purchase' by a customer who is expected to purchase the recommended product or which explanatory variable and which prediction algorithm should be adopted to cause the prediction algorithm to predict 'purchase' by a customer who is expected to not purchase the recommended product", the answer to the question can be presented in the form of graphic display in an understandable manner.

Whether "predict 'no purchase' by a customer who is expected to purchase the recommended product" or "predict 'purchase' by a customer who is expected to not purchase the recommended product" is be emphasized is determined by the user. For example, when the number of positive case (purchased) data items Ma is larger than the number of negative case (not purchased) data items Mb, it is better to emphasize "predict 'no purchase' by a customer who is expected to not purchase the recommended product". In such a case, the user sets beforehand the weight variable w low, and compares, for each explanatory variable, overall erroneous answer percentages of individual prediction algorithms having the value of the weight variable w set by the user.

In contrast, when the number of negative case (not purchased) data items Mb is larger than the number of positive case (purchased) data items Ma, it is better to emphasize "predict 'no purchase' by a customer who is expected to purchase the recommended product". In such a case, the user sets beforehand the weight variable w high, and compares, for each explanatory variable, overall erroneous answer percentages of individual prediction algorithms having the value of the weight variable w set by the user.

In an application to a data analysis concerning financial credit assessment, if the user has a question: "which explanatory variable and which prediction algorithm cause the prediction algorithm to predict 'no repayment' by a customer who is expected to make repayment or which explanatory variable and which prediction algorithm cause the prediction algorithm to predict 'repayment' by a customer who is expected to not make repayment", the answer to the question can be presented in the form of graphic display in an understandable manner.

Whether "predict 'no repayment' by a customer who is expected to not make repayment" or "predict 'repayment' by a customer who is expected to not make repayment" is be emphasized is determined by the user. For example, when the number of positive case (repaid) data items Ma is larger than the number of negative case (not repaid) data items Mb, it is better to emphasize "predict 'repayment' by a customer who is expected to not make repayment". In such a case, the user sets beforehand the weight variable w low, and compares, for each explanatory variable, overall erroneous answer percentages of individual prediction algorithms having the value of the weight variable w set by the user.

In contrast, when the number of negative case (not repaid) data items Mb is larger than the number of positive case (repaid) data items Ma, it is better to emphasize "no predict 'repayment' by a customer who is expected to make repayment". In such a case, the user sets beforehand the weight variable w high, and compares, for each explanatory variable, overall erroneous answer percentages of individual prediction algorithms having the value of the weight variable w set by the user.

In this manner, according to the practical example 4B, overall erroneous answer percentages corresponding to the user's degrees of interest are compared for individual combinations of prediction algorithms and explanatory variables. Hence, indication of which combination if adopted would make the erroneous answer percentage better and which combination if adopted would make the erroneous answer percentage worse can be presented to the user in an understandable manner.

A practical example 5A is an example in which overall correct answer percentages are determined for groupings of the explanatory variables. Each group is formed by the explanatory variables that remain after any one explanatory variable is eliminated from the overall group of explanatory variables. The weighted overall correct answer percentages determined for the groups of remaining explanatory variables are displayed as a graph. In other words, the practical example 5A is a combination of the practical example 1A and the practical example 3A. In the practical example 5A, the value of the weight variable w is specified in advance. In this example, for each combination of a prediction algorithm and a remaining explanatory variable group, indication of which explanatory variable that if not adopted would improve the prediction accuracy (correct answer percentage) of which prediction algorithm can be presented to the user in an understandable manner.

Figure 23:
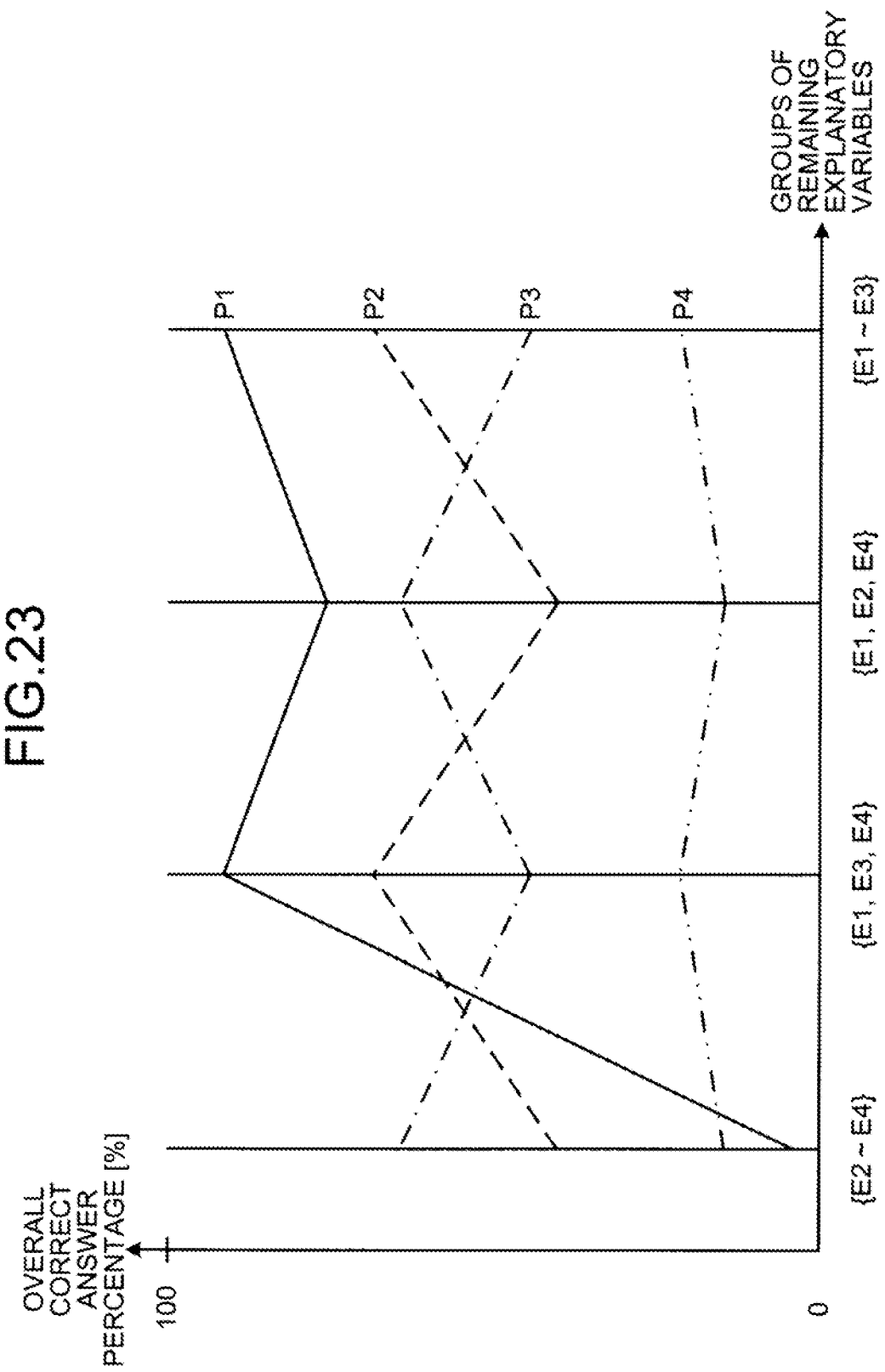
FIG. 23 is a graph indicating a weighted overall correct answer percentage for each combination of prediction algorithm and remaining explanatory variable in the practical example 5A.

FIG. 23 is a graph indicating a weighted overall correct answer percentage for each combination of prediction algorithm and remaining explanatory variable in the practical example 5A. In the graph depicted in FIG. 23, the horizontal axis represents the remaining explanatory variable group, and the vertical axis represents the overall correct answer percentage. This graph is displayed on the display 508 depicted in FIG. 5. In the example depicted in FIG. 23, four types of prediction algorithm P1 to P4 and four types of remaining explanatory variable groups {E2 to E4}, {E1, E3, E4}, {E1, E2, E4}, and {E1 to E3} are used.

FIG. 23 is a graph that for each of the prediction algorithms P1 to P4, indicates overall correct answer percentages that result when the remaining explanatory variable groups {E2 to E4}, {E1, E3, E4}, {E1, E2, E4}, and {E1 to E3} are adopted. For example, the prediction algorithm P1 comes to have the best prediction accuracy when the remaining explanatory variable groups {E1, E3, E4}, {E1, E2, E4}, and {E1 to E3} are adopted, but comes to have the worst prediction accuracy when the remaining explanatory variable group {E2 to E4} is adopted.

In this manner, when Q prediction algorithms and R remaining explanatory variable groups are present, a graph exhibiting Q×R combinations of prediction algorithms and explanatory variables can be made. Hence, the combination that makes the correct answer percentage better and the combination makes the correct answer percentage worse can be presented in an understandable manner.

Figure 24:
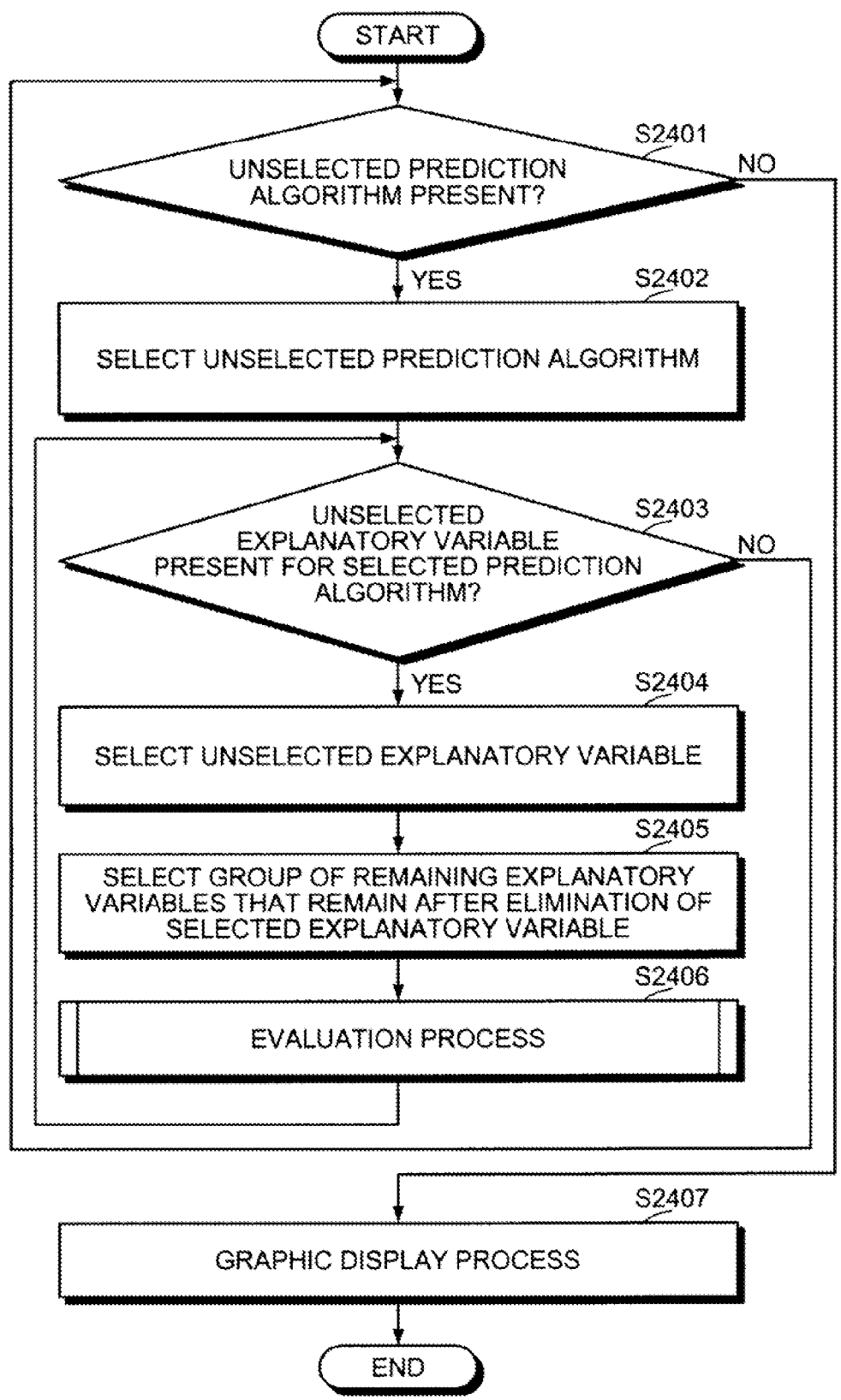
FIG. 24 is a flowchart of a data analysis procedure according to the practical example 5A.

FIG. 24 is a flowchart of a data analysis procedure according to the practical example 5A. In FIG. 24, the value of the weight variable w is preliminarily specified. The data analyzing apparatus determines whether an unselected prediction algorithm is present (step S2401). If an unselected prediction algorithm is present (step S2401: YES), the data analyzing apparatus selects the unselected prediction algorithm (step S2402).

Subsequently, the data analyzing apparatus determines whether an explanatory variable that has yet to be selected for the selected prediction algorithm is present (step S2403). If an unselected explanatory variable is present (step S2403: YES), the data analyzing apparatus selects the unselected explanatory variable (step S2404), and selects the group of explanatory variables that remain after elimination of the selected explanatory variable (step S2405). The data analyzing apparatus then executes an evaluation process (step S2406). The details of this evaluation process (step S2406) are identical to those of the evaluation process (step S1003) described in FIG. 11, and description thereof is omitted. The evaluation process (step S2406) is executed on a combination of the selected prediction algorithm and the selected group of remaining explanatory variables.

Following the evaluation process (step S2406), the data analyzing apparatus returns to step S2403, and if an unselected explanatory variable is not present (step S2403: NO), the data analyzing apparatus returns to step S2401, and determines whether an unselected prediction algorithm is present (step S2401). If an unselected prediction algorithm is not present (step S2401: NO), the data analyzing apparatus caries out the process of displaying an overall correct answer percentage obtained for each combination of a prediction algorithm and an explanatory variable on a graph, as depicted in FIG. 23 (step S2407), thereby ending the data analysis procedure of the practical example 5A.

In this manner, according to the practical example 5A, with the value of the weight variable w set by the user, the prediction accuracy (correct answer percentage) of the prediction algorithm for each remaining explanatory variable group can be presented to the user in an understandable manner, for each prediction algorithm, according to the degree of the user's interest in positive case data.

For example, in an application to circuit failure analysis, if the user has a question: "which explanatory variable for each prediction algorithm should be adopted to cause the prediction algorithm to predict the normal operation of a circuit that is assumed to be normal or which explanatory variable for each prediction algorithm should be adopted to cause the prediction algorithm to predict the failure of a circuit that is assumed to fail", the answer to the question can be presented in the form of graphic display in an understandable manner.

Whether "predict the normal operation of a circuit that is assumed to be normal" or "predict the failure of a circuit that is assumed to fail" is to be emphasized is determined by the user. For example, when the number of positive case (normal) data items Ma is larger than the number of negative case (failure) data items Mb, it is better to emphasize "predict the failure of a circuit that is assumed to fail". In such a case, the user sets the weight variable w low, and compares, for each combination of prediction algorithm and remaining explanatory variable group, overall correct answer percentages of individual prediction algorithms having the value of the weight variable w set by the user.

In contrast, when the number of negative case (failure) data items Mb is larger than the number of positive case (normal) data items Ma, it is better to emphasize "predict the normal operation of a circuit that is assumed to be normal". In such a case, the user sets the weight variable w high, and compares, for each combination of prediction algorithm and remaining explanatory variable, overall correct answer percentages of individual prediction algorithms having the value of the weight variable w set by the user.

In an application to data analysis concerning recommendation of a product, if the user has a question: "lack of which explanatory variable for each prediction algorithm causes the prediction algorithm to predict 'purchase' by a customer who is expected to purchase the recommended product or lack of which explanatory variable for each prediction algorithm causes the prediction algorithm to predict 'no purchase' by a customer who is expected to not purchase the recommended product", the answer to the question can be presented in the form of graphic display in an understandable manner.

Whether "predict 'purchase' by a customer who is expected to purchase the recommended product" or "predict 'no purchase' by a customer who is expected to not purchase the recommended product" is be emphasized is determined by the user. For example, when the number of positive case (purchased) data items Ma is larger than the number of negative case (not purchased) data items Mb, it is better to emphasize "predict 'no purchase' by a customer who is expected to not purchase the recommended product". In such a case, the user sets beforehand the weight variable w low, and compares, for each combination of prediction algorithm and remaining explanatory variable group, overall correct answer percentages of individual prediction algorithms having the value of the weight variable w set by the user.

In contrast, when the number of negative case (not purchased) data items Mb is larger than the number of positive case (purchased) data items Ma, it is better to emphasize "predict 'purchase' by a customer who is expected to purchase the recommended product". In such a case, the user sets beforehand the weight variable w high, and compares, for each combination of prediction algorithm and remaining explanatory variable group, overall correct answer percentages of individual prediction algorithms having the value of the weight variable w set by the user.

In an application to a data analysis concerning financial credit assessment, if the user has a question: "lack of which explanatory variable for each prediction algorithm causes the prediction algorithm to predict 'repayment' by a customer who is expected to make repayment or lack of which explanatory variable for each prediction algorithm causes the prediction algorithm to predict 'no repayment' by a customer who is expected to not make repayment", the answer to the question can be presented in the form of graphic display in an understandable manner.

Whether "predict 'repayment' by a customer who is expected to not make repayment" or "predict 'no repayment' by a customer who is expected to not make repayment" is be emphasized is determined by the user. For example, when the number of positive case (repaid) data items Ma is larger than the number of negative case (not repaid) data items Mb, it is better to emphasize "predict 'no repayment' by a customer who is expected to not make repayment". In such a case, the user sets beforehand the weight variable w low, and compares, for each remaining explanatory variable group, overall correct answer percentages of individual prediction algorithms having the value of the weight variable w set by the user.

In contrast, when the number of negative case (not repaid) data items Mb is larger than the number of positive case (repaid) data items Ma, it is better to emphasize "predict 'repayment' by a customer who is expected to make repayment". In such a case, the user sets beforehand the weight variable w high, and compares, for each remaining explanatory variable group, overall correct answer percentages of individual prediction algorithms having the value of the weight variable w set by the user.

In this manner, according to the practical example 5A, overall correct answer percentages corresponding to the user's degrees of interest are compared for individual combinations of prediction algorithms and groups of remaining explanatory variables. Hence, for each prediction algorithm, indication of which explanatory variable if not adopted would make the correct answer percentage better and which explanatory variable if not adopted would make the correct answer percentage worse can be presented to the user in an understandable manner.

A practical example 5B is an example in which for each prediction algorithm, an overall erroneous answer percentage is determined for each remaining explanatory variable group and is displayed as a graph. In other words, the practical example 5B is a combination of the practical example 1B and the practical example 3B. In the practical example 5B, the value of the weight variable w is specified in advance. In this example, for each combination of a prediction algorithm and a remaining explanatory variable group, indication of which explanatory variable that if not selected would improve the prediction accuracy (erroneous answer percentage) of which prediction algorithm can be presented to the user in an understandable manner.

Figure 25:
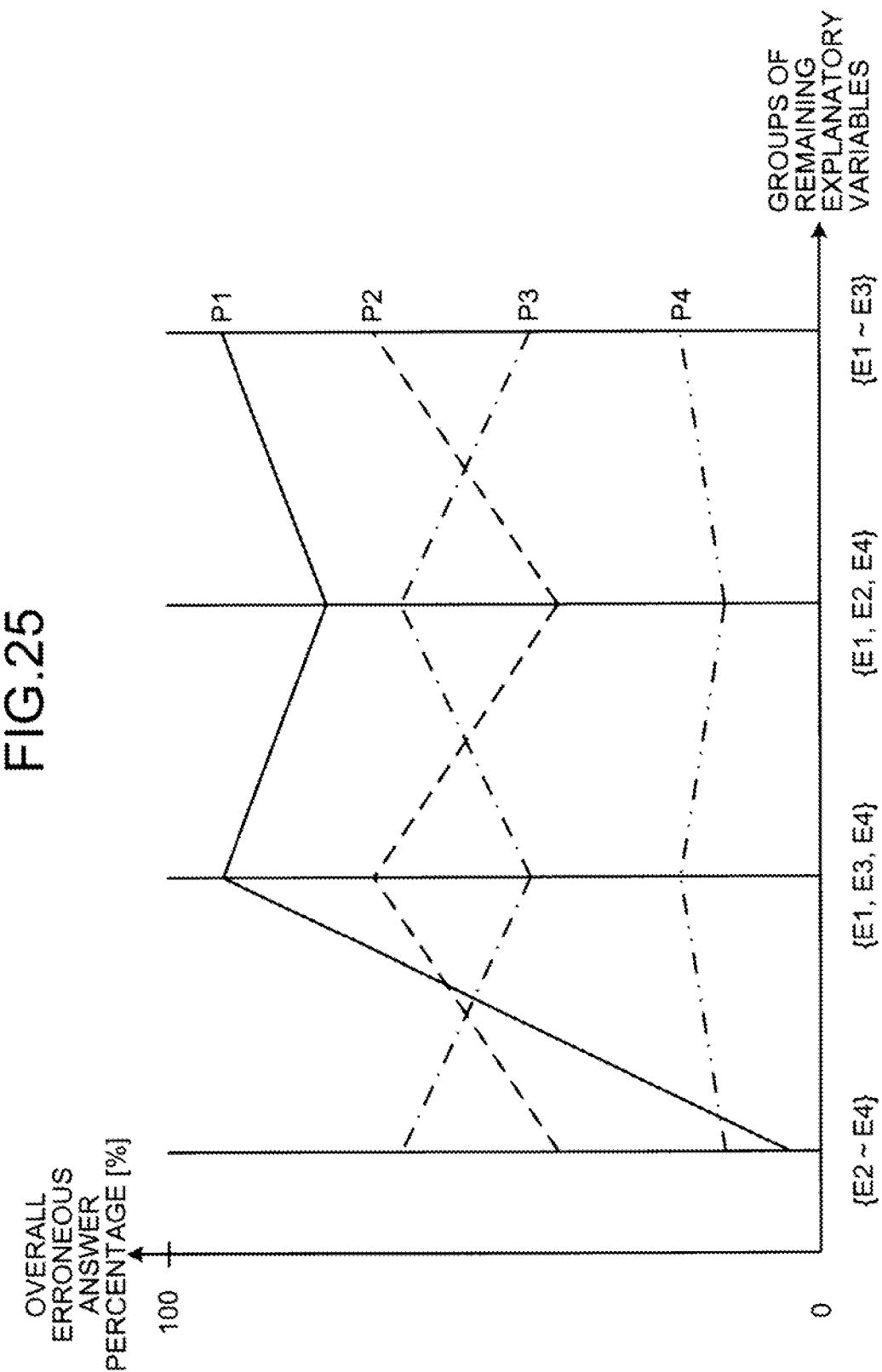
FIG. 25 is a graph indicating a weighted overall erroneous answer percentage for each combination of prediction algorithm and remaining explanatory variable in the practical example 5B.

FIG. 25 is a graph indicating a weighted overall erroneous answer percentage for each combination of prediction algorithm and remaining explanatory variable in the practical example 5B. In the graph depicted in FIG. 25, the horizontal axis represents the remaining explanatory variable group, and the vertical axis represents the overall erroneous answer percentage. This graph is displayed on the display 508 depicted in FIG. 5. In the example depicted in FIG. 25, four types of prediction algorithm P1 to P4 and four types of remaining explanatory variable groups {E2 to E4}, {E1, E3, E4}, {E1, E2, E4}, and {E1 to E3} are used.

FIG. 25 is a graph that for each of the prediction algorithms P1 to P4, indicates overall erroneous answer percentages that result when the remaining explanatory variable groups {E2 to E4}, {E1, E3, E4}, {E1, E2, E4}, and {E1 to E3} are adopted. For example, the prediction algorithm P1 comes to have the best prediction accuracy when the remaining explanatory variable groups {E1, E3, E4}, {E1, E2, E4}, and {E1 to E3} are adopted, but comes to have the worst prediction accuracy when the remaining explanatory variable group {E2 to E4} is adopted.

In this manner, when Q prediction algorithms and R explanatory variables are present, a graph exhibiting Q×R combinations of prediction algorithms and explanatory variables can be made. Hence, the combination that makes the erroneous answer percentage better and the combination makes the erroneous answer percentage worse can be presented in an understandable manner.

A data analysis procedure according to the practical example 5B is identical to the procedure depicted in FIG. 24, excluding the details of the evaluation process (step S2406). In the practical example 5B, the details of the evaluation process (step S2406) is equivalent to the details of the evaluation process (step S1003) depicted in FIG. 13. The evaluation process (step S1503) is executed on a selected prediction algorithm and remaining explanatory variable group.

In this manner, according to the practical example 5B, with the value of the weight variable w set by the user, the prediction accuracy (erroneous answer percentage) of the prediction algorithm for each remaining explanatory variable group can be presented to the user in an understandable manner, for each prediction algorithm, according to the degree of the user's interest in negative case data.

For example, in an application to circuit failure analysis, if the user has a question: "which explanatory variable for each prediction algorithm should be adopted to cause the prediction algorithm to predict the failure of a circuit that is assumed to be normal or which explanatory variable for each prediction algorithm should be adopted to cause the prediction algorithm to predict the normal operation of a circuit that is assumed to fail", the answer to the question can be presented in the form of graphic display in an understandable manner.

Whether "predict the failure of a circuit that is assumed to be normal" or "predict the normal operation of a circuit that is assumed to fail" is to be emphasized is determined by the user. For example, when the number of positive case (normal) data items Ma is larger than the number of negative case (failure) data items Mb, it is better to emphasize "predict the normal operation of a circuit that is assumed to fail". In such a case, the user sets the weight variable w low, and compares, for each remaining explanatory variable group, overall erroneous answer percentages of individual prediction algorithms having the value of the weight variable w set by the user.

In contrast, when the number of negative case (failure) data items Mb is larger than the number of positive case (normal) data items Ma, it is better to emphasize "predict the failure of a circuit that is assumed to be normal". In such a case, the user sets the weight variable w high, and compares, for each remaining explanatory variable group, overall erroneous answer percentages of individual prediction algorithms having the value of the weight variable w set by the user.

In an application to data analysis concerning recommendation of a product, if the user has a question: "lack of which explanatory variable for each prediction algorithm causes the prediction algorithm to predict 'no purchase' by a customer who is expected to purchase the recommended product or lack of which explanatory variable for each prediction algorithm causes the prediction algorithm to predict 'purchase' by a customer who is expected to not purchase the recommended product", the answer to the question can be presented in the form of graphic display in an understandable manner.

Whether "predict 'no purchase' by a customer who is expected to purchase the recommended product" or "predict 'purchase' by a customer who is expected to not purchase the recommended product" is be emphasized is determined by the user. For example, when the number of positive case (purchased) data items Ma is larger than the number of negative case (not purchased) data items Mb, it is better to emphasize "predict 'purchase' by a customer who is expected to not purchase the recommended product". In such a case, the user sets beforehand the weight variable w low, and compares, for each remaining explanatory variable group, overall erroneous answer percentages of individual prediction algorithms having the value of the weight variable w set by the user.

In contrast, when the number of negative case (not purchased) data items Mb is larger than the number of positive case (purchased) data items Ma, it is better to emphasize "predict 'no purchase' by a customer who is expected to purchase the recommended product". In such a case, the user sets beforehand the weight variable w high, and compares, for each remaining explanatory variable group, overall erroneous answer percentages of individual prediction algorithms having the value of the weight variable w set by the user.

In an application to a data analysis concerning financial credit assessment, if the user has a question: "lack of which explanatory variable for each prediction algorithm causes the prediction algorithm to predict 'no repayment' by a customer who is expected to make repayment or lack of which explanatory variable for each prediction algorithm causes the prediction algorithm to predict 'repayment' by a customer who is expected to not make repayment", the answer to the question can be presented in the form of graphic display in an understandable manner.

Whether "predict 'no repayment' by a customer who is expected to not make repayment" or "predict 'repayment' by a customer who is expected to not make repayment" is be emphasized is determined by the user. For example, when the number of positive case (repaid) data items Ma is larger than the number of negative case (not repaid) data items Mb, it is better to emphasize "predict 'repayment' by a customer who is expected to not make repayment". In such a case, the user sets beforehand the weight variable w low, and compares, for each remaining explanatory variable group, overall erroneous answer percentages of individual prediction algorithms having the value of the weight variable w set by the user.

In contrast, when the number of negative case (not repaid) data items Mb is larger than the number of positive case (repaid) data items Ma, it is better to emphasize "predict 'no repayment' by a customer who is expected to make repayment". In such a case, the user sets beforehand the weight variable w high, and compares, for each remaining explanatory variable group, overall erroneous answer percentages of individual prediction algorithms having the value of the weight variable w set by the user.

In this manner, according to the practical example 5B, overall erroneous answer percentages corresponding to the user's degrees of interest are compared for individual combinations of prediction algorithms and groups of remaining explanatory variables. Hence, for each prediction algorithm, indication of which explanatory variable if not adopted would make the correct answer percentage better and which explanatory variable if not adopted would make the correct answer percentage worse can be presented to the user in an understandable manner.

A practical example 6A is an example in which an overall correct answer percentage is calculated for each prediction algorithm and displayed as a graph. The practical example 6A is different from the practical example 1A in that the value of the weight variable w and an explanatory variable are specified in advance, but is identical to the practical example 1A in other aspects. In this practical example 6A, in an analysis using the value of the weight variable w and an explanatory variable set by the user, indication of which prediction algorithm offers better prediction accuracy (correct answer percentage) can be presented to the user in an understandable manner. The data analysis procedure according to the practical example 6A is identical to the data analysis procedure of the practical example 1A, and description thereof is omitted.

Figure 26:
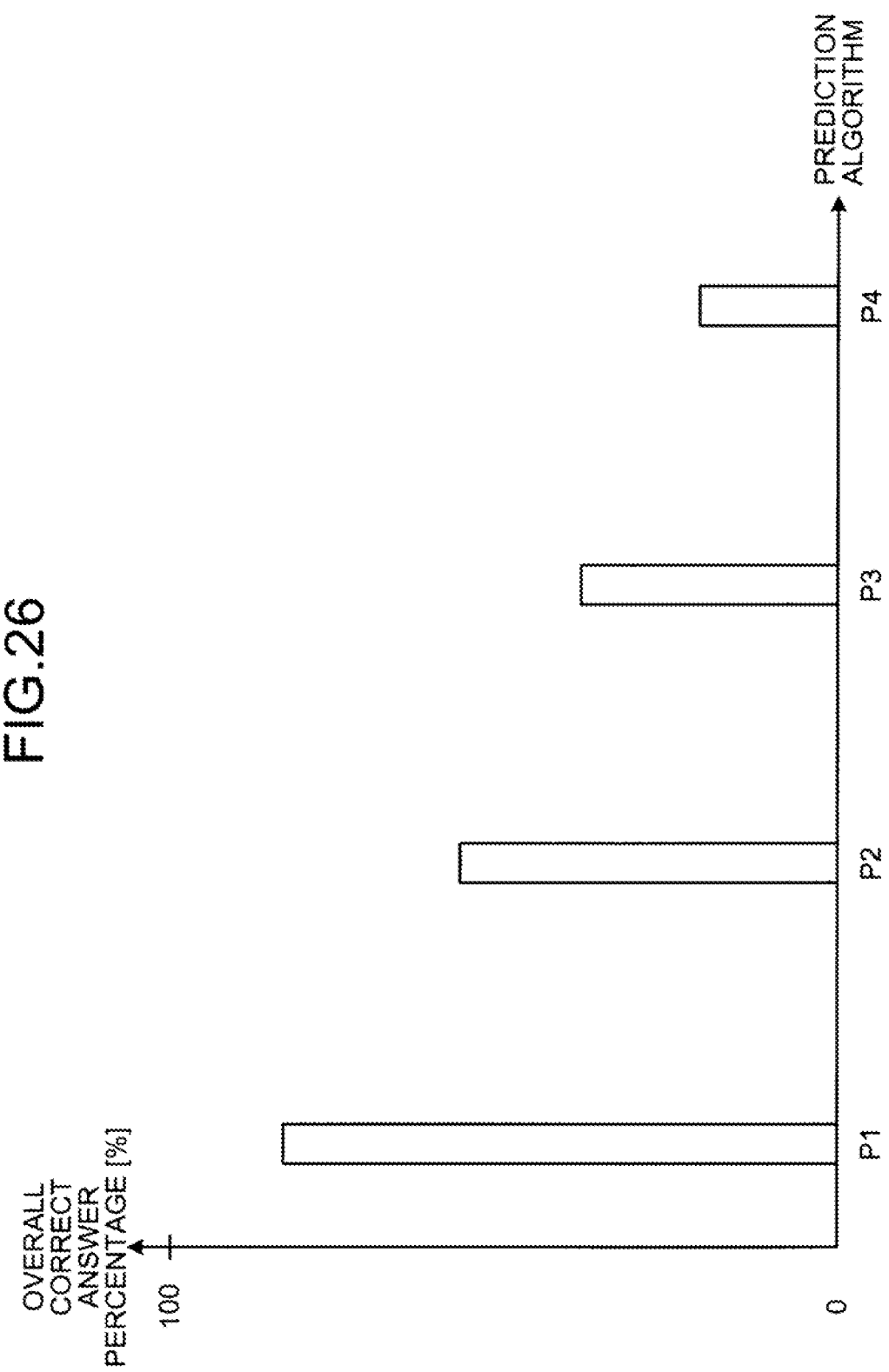
FIG. 26 is a graph of overall correct answer percentages for prediction algorithms in the practical example 6A.

FIG. 26 is a graph of overall correct answer percentages for prediction algorithms in the practical example 6A. In FIG. 26, the horizontal axis represents the prediction algorithm, and the vertical axis represents the overall correct answer percentage. FIG. 26 is an example of graphic display in the form of a bar graph. Display of the graph depicted in FIG. 26 enables the user to know which prediction algorithm offers better prediction accuracy in an analysis using the value of the weight variable w and an explanatory variable specified by the user.

A practical example 6B is an example in which an overall correct answer percentage is calculated for each prediction algorithm and displayed as a graph. The practical example 6B is different from the practical example 1B in that the value of the weight variable w and an explanatory variable are specified in advance, but is identical to the practical example 1B in other aspects. In this practical example 6B, in an analysis using the value of the weight variable w and an explanatory variable set by the user, indication of which prediction algorithm offers better prediction accuracy (erroneous answer percentage) can be presented to the user in an understandable manner. The data analysis procedure according to the practical example 6B is identical to the data analysis procedure of the practical example 1B, and description thereof is omitted.

Figure 27:
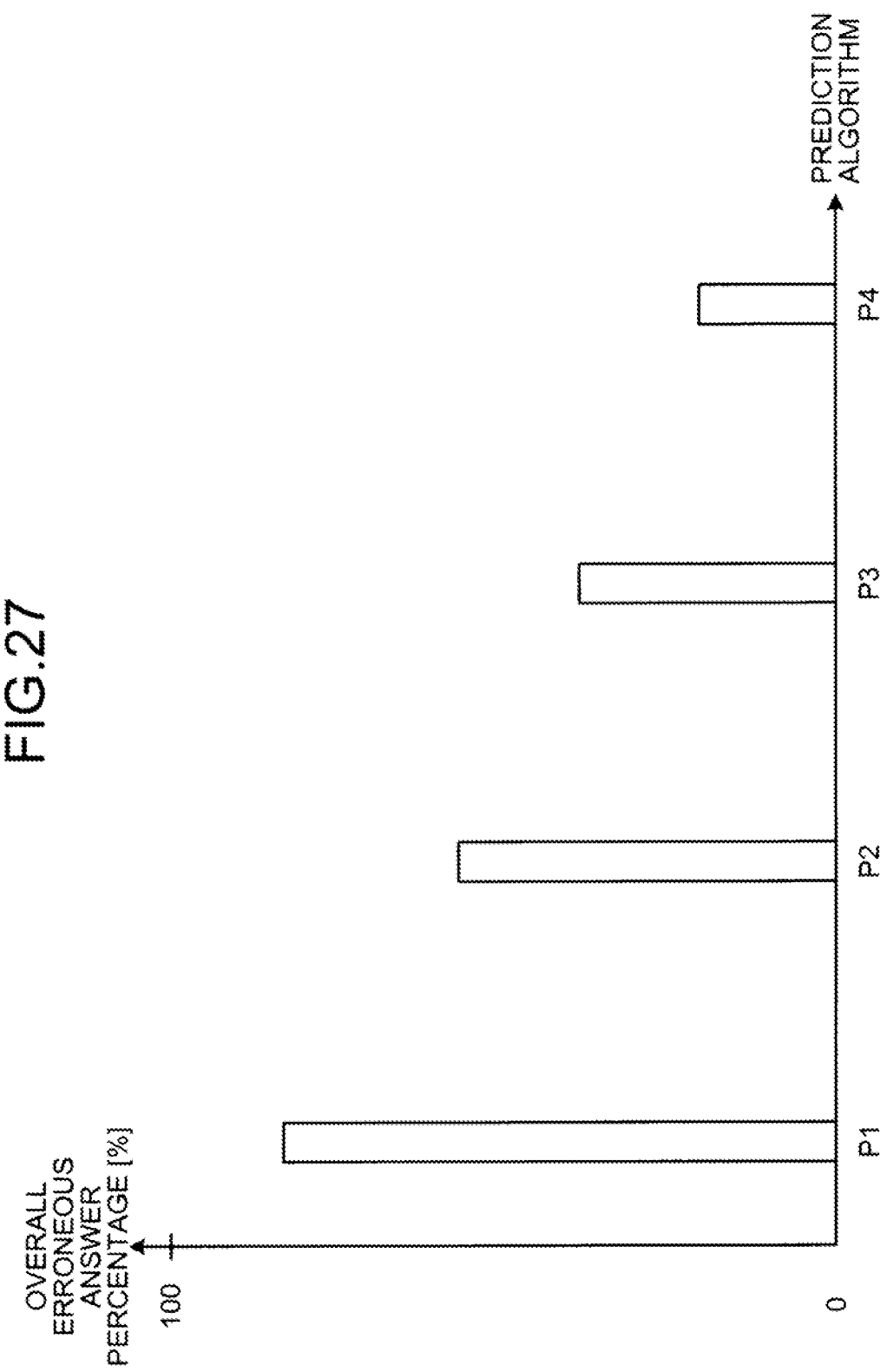
FIG. 27 is a graph of overall erroneous answer percentages for prediction algorithms in the practical example 6B.

FIG. 27 is a graph of overall erroneous answer percentages for prediction algorithms in the practical example 6B. In FIG. 27, the horizontal axis represents the prediction algorithm, and the vertical axis represents the overall erroneous answer percentage. FIG. 27 is an example of graphic display in the form of a bar graph. Display of the graph depicted in FIG. 27 enables the user to know which prediction algorithm offers better prediction accuracy in an analysis using the value of the weight variable w and an explanatory variable specified by the user.

A practical example 7A is an example in which an overall correct answer percentage is calculated for each explanatory variable and displayed as a graph. The practical example 7A is different from the practical example 2A in that the value of the weight variable w and a prediction algorithm are specified in advance, but is identical to the practical example 2A in other aspects. In this practical example 7A, in an analysis using the value of the weight variable w and a prediction algorithm set by the user, indication of which explanatory variable if adopted would make the prediction accuracy (correct answer percentage) of the prediction algorithm better can be presented to the user in an understandable manner. The data analysis procedure according to the practical example 7A is identical to the data analysis procedure of the practical example 2A, and description thereof is omitted.

Figure 28:
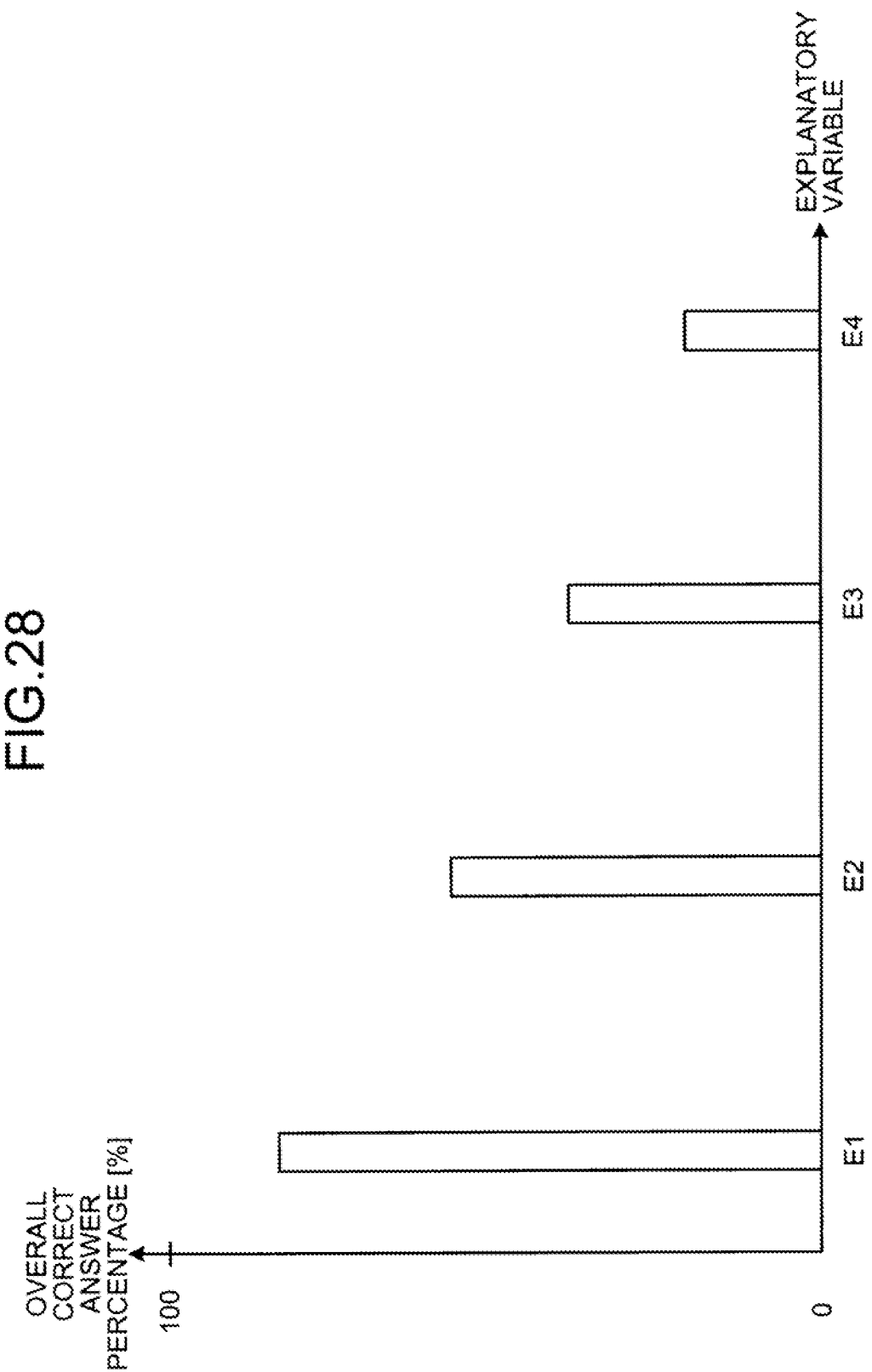
FIG. 28 is a graph of overall correct answer percentages for explanatory variables in the practical example 7A.

FIG. 28 is a graph of overall correct answer percentages for explanatory variables in the practical example 7A. In FIG. 28, the horizontal axis represents the explanatory variable, and the vertical axis represents the overall correct answer percentage. FIG. 28 is an example of graphic display in the form of a bar graph. Display of the graph depicted in FIG. 28 enables the user to know which explanatory variable if adopted would make the prediction accuracy of the prediction algorithm better in an analysis using the value of the weight variable w and a prediction algorithm specified by the user.

A practical example 7B is an example in which an overall erroneous answer percentage is calculated for each explanatory variable and displayed as a graph. The practical example 7B is different from the practical example 2B in that the value of the weight variable w and a prediction algorithm are specified in advance, but is identical to the practical example 2B in other aspects. In this practical example 7B, in an analysis using the value of the weight variable w and a prediction algorithm set by the user, indication of which explanatory variable if adopted would make the prediction accuracy (erroneous answer percentage) of the prediction algorithm better can be presented to the user in an understandable manner. The data analysis procedure according to the practical example 7B is identical to the data analysis procedure of the practical example 2B, and description thereof is omitted.

Figure 29:
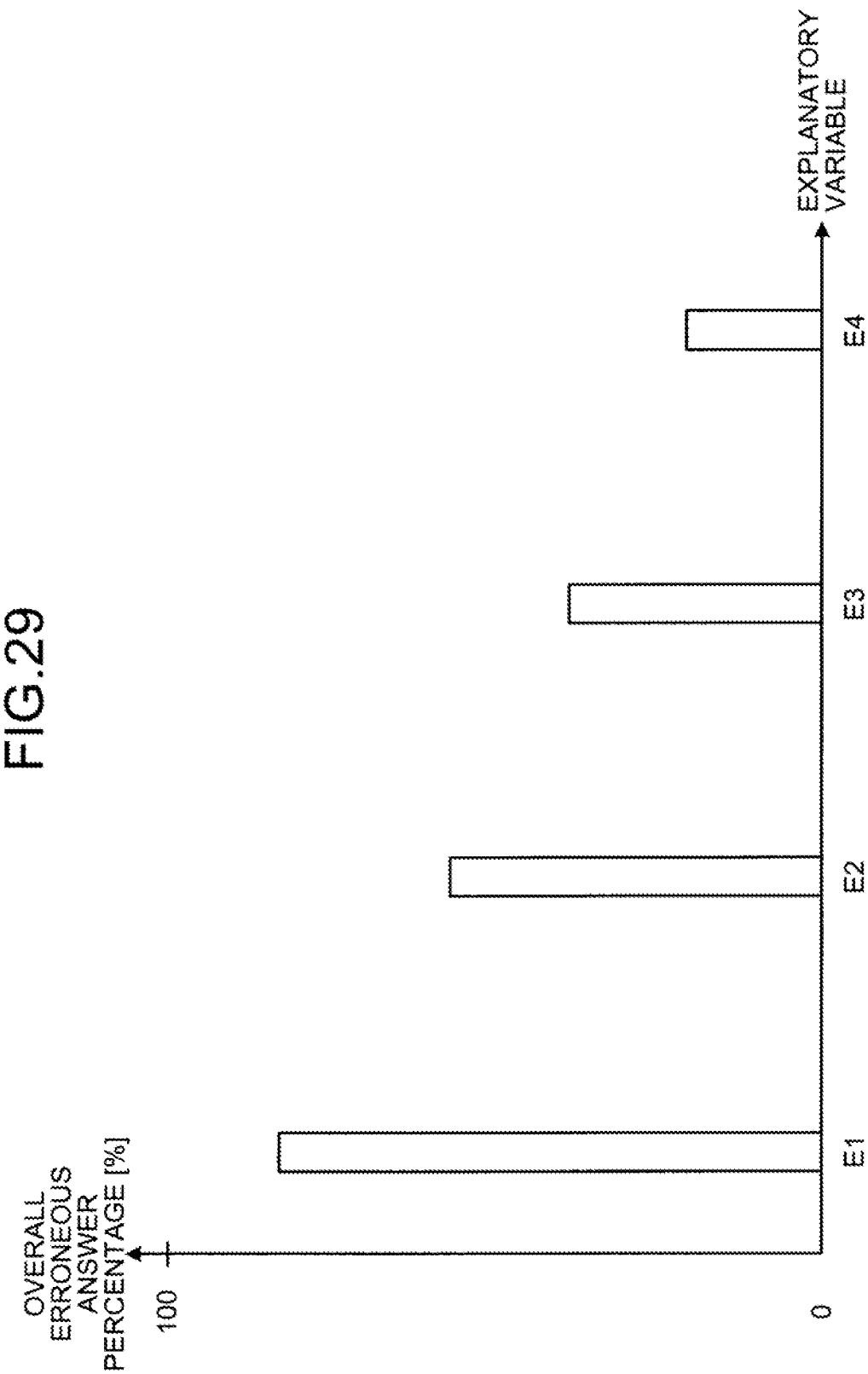
FIG. 29 is a graph of overall erroneous answer percentages for explanatory variables in the practical example 7B.

FIG. 29 is a graph of overall erroneous answer percentages for explanatory variables in the practical example 7B. In FIG. 29, the horizontal axis represents the explanatory variable, and the vertical axis represents the overall erroneous answer percentage. FIG. 29 is an example of graphic display in the form of a bar graph. Display of the graph depicted in FIG. 29 enables the user to know which explanatory variable if adopted would make the prediction accuracy of the prediction algorithm better in an analysis using the value of the weight variable w and a prediction algorithm specified by the user.

A practical example 8A is an example in which an overall correct answer percentage is calculated for each group of remaining explanatory variables and displayed as a graph. The practical example 8A is different from the practical example 3A in that the value of the weight variable w and a prediction algorithm are specified in advance, but is identical to the practical example 3A in other aspects. In this practical example 8A, in an analysis using the value of the weight variable w and a prediction algorithm set by the user, indication of which explanatory variable if not adopted would make the prediction accuracy (correct answer percentage) of the prediction algorithm better can be presented to the user in an understandable manner. The data analysis procedure according to the practical example 8A is identical to the data analysis procedure of the practical example 3A, and description thereof is omitted.

Figure 30:
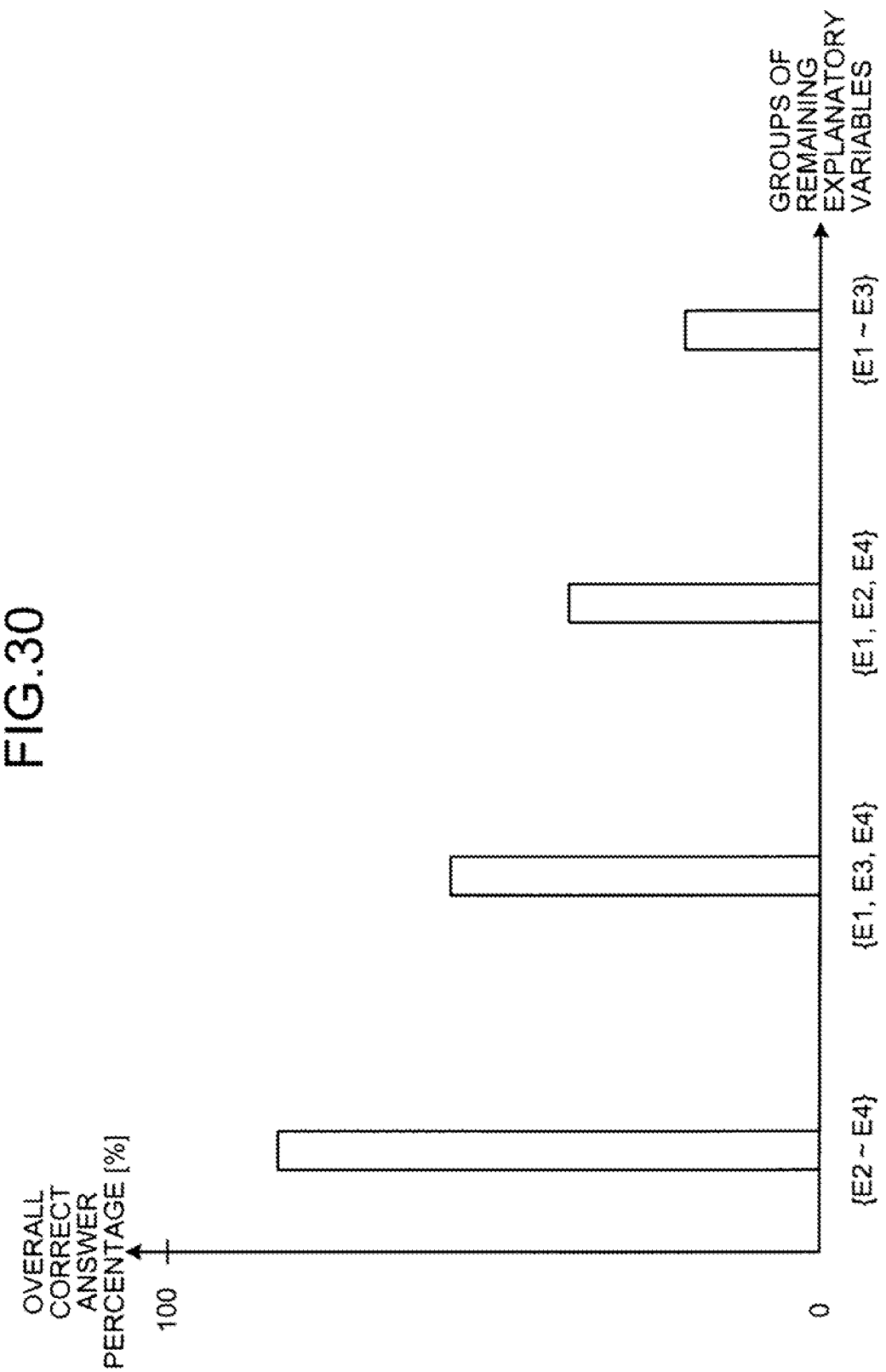
FIG. 30 is a graph of overall correct answer percentages for groups of remaining explanatory variables in the practical example 8A.

FIG. 30 is a graph of overall correct answer percentages for groups of remaining explanatory variables in the practical example 8A. In FIG. 30, the horizontal axis represents groups of remaining explanatory variables, and the vertical axis represents the overall correct answer percentage. FIG. 30 is an example of graphic display in the form of a bar graph. Display the graph depicted in FIG. 30 enables the user to know which explanatory variable if not adopted would make the prediction accuracy of the prediction algorithm better in an analysis using the value of the weight variable w and a prediction algorithm specified by the user.

A practical example 8B is an example in which an overall erroneous answer percentage is calculated for each group of remaining explanatory variables and displayed as a graph. The practical example 8B is different from the practical example 3B in that the value of the weight variable w and a prediction algorithm are specified in advance, but is identical to the practical example 3B in other aspects. In this practical example 8B, in an analysis using the value of the weight variable w and a prediction algorithm set by the user, indication of which explanatory variable if not adopted would make the prediction accuracy (erroneous answer percentage) of the prediction algorithm better can be presented to the user in an understandable manner. The data analysis procedure according to the practical example 8B is identical to the data analysis procedure of the practical example 3B, and description thereof is omitted.

Figure 31:
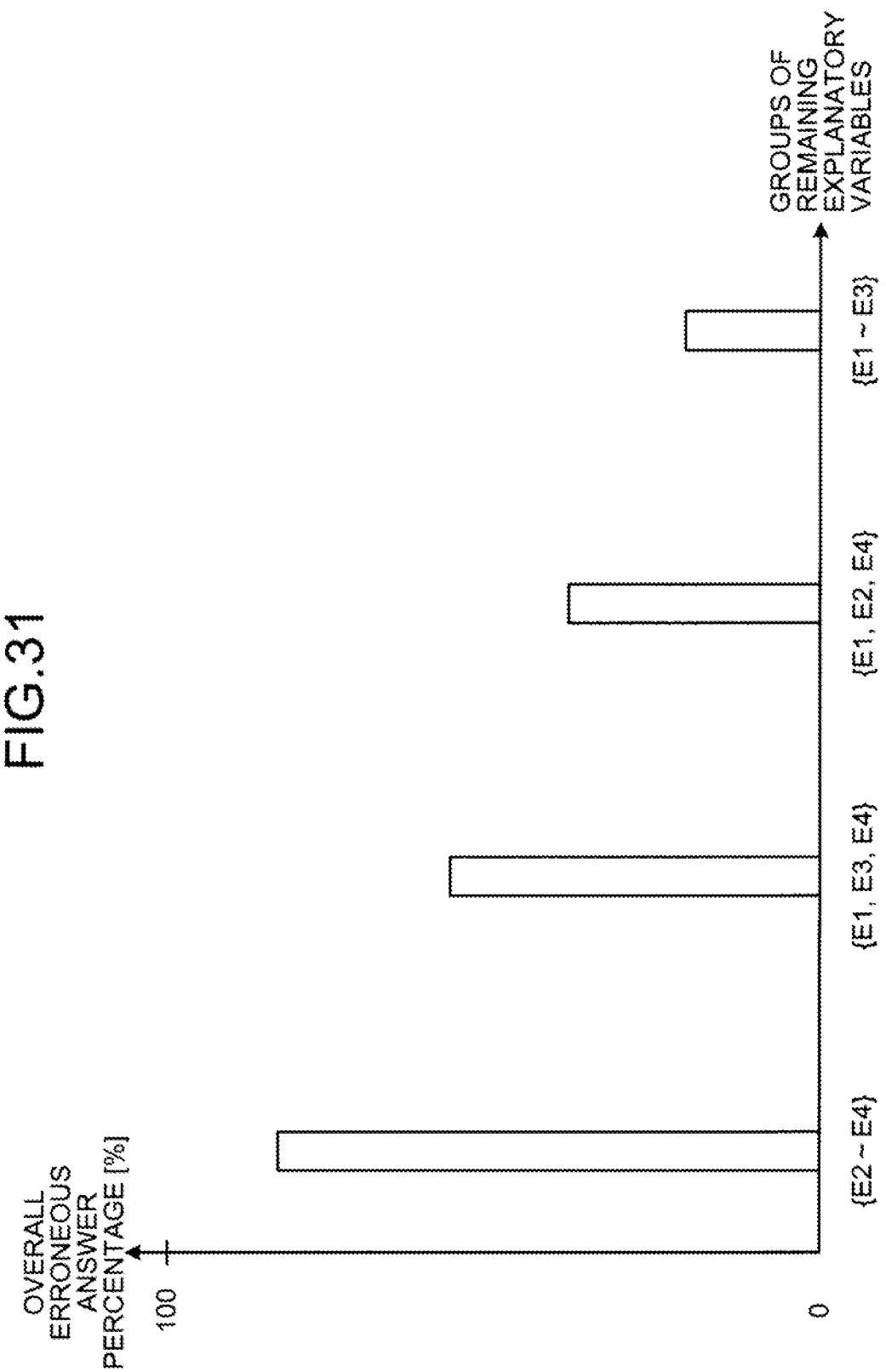
FIG. 31 is a graph of overall correct answer percentages for groups of remaining explanatory variables in the practical example 8B.

FIG. 31 is a graph of overall erroneous answer percentages for groups of remaining explanatory variables in the practical example 8B. In FIG. 31, the horizontal axis represents groups of remaining explanatory variables, and the vertical axis represents the overall erroneous answer percentage. FIG. 31 is an example of graphic display in the form of a bar graph. Display the graph depicted in FIG. 31 enables the user to know which explanatory variable if not adopted would make the prediction accuracy of the prediction algorithm better in an analysis using the value of the weight variable w and a prediction algorithm specified by the user.

A practical example 9A is an example in which partial correct answer percentages are calculated for each prediction algorithm and displayed as a graph. For example, in the practical example 9A, an overall correct answer percentage is not calculated but a box-and-whisker plot (box plot) of N partial correct answer percentages is displayed. In the same manner as in the practical example 6A, the value of the weight variable w and an explanatory variable are specified in advance. In this manner, a box-and-whisker plot of N partial correct answer percentages is displayed for each prediction algorithm, by which the distribution of partial correct answer percentages for each prediction algorithm can be visually understood.

Figure 32:
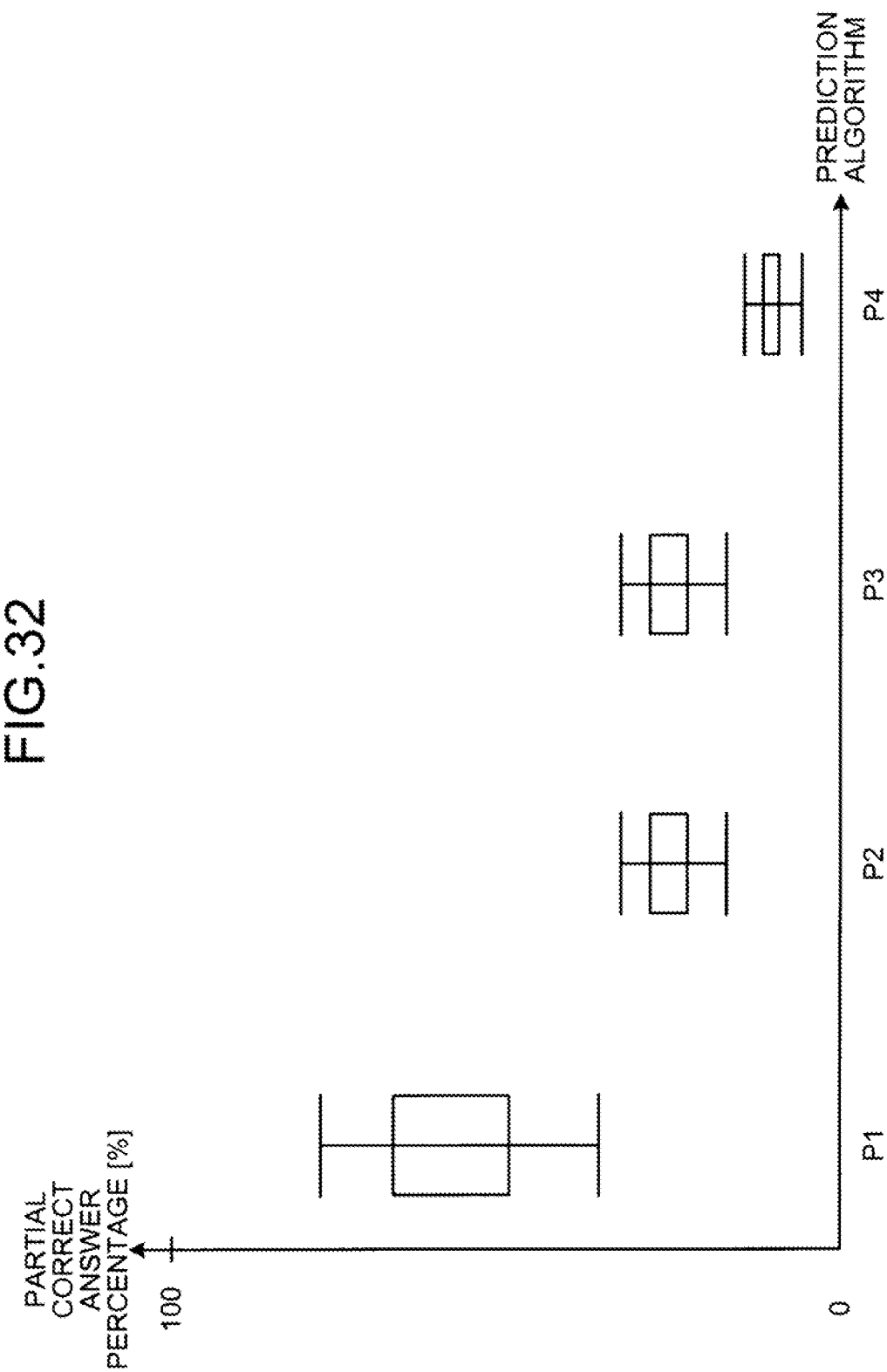
FIG. 32 is a graph indicating the distribution of partial correct answer percentages for each prediction algorithm in the practical example 9A.

FIG. 32 is a graph indicating the distribution of partial correct answer percentages for each prediction algorithm in the practical example 9A. In FIG. 32, the horizontal axis represents the prediction algorithm, and the vertical axis represents the partial correct answer percentage. FIG. 32 is an example of graphic display in the form of a box-and-whisker plot. Display of the graph depicted in FIG. 32 enables the user to visually know which prediction algorithms if adopted would make the distribution of partial correct answer percentages larger or smaller in an analysis using the value of the weight variable w and an explanatory variable specified by the user.

Figure 33:
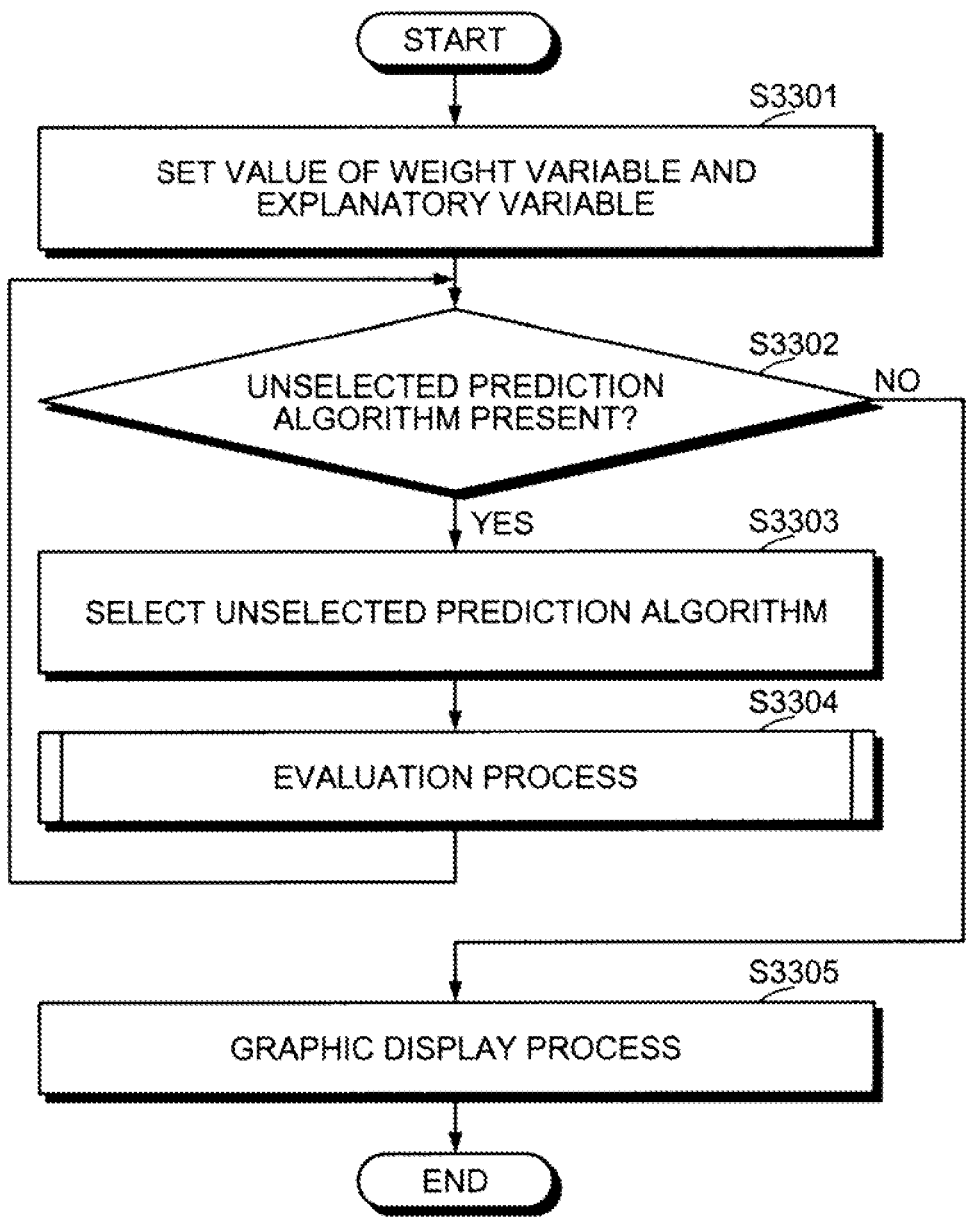
FIG. 33 is a flowchart of a data analysis procedure according to the practical example 9A.

FIG. 33 is a flowchart of a data analysis procedure according to the practical example 9A. In FIG. 33, the data analyzing apparatus sets the value of the weight variable w and an explanatory variable according to user input via an input device (keyboard, mouse, etc.) (step S3301). The data analyzing apparatus then determines whether an unselected prediction algorithm is present (step S3302). If an unselected prediction algorithm is present (step S3302: YES), the data analyzing apparatus selects the unselected prediction algorithm (step S3303), and executes an evaluation process (step S3304). The details of the evaluation process (step S3304) will be described with reference to FIG. 34.

Following the evaluation process (step S3304), the data analyzing apparatus returns to step S3302, and if an unselected prediction algorithm is not present (step S3302: NO), the data analyzing apparatus carries out the process of displaying a box-and-whisker plot indicating the distribution of partial correct answer percentages obtained for each prediction algorithm, as depicted in FIG. 32 (step S3305), thereby ending the data analysis procedure of the practical example 9A.

Figure 34:
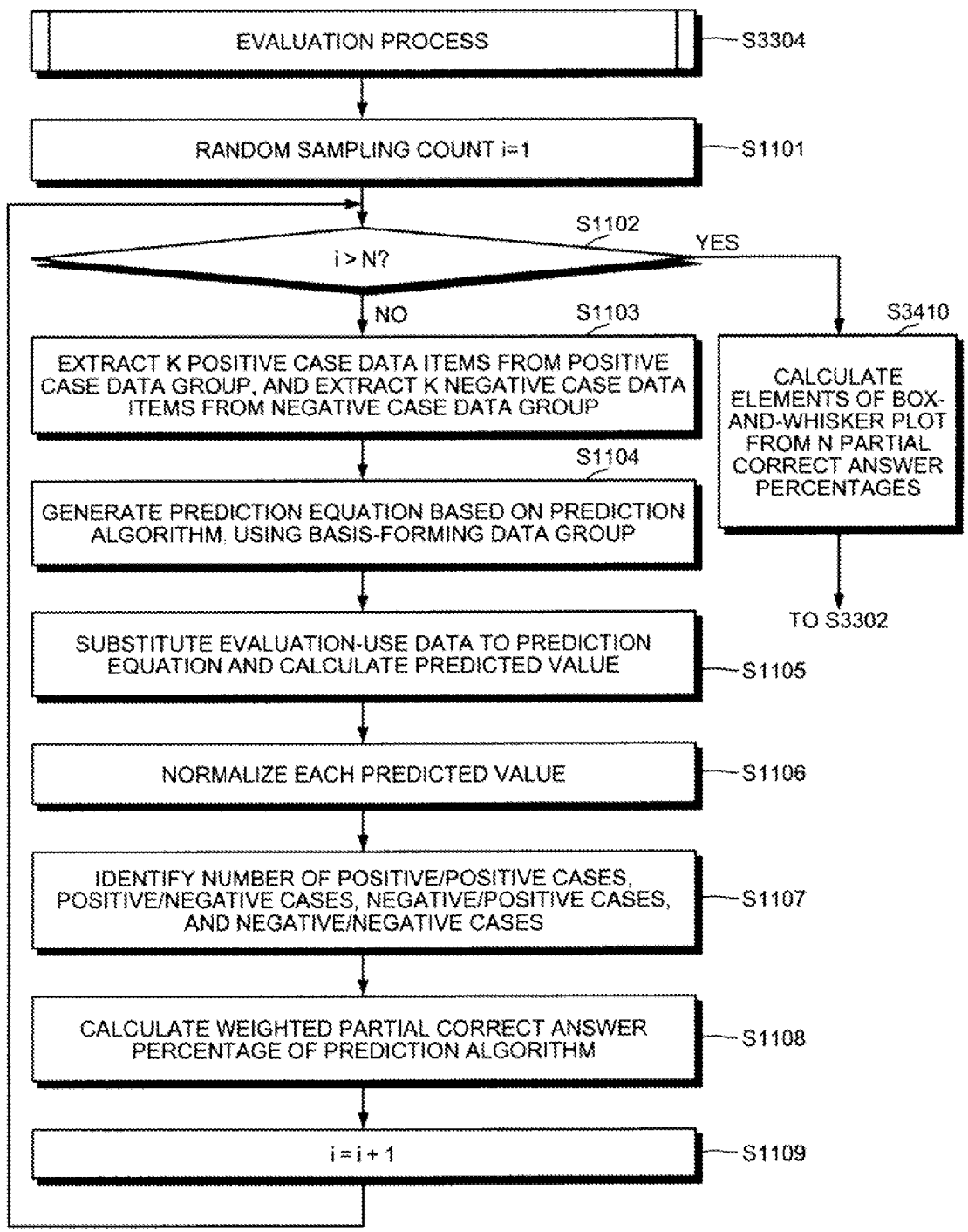
FIG. 34 is a flowchart of a detailed procedure of the evaluation process (step S3304) depicted in FIG. 33, according to the practical example 9A.

FIG. 34 is a flowchart of a detailed procedure of the evaluation process (step S3304) depicted in FIG. 33, according to the practical example 9A. In FIG. 34, steps S1101 to S1109 are identical to steps S1101 to S1109 depicted in FIG. 11, and description thereof is omitted. When i>N is satisfied at step S1102 (step S1102: YES), the elements of a box-and-whisker plot are calculated from N partial correct answer percentages (step S3410), and the procedure proceeds to step S3302.

The elements of a box-and-whisker plot include a minimum, a median, a maximum, a first quartile, a third quartile, an average, and an Inter-quartile range (IQR). At step S3410, these elements of the box-and-whisker plot are calculated for N partial correct answer percentages. As a result, the box-and-whisker plot as depicted in FIG. 32 can be displayed by the graphic display process (step S3305).

In this manner, according to the practical example 9A, the distribution of partial correct answer percentages can be checked for each prediction algorithm. In an analysis using the value of the weight variable w and an explanatory variable set by the user, therefore, the user is able to visually know which prediction algorithm if used would make the distribution of partial correct answer percentages smaller.

A practical example 9B is an example in which partial erroneous answer percentages are calculated for each prediction algorithm and displayed as a graph. For example, in the practical example 9B, an overall erroneous answer percentage is not calculated but a box-and-whisker plot (box plot) of N partial erroneous answer percentages is displayed. In the same manner as in the practical example 6B, the value of the weight variable w and an explanatory variable are specified in advance. In this manner, a box-and-whisker plot of N partial erroneous answer percentages is displayed for each prediction algorithm, by which the distribution of partial erroneous answer percentages for each prediction algorithm can be visually understood.

Figure 35:
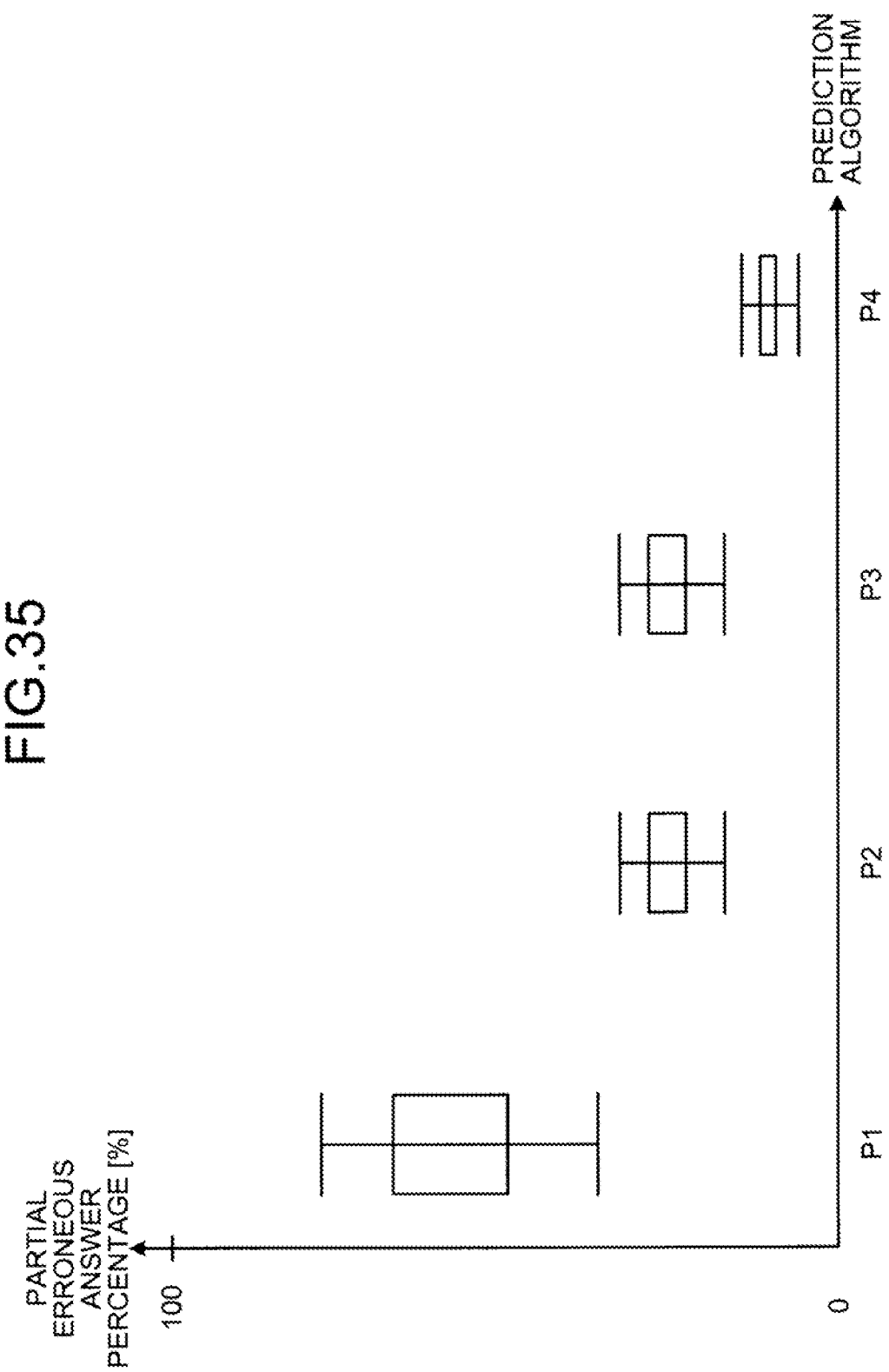
FIG. 35 is a graph indicating the distribution of partial erroneous answer percentages for each prediction algorithm in the practical example 9B.

FIG. 35 is a graph indicating the distribution of partial erroneous answer percentages for each prediction algorithm in the practical example 9B. In FIG. 35, the horizontal axis represents the prediction algorithm, and the vertical axis represents the partial erroneous answer percentage. FIG. 35 is an example of graphic display in the form of a box-and-whisker plot. Display of the graph depicted in FIG. 35 enables the user to visually know which prediction algorithms if adopted would make the distribution of partial erroneous answer percentages larger or smaller in an analysis using the value of the weight variable w and an explanatory variable specified by the user.

A data analysis procedure according to the practical example 9B will next be described. The data analysis procedure of the practical example 9B is identical to the data analysis procedure of the practical example 9A excluding the evaluation process (S3304), and description of the data analysis procedure is omitted. In the practical example 9B, the contents of the evaluation process are different from that of the evaluation process (step S3304) of the practical example 9A and an evaluation process (step S3604) is executed in place of the evaluation process (S3304).

Figure 36:
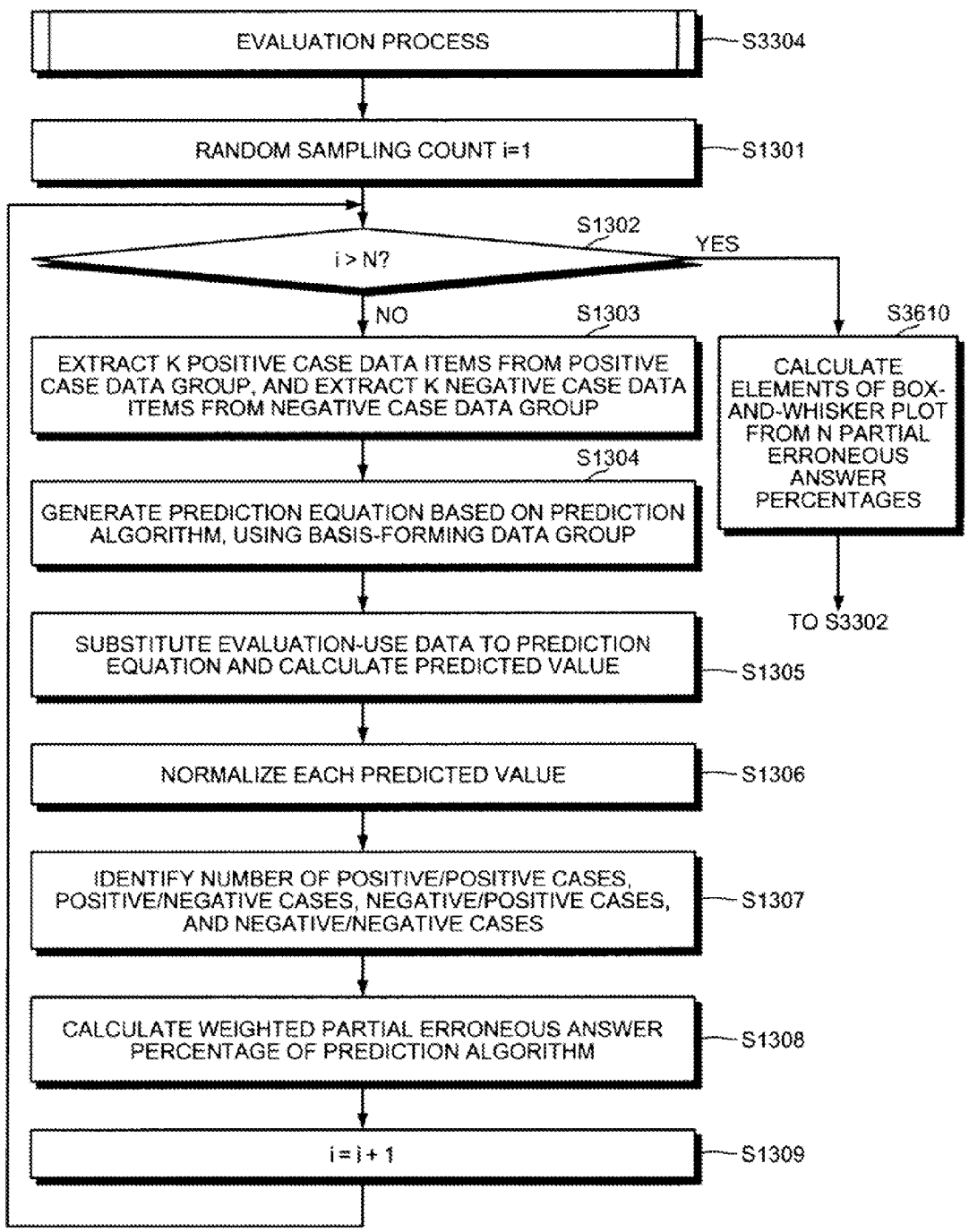
FIG. 36 is a flowchart of a detailed procedure of the evaluation process (step S3604) according to the practical example 9B.

FIG. 36 is a flowchart of a detailed procedure of the evaluation process (step S3604) according to the practical example 9B. In FIG. 36, steps S1301 to S1309 are the identical to steps S1301 to S1309 depicted in FIG. 13, and description thereof is omitted. When i>N is satisfied at step S1302 (step S1302: YES), the elements of a box-and-whisker plot are calculated from N partial erroneous answer percentages (step S3610), and the procedure proceeds to step S3302.

The elements of a box-and-whisker plot include a minimum, a median, a maximum, a first quartile, a third quartile, an average, and an Inter-quartile range (IQR). At step S3610, these elements of the box-and-whisker plot are calculated for N partial erroneous answer percentages. As a result, the box-and-whisker plot as depicted in FIG. 35 can be displayed by the graphic display process (step S3305).

In this manner, according to the practical example 9B, the distribution of partial erroneous answer percentages can be checked for each prediction algorithm. In an analysis using the value of the weight variable w and an explanatory variable set by the user, therefore, the user is able to visually know which prediction algorithm if used would make the distribution of partial erroneous answer percentages smaller.

A practical example 10A is an example in which for a given prediction algorithm, partial correct answer percentages are calculated for each explanatory variable and are displayed as a graph. For example, in the practical example 10A, an overall correct answer percentage is not calculated but a box-and-whisker plot of N partial correct answer percentages is displayed. In the same manner as in the practical example 7A, the value of the weight variable w and a prediction algorithm are specified in advance. In this manner, a box-and-whisker plot of N partial correct answer percentages is displayed for each explanatory variable, by which the distribution of partial correct answer percentages for each explanatory variable can be visually understood.

Figure 37:
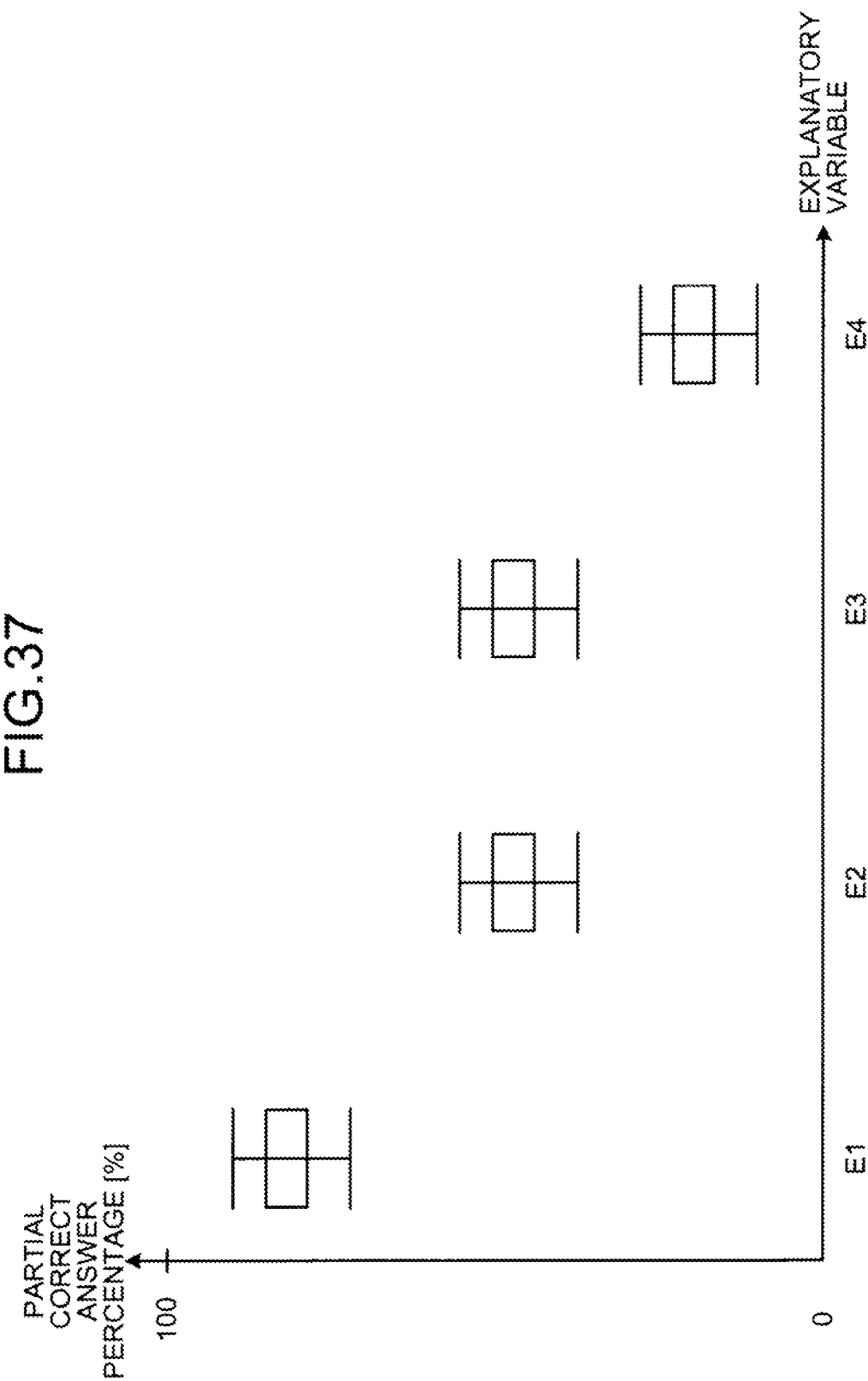
FIG. 37 is a graph indicating the distribution of partial correct answer percentages for each explanatory variable in the practical example 10A.

FIG. 37 is a graph indicating the distribution of partial correct answer percentages for each explanatory variable in the practical example 10A. In FIG. 37, the horizontal axis represents the explanatory variable, and the vertical axis represents the partial correct answer percentage. FIG. 37 is an example of graphic display in the form of a box-and-whisker plot. Display of the graph depicted in FIG. 37 enables the user to visually know which explanatory variables if adopted would make the distribution of partial correct answer percentages larger or smaller in an analysis using the value of the weight variable w and a prediction algorithm specified by the user.

Figure 38:
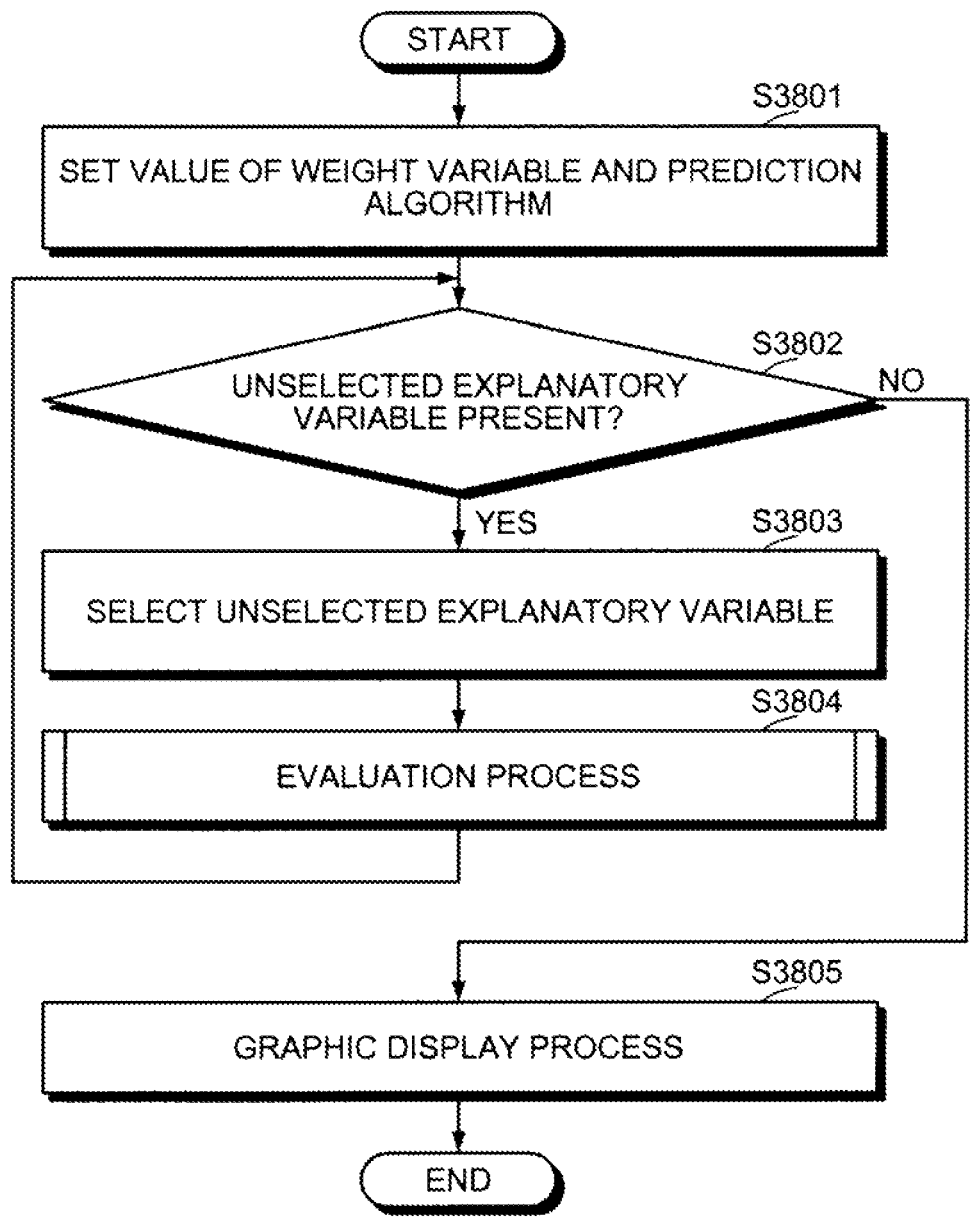
FIG. 38 is a flowchart of a data analysis procedure according to the practical example 10A.

FIG. 38 is a flowchart of a data analysis procedure according to the practical example 10A. In FIG. 38, the data analyzing apparatus sets the value of the weight variable w and a prediction algorithm according to user input via the input device (keyboard, mouse, etc.) (step S3801). The data analyzing apparatus then determines whether an unselected explanatory variable is present (step S3802). If an unselected explanatory variable is present (step S3802: YES), the data analyzing apparatus selects the unselected explanatory variable (step S3803), and executes an evaluation process (step S3804). The details of the evaluation process (step S3804) are identical to those of the evaluation process (step S3304) in FIG. 34, and description thereof is omitted.

Following the evaluation process (step S3804), the data analyzing apparatus returns to step S3802, and if an unselected explanatory variable is not present (step S3802: NO), the data analyzing apparatus carries out the process of displaying a box-and-whisker plot indicating the distribution of partial correct answer percentages obtained for each explanatory variable, as depicted in FIG. 37 (step S3805, thereby ending the data analysis procedure of the practical example 10A.

In this manner, according to the practical example 10A, the distribution of partial correct answer percentages can be checked for each explanatory variable. In an analysis using the value of the weight variable w and a prediction algorithm set by the user, therefore, the user is able to visually know which explanatory variable if used would make the distribution of partial correct answer percentages smaller.

A practical example 10B is an example in which for a given prediction algorithm, partial erroneous answer percentages are calculated for each explanatory variable and are displayed as a graph. For example, in the practical example 10B, an overall erroneous answer percentage is not calculated but a box-and-whisker plot of N partial erroneous answer percentages is displayed. In the same manner as in the practical example 7B, the value of the weight variable w and a prediction algorithm are specified in advance. In this manner, a box-and-whisker plot of N partial erroneous answer percentages is displayed for each explanatory variable, by which the distribution of partial erroneous answer percentages for each explanatory variable can be visually understood.

Figure 39:
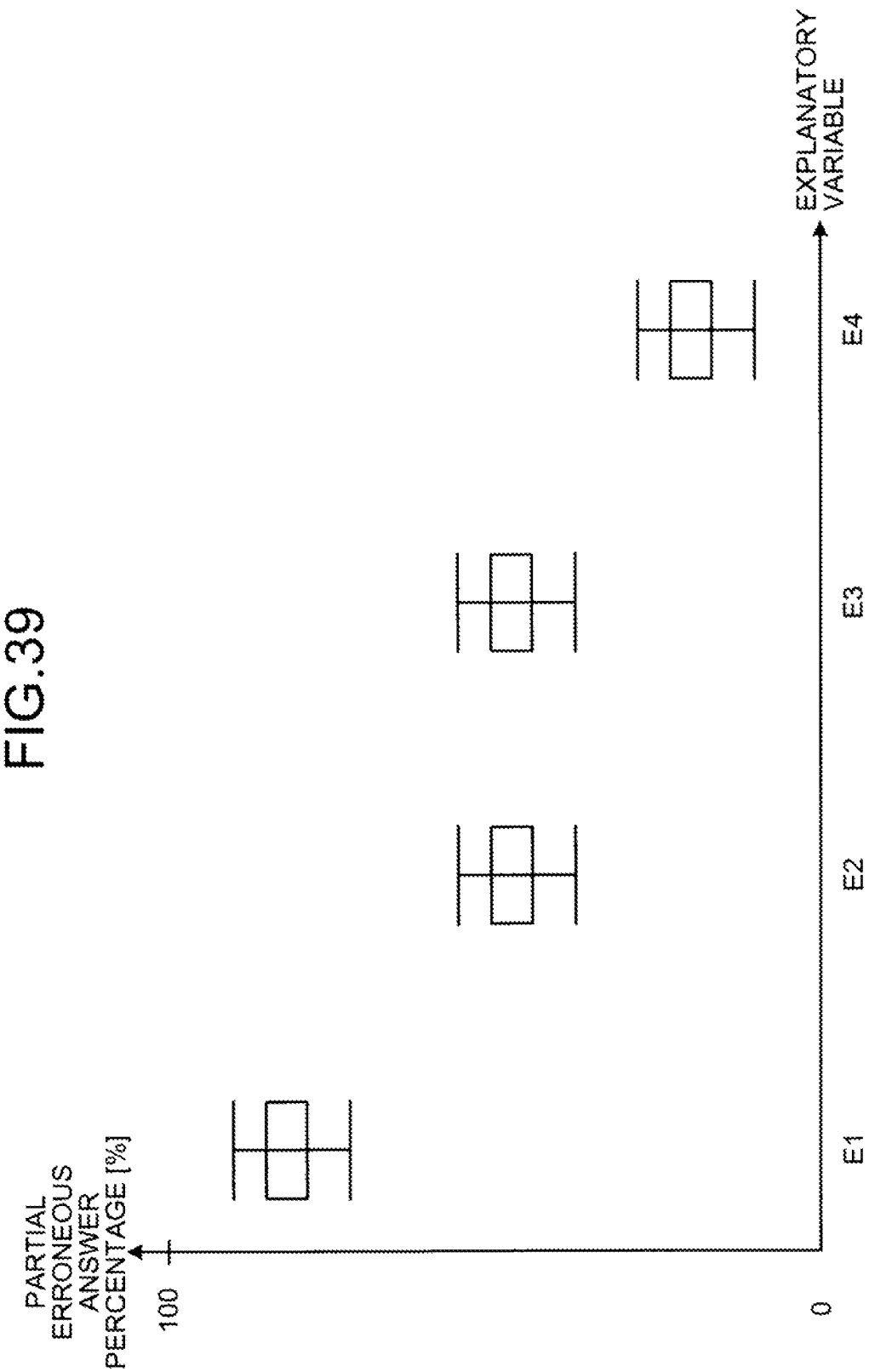
FIG. 39 is a graph indicating the distribution of partial erroneous answer percentages for each explanatory variable in the practical example 10B.

FIG. 39 is a graph indicating the distribution of partial erroneous answer percentages for each explanatory variable in the practical example 10B. In FIG. 39, the horizontal axis represents the explanatory variable, and the vertical axis represents the partial erroneous answer percentage. FIG. 39 is an example of graphic display in the form of a box-and-whisker plot. Display of the graph depicted in FIG. 39 enables the user to visually know which explanatory variables if adopted would make the distribution of partial erroneous answer percentages larger or smaller in an analysis using the value of the weight variable w and a prediction algorithm specified by the user.

A data analysis procedure according to the practical example 10B will next be described. The data analysis procedure of the practical example 10B is identical to the data analysis procedure of the practical example 10A excluding the evaluation process (S3804), and description of the data analysis procedure is omitted. In the practical example 10B, the contents of the evaluation process is different from that of the evaluation process (step S3804) of the practical example 10A, and the evaluation process (step S3304) in FIG. 36 is executed.

In this manner, according to the practical example 10B, the distribution of partial erroneous answer percentages can be checked for each explanatory variable. In an analysis using the value of the weight variable w and a prediction algorithm set by the user, therefore, the user is able to visually know which explanatory variable if used would make the distribution of partial erroneous answer percentages smaller.

A practical example 11A is an example in which for a given prediction algorithm, partial correct answer percentages are calculated for each group of remaining explanatory variables and are displayed as a graph. For example, in the practical example 11A, an overall correct answer percentage is not calculated but a box-and-whisker plot of N partial correct answer percentages is displayed. In the same manner as in the practical example 8A, the value of the weight variable w and a prediction algorithm are specified in advance. In this manner, a box-and-whisker plot of N partial correct answer percentages is displayed for each group of remaining explanatory variables, by which the distribution of partial correct answer percentages for each remaining explanatory variable group can be visually understood.

Figure 40:
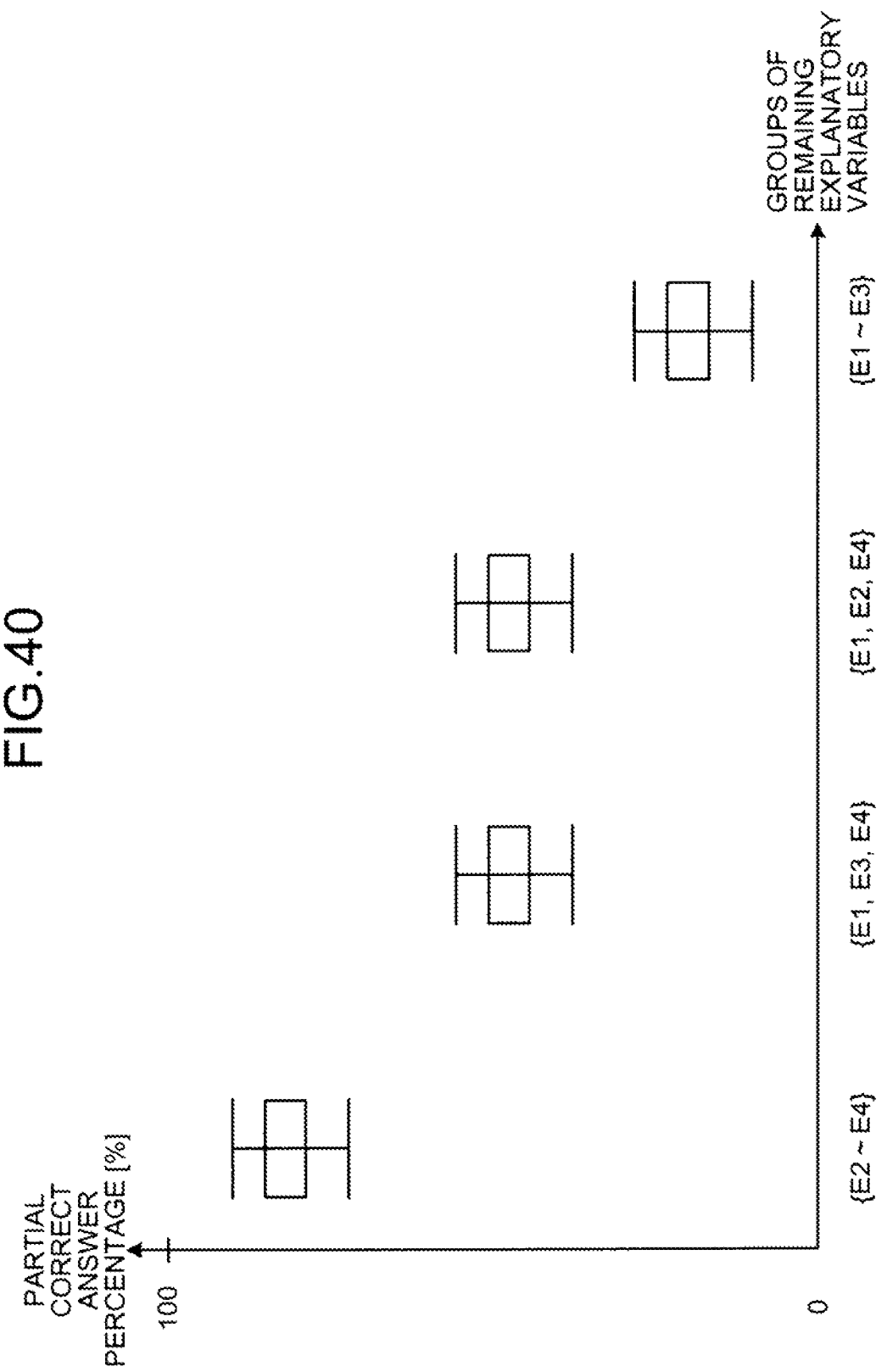
FIG. 40 is a graph indicating the distribution of partial correct answer percentages for each group of remaining explanatory variables in the practical example 11A.

FIG. 40 is a graph indicating the distribution of partial correct answer percentages for each group of remaining explanatory variables in the practical example 11A. In FIG. 40, the horizontal axis represents groups of remaining explanatory variables, and the vertical axis represents the partial correct answer percentage. FIG. 40 is an example of graphic display in the form of a box-and-whisker plot. Display of the graph depicted in FIG. 40 enables the user to visually know which explanatory variables if not adopted would make the distribution of partial correct answer percentages larger or smaller in an analysis using the value of the weight variable w and a prediction algorithm specified by the user.

Figure 41:
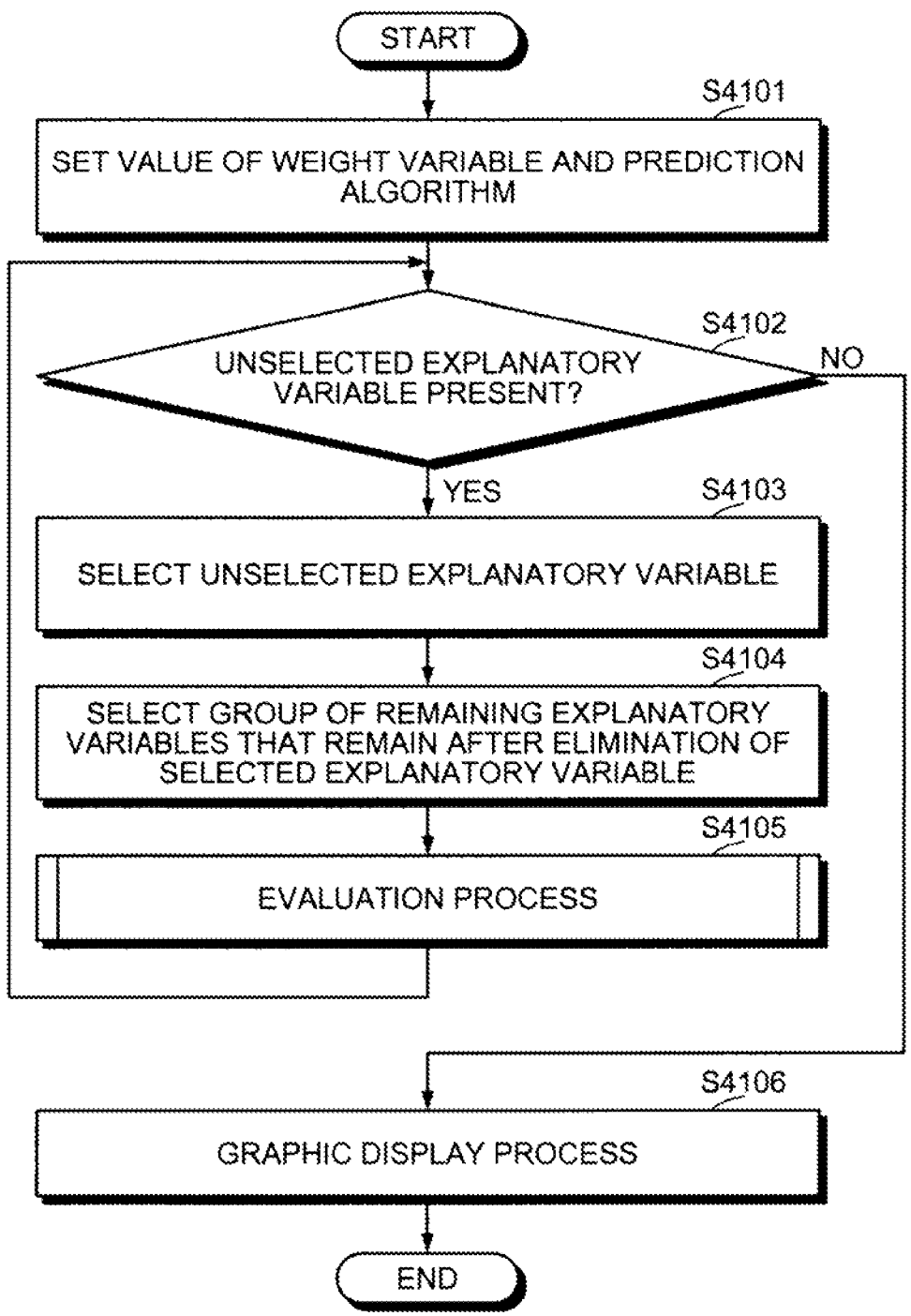
FIG. 41 is a flowchart of a data analysis procedure according to the practical example 11A.

FIG. 41 is a flowchart of a data analysis procedure according to the practical example 11A. In FIG. 41, the data analyzing apparatus sets the value of the weight variable w and a prediction algorithm according to user input via the input device (keyboard, mouse, etc.) (step S4101). The data analyzing apparatus then determines whether an unselected explanatory variable is present (step S4102). If an unselected explanatory variable is present (step S4102: YES), the data analyzing apparatus selects the unselected explanatory variable (step S4103), and selects the group of explanatory variables that remain after elimination of the selected explanatory variable (step S4104).

Subsequently, the data analyzing apparatus executes an evaluation process (step S4105). The details of the evaluation process (step S4105) are identical to those of the evaluation process (step S3304) in FIG. 34, and description thereof is omitted.

Following the evaluation process (step S4105), the data analyzing apparatus returns to step S4102, and if an unselected explanatory variable is not present (step S4102: NO), the data analyzing apparatus carries out the process of displaying a box-and-whisker plot indicating the distribution of partial correct answer percentages obtained for each group of remaining explanatory variables, as depicted in FIG. 40 (step S4106), thereby ending the data analysis procedure of the practical example 11A.

In this manner, according to the practical example 11A, the distribution of partial correct answer percentages can be checked for each group of remaining explanatory variables. In an analysis using the value of the weight variable w and a prediction algorithm set by the user, therefore, the user is able to visually know which explanatory variable if not used would make the distribution of partial correct answer percentages smaller.

A practical example 11B is an example in which for a given prediction algorithm, partial erroneous answer percentages are calculated for each group of remaining explanatory variables and are displayed as a graph. For example, in the practical example 11B, an overall erroneous answer percentage is not calculated but a box-and-whisker plot of N partial erroneous answer percentages is displayed. In the same manner as in the practical example 8B, the value of the weight variable w and a prediction algorithm are specified in advance. In this manner, a box-and-whisker plot of N partial erroneous answer percentages is displayed for each group of remaining explanatory variables, by which the distribution of partial correct answer percentages for each remaining explanatory variable group can be visually understood.

Figure 42:
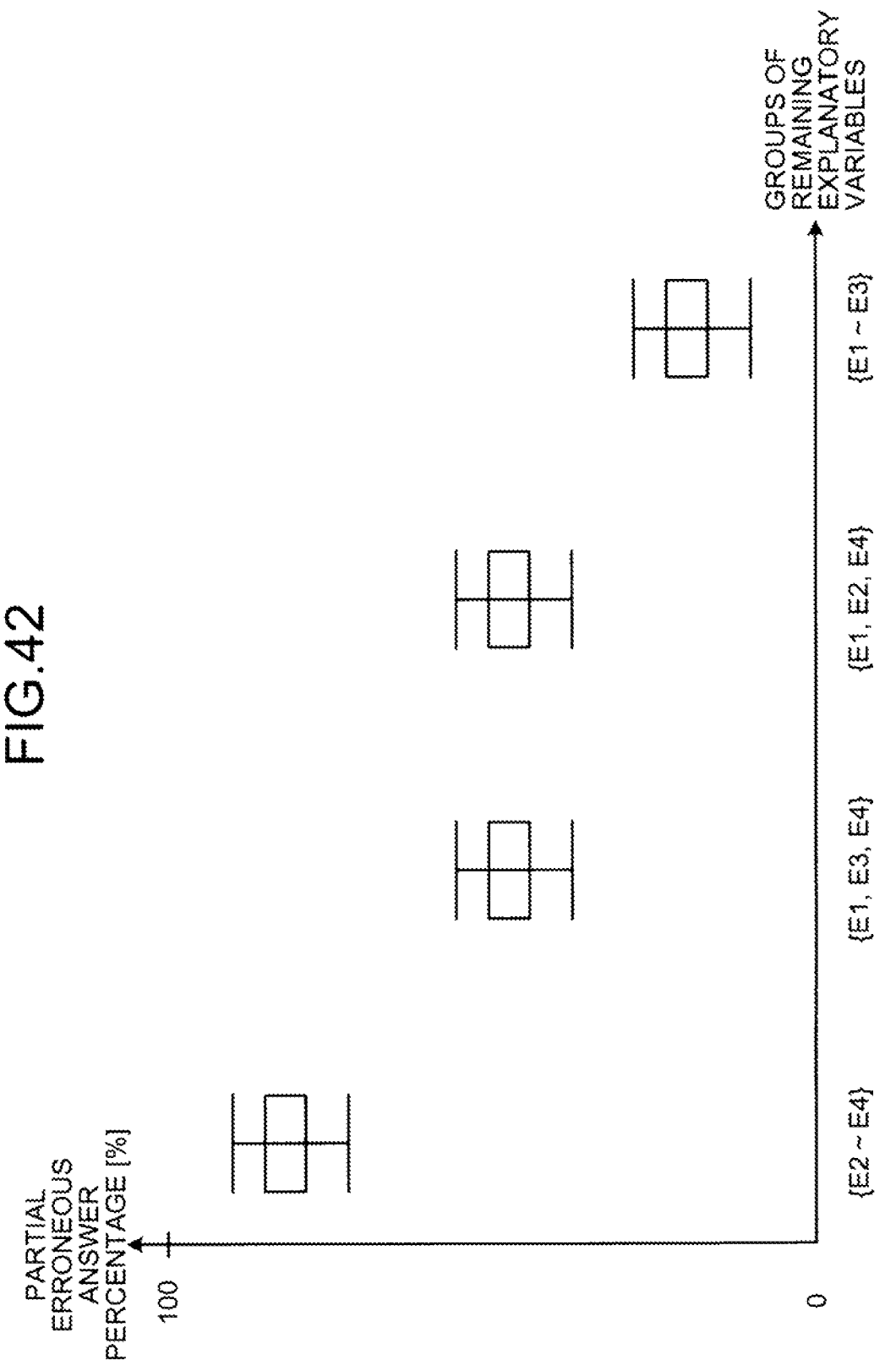
FIG. 42 is a graph indicating the distribution of partial erroneous answer percentages for each group of remaining explanatory variables in the practical example 11B.

FIG. 42 is a graph indicating the distribution of partial erroneous answer percentages for each group of remaining explanatory variables in the practical example 11B. In FIG. 42, the horizontal axis represents groups of remaining explanatory variables, and the vertical axis represents the partial erroneous answer percentage. FIG. 42 is an example of graphic display in the form of a box-and-whisker plot. Display of the graph depicted in FIG. 42 enables the user to visually know which explanatory variables if not adopted would make the distribution of partial erroneous answer percentages larger or smaller in an analysis using the value of the weight variable w and a prediction algorithm specified by the user.

A data analysis procedure according to the practical example 11B will next be described. The data analysis procedure of the practical example 11B is identical to the data analysis procedure of the practical example 11A excluding the evaluation process (S4105), and description of the data analysis procedure is omitted. In the practical example 11B, the contents of the evaluation process are different from that of the evaluation process (step S4105) of the practical example 11A, and the evaluation process (step S3304) in FIG. 36 is executed.

In this manner, according to the practical example 11B, the distribution of partial erroneous answer percentages can be checked for each group of remaining explanatory variables. In an analysis using the value of the weight variable w and a prediction algorithm set by the user, therefore, the user is able to visually know which explanatory variable if not used would make the distribution of partial erroneous answer percentages smaller.

Figure 43:
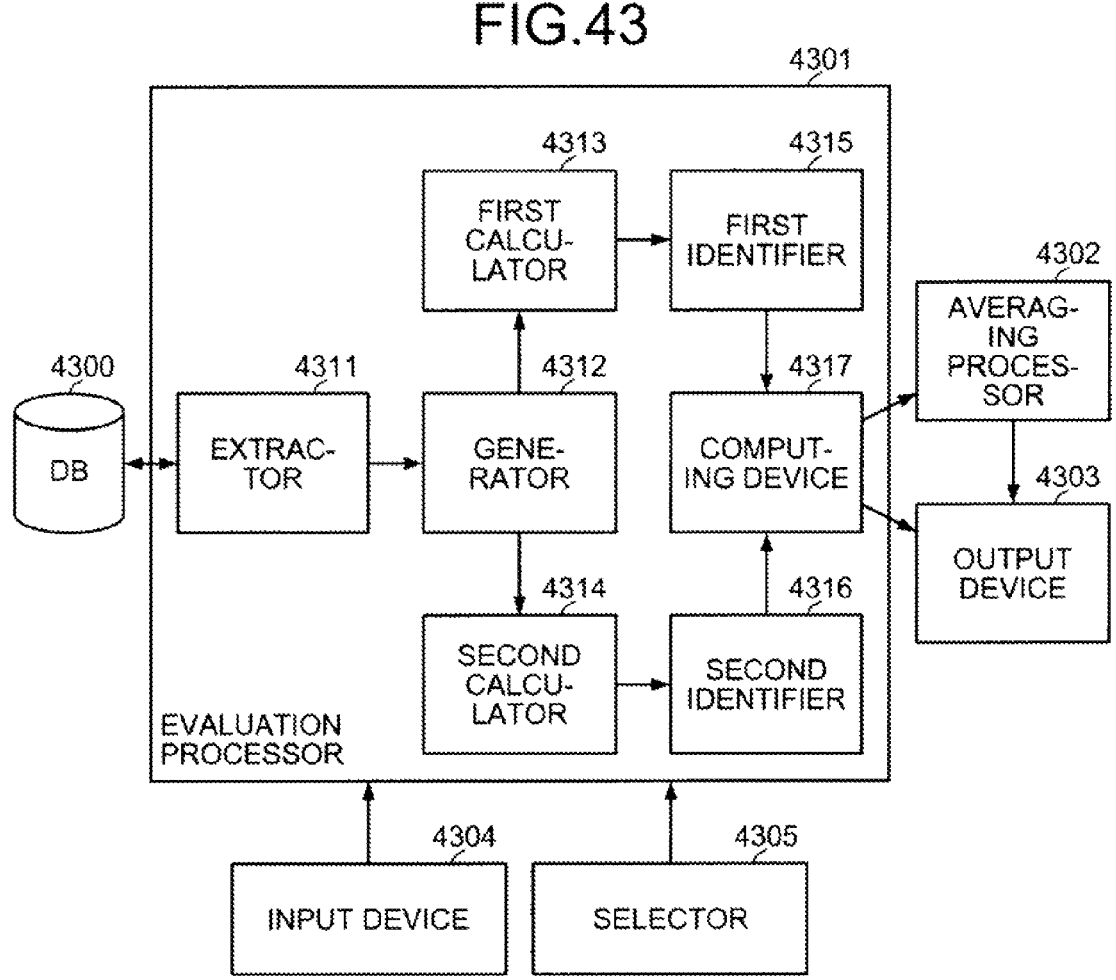
FIG. 43 is a block diagram of an example of a functional configuration of the data analyzing apparatus.

FIG. 43 is a block diagram of an example of a functional configuration of the data analyzing apparatus. The data analyzing apparatus includes a database (DB) 4300, an evaluation processor 4301, an averaging processor 4302, an output device 4303, an input device 4304, and a selector 4305. For example, functions of the evaluation processor 4301 to the selector 4305, for example, are implemented when the CPU 501 execute programs stored in the memory devices depicted in FIG. 5, such as the ROM 502, RAM 503, magnetic disk 505, and optical disk 507, or through the I/F 509. The results of processes by the evaluation processor 4301 to the selector 4305 are stored in the memory devices each time the process is carried out. When a functional unit uses the result of a process by another functional unit, the functional unit reads the process result out of the memory device and executes a process specific to the functional unit.

The DB 4300 stores various types of information. For example, for example, the DB 4300 stores the data groups depicted in FIGS. 1 and 3. The DB 4300 also stores various prediction algorithms (prediction programs). The DB 4300 is, for example, implemented by the memory devices depicted in FIG. 5, such as the ROM 502, RAM 503, magnetic disk 505, and optical disk 507.

The evaluation processor 4301 has a function that corresponds to the evaluation process depicted in FIGS. 1 to 4. The evaluation processor 4301 executes the evaluation process N (N denotes a natural number N≥1) times to produce an evaluation result (e.g., N weighted partial correct answer percentages, N weighted partial erroneous answer percentages, N partial correct answer percentages, and N partial erroneous answer percentages).

The averaging processor 4302 averages N weighted partial correct answer percentages, N weighted partial erroneous answer percentages, N partial correct answer percentages, and N partial erroneous answer percentages calculated by the evaluation processor 4301, thereby producing N weighted overall correct answer percentages, N weighted overall erroneous answer percentages, N overall correct answer percentages, and N overall erroneous answer percentages.

The output device 4303 outputs an evaluation result from the evaluation processor 4301 and an averaging result (weighted overall correct answer percentages, N weighted overall erroneous answer percentages, N overall correct answer percentages, N overall erroneous answer percentages) from the averaging processor 4302. For example, the output device 4303 displays an evaluation result and an averaging result graphically, as depicted in the practical examples 1A to 11A and 1B to 11B. Particularly, when the weight variable w is not set to a fixed value, a graph indicating variations in the weight variable w is displayed. Through such graphic display, prediction accuracy differences between prediction algorithms can be presented to the user in an understandable manner.

The input device 4304 receives input of the value of the weight variable w. For example, for example, the input device 4304 inputs the value of the weight variable w in accordance with an input operation on the input device (keyboard or louse) by the user. As a result of input of the value of the weight variable w, N partial correct answer percentages, N partial erroneous answer percentages, N overall correct answer percentages, and N overall erroneous answer percentages are obtained, and are displayed in graphs. The input device 4304 also specifies an explanatory variable and a prediction algorithm according to user operation of the input device. As a result, the evaluation processor 4301 executes the evaluation process using the specified explanatory variable or prediction algorithm.

The selector 4305 selects an unselected explanatory variable from an explanatory variable group defined by data of data groups. When the selector 4305 selects an explanatory variable, the evaluation processor 4301 executes the evaluation process on the selected explanatory variable. The selector 4305 also selects an unselected explanatory variable from an explanatory variable group and selects the group of explanatory variables that remain after elimination of the selected explanatory variable, as an explanatory variable group given to the evaluation processor 4301. As a result, the evaluation processor 4301 executes the evaluation process on the group of remaining explanatory variables.

A function of the evaluation processor 4301 will be described in detail next. The evaluation processor 4301 includes an extractor 4311, a generator 4312, a first calculator 4313, a second calculator 4314, a first identifier 4315, a second identifier 4316, and a computing device 4317.

The extractor 4311 extracts a data group from the DB 4300. For example, as depicted in FIGS. 1 to 4, the extractor 4311 randomly samples K positive case data items from a positive case data group, and in the same manner, randomly samples K negative case data items from a negative case data group.

In this manner, data items identical in number are extracted from the positive case data group and from the negative case data group. Even if positive case data and negative case data are different in number, therefore, the data items identical in number (K) are extracted. This meets a prerequisite for generating a prediction equation that positive case data and negative case data are substantially identical in number. Hence, a drop in the prediction accuracy of a generated prediction equation is prevented. While the data items identical in number (K) are randomly sampled from the positive case data group and from the negative case data group, the data to be sampled may not be identical in number. The number of data to be sampled from both data groups may be different from each other if the difference does not affect the prediction accuracy.

The generator 4312 generates a prediction equation based on a prediction algorithm. The prediction equation is, as indicated at (21) in FIGS. 2 and 4, determined using a basis-forming data group obtained by random sampling by the extractor 4311.

The first calculator 4313 gives each group of remaining positive case measured values remaining after elimination of a group of positive case measured values from a set of positive case measured values, to the prediction equation generated by the generator 4312, and thus calculates a first predicted value group. For example, as depicted in FIG. 2, the first calculator 4313 substitutes an evaluation-use positive case data group created by eliminating a basis-forming positive case data group (randomly sampled K positive case data items) from the positive case data group, into the prediction equation, and thus obtains predicted values of evaluation-use positive case data. For example, as indicated at (22) in FIG. 2, the first calculator 4313 substitutes each evaluation-use positive case data from the evaluation-use positive case data group into the prediction equation and carries out normalization, thereby obtaining the predicted values of evaluation-use positive data.

The second calculator 4314 gives each group of remaining negative case measured values remaining after elimination of a group of negative case measured values from a set of negative case measured values, to the prediction equation generated by the generator 4312, and thus calculates a second predicted value group. For example, as depicted in FIG. 4, the second calculator 4314 substitutes an evaluation-use negative case data group created by eliminating a basis-forming negative case data group (randomly sampled K negative case data items) from the negative case data group, into the prediction equation, and thus obtains predicted values of evaluation-use negative data. For example, as indicated at (22) in FIG. 4, the second calculator 4314 substitutes each evaluation-use negative case data from the evaluation-use negative case data group in the prediction equation and carries out normalization, thereby obtaining the predicted values of evaluation-use negative data.

Among predicted values making up the first predicted value group calculated by the first calculator 4313, the first identifier 4315 identifies a first count of coincidence cases of predicted values coinciding with positive case measured values originally substituted into the prediction equation and a first count of non-coincidence cases of predicted values not coinciding with the positive case measured values. For example, as depicted in FIGS. 2 and 4, the first identifier 4315 identifies the number of positive/positive cases (first count of coincidence cases) and the number of positive/negative cases (first count of non-coincidence cases).

Among predicted values making up the second predicted value group calculated by the second calculator 4314, the second identifier 4316 identifies a second count of coincidence cases of predicted values coinciding with negative case measured values originally substituted into the prediction equation and the second count of non-coincidence cases of predicted values not coinciding with the negative case measured values. For example, as depicted in FIGS. 2 and 4, the second identifier 4316 identifies the number of negative/negative cases (second count of coincidence cases) and the number of negative/positive cases (second sound of non-coincidence cases).

The computing device 4317 computes a weighted correct answer percentage, which is a correct answer percentage indicative of the degree of coincidence between a measured value and a predicted value for a prediction algorithm and varying depending on a weight variable, based on the result of identification by the first and second identifiers 4315 and 4316. When computing a weighted partial correct answer percentage, the computing device 4317 computes the weighted partial correct answer percentage PCAw using equation (1). When the value of the weight variable w is specified, the value of the weight variable w is substituted into equation (1).

When computing a weighted partial erroneous answer percentage, the computing device 4317 computes the weighted partial erroneous answer percentage PWAw using equation (2). When the value of the weight variable w is specified, the value of the weight variable w is substituted into equation (2).

In this manner, the evaluation processor 4301 is able to compute any one among a weighted partial correct answer percentage, a partial correct answer percentage, a weighted partial erroneous answer percentage, and a partial erroneous answer percentage for one round of random sampling by the extractor 4311.

When a box-and-whisker plot is displayed, the computing device 4317 calculates the elements of the box-and-whisker plot from N partial correct answer percentages, as depicted in the practical examples 9A to 11A. This enables the output device 4303 to display the box-and-whisker plot. In the same manner, when a box-and-whisker plot is displayed, the computing device 4317 calculates the elements of the box-and-whisker plot from N partial erroneous answer percentages, as depicted in the practical examples 9B to 11B. This enables the output device 4303 to display the box-and-whisker plot.

As described above, according to this embodiment, even if the number of data for each value of an objective variable varies significantly (which means that the number of positive case data is significantly different from the number of negative case data), the same number of data items are sampled for each value of the objective variable, and a prediction equation that predicts the objective variable based on an explanatory variable is created. Hence, a prediction equation with better accuracy is created.

Data items sampled for a basis-forming data group for creating the prediction equation are different from data items sampled for an evaluation-use data group for evaluating the prediction equation. This enables proper evaluation of the prediction accuracy of the prediction equation. If the prediction equation is evaluated using the same data as data from which the prediction equation is originally generated, a prediction given by the prediction equation depends on the original data, which is meaningless. Generation and evaluation of the prediction equation using different data for the generation and evaluation, therefore, enables proper evaluation of the prediction equation.

Extraction of a basis-forming data group by each random sampling means that an evaluation-use data group not extracted by each random sampling turns out a different data group at each random sampling. In this manner, random sampling is carried out multiple times, and the prediction equation is evaluated differently at each random sampling. Hence, the distribution of the prediction accuracy of the prediction equation can be evaluated properly.

For example, the distribution of the prediction accuracy of the prediction equation can be evaluated properly to know when the same explanatory variable is adopted, which prediction algorithm exhibits deviation of its prediction accuracy, which explanatory variable if adopted would make the prediction accuracy of the prediction algorithm deviate, and which explanatory variable if not adopted would make the prediction accuracy of the prediction algorithm deviate.

According to this embodiment, the degree of the relationship between an explanatory variable and an objective variable is not evaluated based on the coefficients of a multi-explanatory-variable regression equation, but the prediction accuracy of a prediction equation is evaluated by creating the prediction equation by using each explanatory variable or by not using each explanatory variable (e.g., using a group of remaining explanatory variables). As a result, when data for explanatory variables and the objective variable tend to be complicated, an analysis of which explanatory variable is related to the objective variable can be performed properly, using a proper prediction algorithm other than the multi-explanatory-variable regression analysis (e.g., support vector machine, decision tree, etc.)

When the number of data of positive cases ("normal" in a failure analysis, "purchased" in a recommendation analysis, "repaid" in a data analysis related to financial credit assessment) is high, the user may desire to acquire an analysis result that emphasizes negative cases.

Likewise, when the number of data of negative cases ("failure" in the failure analysis, "not purchased" in the recommendation analysis, "not repaid" in the data analysis related to financial credit assessment) is high, the user may desire to acquire an analysis result that emphasizes positive cases.

In this manner, the positive cases and negative cases that are to be emphasized depends on what the user desires. Thus, a weighted overall correct answer percentage and a weighted overall erroneous answer percentage, for which the weight variable w varies, are displayed so that "what degree of a weight is given to make the accuracy (correct answer percentage and erroneous answer percentage) of the prediction algorithm better" is presented in an understandable manner. Hence, a data analysis result handy to the user is provided.

The user specifies the value of the weight variable w, whereby overall correct answer percentages and overall erroneous answer percentages weighted with the value of the weight variable w are displayed in graphs and the distribution of partial correct answer percentages and partial erroneous answer percentages is displayed in graphs (in the form of, for example, a box-and-whisker plot). As a result, "which prediction algorithm offers better accuracy (correct answer percentage and erroneous answer percentage)" can be presented in an understandable manner, reflecting conditions the user desires to be emphasized.

In this embodiment, the circuit failure analysis, recommendation analysis, and data analysis related to financial credit assessment are described using practical examples. The embodiment applies not only to these data analyses but also to data analyses on the performance of various apparatuses and to data analyses on various products or services.

In this embodiment, K data items are sampled from the positive case data group and from the negative case data group. K represents a value that is than the number of data items in the group having fewer data items among the positive case data group and the negative case data group. It is preferable that at each round of random sampling, the sampled data be different from previously sampled data. For this reason, K may be determined to be ⅔ or less or, preferably, ½ or less of the number of data in the group having fewer data items among the positive case data group and the negative case data group.

The data analyzing method described in the present embodiment may be implemented by executing a program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

According to one aspect of the present invention, improved prediction accuracy of data analysis is effected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing therein a data analyzing program that causes a computer, which has a memory device storing a set of measured values that include a set of positive case measured values for which an objective variable for an explanatory variable group of one or more explanatory variables represents a positive case and a set of negative case measured values for which the objective variable for the explanatory variable group represents a negative case, to execute a process, the process comprising:

extracting randomly, a positive case measured value group and a negative case measured value group from the set of measured values such that the positive case measured values and the negative case measured values extracted are equivalent in number;

generating based on the positive case measured value group and the negative case measured value group extracted at the extracting, a prediction equation that predicts the objective variable for a prediction algorithm;

first calculating a first predicted value group by substituting into the prediction equation generated at the generating, each remaining positive case measured value group that remains after elimination of the positive case measured value group from the set of positive case measured values;

second calculating a second predicted value group by substituting into the prediction equation generated at the generating, each remaining negative case measured value group that remains after elimination of the negative case measured value group from the set of negative case measured values;

first identifying among the first predicted value group calculated at the first calculating, a first coincident-case count of predicted values that coincide with the positive case measured values originally substituted into the prediction equation and a first non-coincident-case count of predicted values that do not coincide with the positive case measured values;

second identifying among the second predicted value group calculated at the second calculating, a second coincident-case count of predicted values that coincide with the negative case measured values originally substituted into the prediction equation and a second non-coincident-case count of predicted values that do not coincide with the negative case measured values;

computing based on identification results obtained at the first and the second identifying, a weighted correct answer percentage that is a correct answer percentage indicative of the degree of coincidence between a measured value and a predicted value for the prediction algorithm and varying depending on a weight variable; and outputting a computation result obtained at the computing.

2. The non-transitory computer-readable medium according to claim 1, the process further comprising:

executing a plurality of cycles of the extracting, the generating, the first calculating, the second calculating, the first identifying, the second identifying, and the computing; and averaging a plurality of the weighted correct answer percentages computed at the computing to output a weighted average correct answer percentage that is a correct answer percentage indicative of the degree of coincidence between a measured value and a predicted value for the prediction algorithm and varying depending on the weight variable.

3. The non-transitory computer-readable medium according to claim 1, the process further comprising:

executing for each prediction algorithm, a plurality of cycles of the extracting, the generating, the first calculating, the second calculating, the first identifying, the second identifying, and the computing; and averaging for each prediction algorithm, a plurality of the weighted correct answer percentages computed for each prediction algorithm at the computing to output a weighted average correct answer percentage that is a correct answer percentage indicative of the degree of coincidence between a measured value and a predicted value for the prediction algorithm and varying depending on the weight variable, wherein the outputting includes displaying in a graph, the weighted average correct answer percentage for each prediction algorithm.

4. The non-transitory computer-readable medium according to claim 1, the process further comprising:

selecting an unselected explanatory variable from the explanatory variable group;

executing for each explanatory variable selected at the selecting, a plurality of cycles of the extracting, the generating, the first calculating, the second calculating, the first identifying, the second identifying, and the computing; and averaging for each of the explanatory variables, a plurality of the weighted correct answer percentages computed for each of the explanatory variables at the computing to output a weighted average correct answer percentage that is a correct answer percentage indicative of the degree of coincidence between a measured value and a predicted value for the prediction algorithm and varying depending on the weight variable, wherein the outputting includes displaying in a graph, the weighted average correct answer percentage for each of the explanatory variables.

5. The non-transitory computer-readable medium according to claim 1, the process further comprising:

selecting an unselected explanatory variable from the explanatory variable group;

executing for each remaining explanatory variable group not selected at the selecting, a plurality of cycles of the extracting, the generating, the first calculating, the second calculating, the first identifying, the second identifying, and the computing; and averaging for each of the remaining explanatory variable groups, a plurality of the weighted correct answer percentages computed for each of the remaining explanatory variable groups at the computing to output a weighted average correct answer percentage that is a correct answer percentage indicative of the degree of coincidence between a measured value and a predicted value for the prediction algorithm and varying depending on the weight variable, wherein the outputting includes displaying in a graph, the weighted average correct answer percentage for each of the remaining explanatory variable groups.

6. A non-transitory computer-readable medium storing therein a data analyzing program that causes a computer, which has a memory device storing a set of measured values that include a set of positive case measured values for which an objective variable for an explanatory variable group of one or more explanatory variables represents a positive case and a set of negative case measured values for which the objective variable for the explanatory variable group represents a negative case, to execute a process, the process comprising:

extracting randomly, a positive case measured value group and a negative case measured value group from the set of measured values such that the positive case measured values and the negative case measured values extracted are equivalent in number generating based on the positive case measured value group and the negative case measured value group extracted at the extracting, a prediction equation that predicts the objective variable for a prediction algorithm;

first calculating a first predicted value group by substituting into the prediction equation generated at the generating, each remaining positive case measured value group remaining after elimination of the positive case measured value group from the set of positive case measured values;

second calculating a second predicted value group by substituting into the prediction equation generated at the generating, each remaining negative case measured value group remaining after elimination of the negative case measured value group from the set of negative case measured values;

first identifying among the first predicted value group calculated at the first calculating, a first coincident-case count of predicted values that coincide with the positive case measured values originally substituted into the prediction equation and a first non-coincident-case count of predicted values that do not coincide with the positive case measured values;

second identifying among the second predicted value group calculated at the second calculating, a second coincident-case count of predicted values that coincide with the negative case measured values originally substituted into the prediction equation and a second non-coincident-case count of predicted values that do not coincide with the negative case measured values;

computing based on identification results obtained at the first and the second identifying, a weighted erroneous answer percentage that is an erroneous answer percentage indicative of the degree of non-coincidence between a measured value and a predicted value for the prediction algorithm and varying depending on a weight variable; and outputting a computation result obtained at the computing.

7. A data analyzing method executed by a computer, which has a memory device storing a set of measured values that include a set of positive case measured values for which an objective variable for an explanatory variable group of one or more explanatory variables represents a positive case and a set of negative case measured values for which the objective variable for the explanatory variable group represents a negative case, the data analyzing method comprising:

extracting randomly, a positive case measured value group and a negative case measured value group from the set of measured values such that the positive case measured values and the negative case measured values extracted are equivalent in number;

generating based on the positive case measured value group and the negative case measured value group extracted at the extracting, a prediction equation that predicts the objective variable for a prediction algorithm;

first calculating a first predicted value group by substituting into the prediction equation generated at the generating, each remaining positive case measured value group that remains after elimination of the positive case measured value group from the set of positive case measured values;

second calculating a second predicted value group by substituting into the prediction equation generated at the generating, each remaining negative case measured value group that remains after elimination of the negative case measured value group from the set of negative case measured values;

first identifying among the first predicted value group calculated at the first calculating, a first coincident-case count of predicted values that coincide with the positive case measured values originally substituted into the prediction equation and a first non-coincident-case count of predicted values that do not coincide with the positive case measured values;

second identifying among the second predicted value group calculated at the second calculating, a second coincident-case count of predicted values that coincide with the negative case measured values originally substituted into the prediction equation and a second non-coincident-case count of predicted values that do not coincide with the negative case measured values;

computing based on identification results obtained at the first and the second identifying, a weighted correct answer percentage that is a correct answer percentage indicative of the degree of coincidence between a measured value and a predicted value for the prediction algorithm and varying depending on a weight variable; and outputting a computation result obtained at the computing.

8. The data analyzing method according to claim 7 and further comprising:

executing a plurality of cycles of the extracting, the generating, the first calculating, the second calculating, the first identifying, the second identifying, and the computing; and averaging a plurality of the weighted correct answer percentages computed at the computing to output a weighted average correct answer percentage that is a correct answer percentage indicative of the degree of coincidence between a measured value and a predicted value for the prediction algorithm and varying depending on the weight variable.

9. The data analyzing method according to claim 7 and further comprising:

executing for each prediction algorithm, a plurality of cycles of the extracting, the generating, the first calculating, the second calculating, the first identifying, the second identifying, and the computing; and averaging for each prediction algorithm, a plurality of the weighted correct answer percentages computed for each prediction algorithm at the computing to output a weighted average correct answer percentage that is a correct answer percentage indicative of the degree of coincidence between a measured value and a predicted value for the prediction algorithm and varying depending on the weight variable, wherein the outputting includes displaying in a graph, the weighted average correct answer percentage for each prediction algorithm.

10. The data analyzing method according to claim 7 and further comprising:

selecting an unselected explanatory variable from the explanatory variable group;

executing for each explanatory variable selected at the selecting, a plurality of cycles of the extracting, the generating, the first calculating, the second calculating, the first identifying, the second identifying, and the computing; and averaging for each of the explanatory variables, a plurality of the weighted correct answer percentages computed for each of the explanatory variables at the computing to output a weighted average correct answer percentage that is a correct answer percentage indicative of the degree of coincidence between a measured value and a predicted value for the prediction algorithm and varying depending on the weight variable, wherein the outputting includes displaying in a graph, the weighted average correct answer percentage for each of the explanatory variables.

11. The data analyzing method according to claim 7 and further comprising:

selecting an unselected explanatory variable from the explanatory variable group;

executing for each remaining explanatory variable group not selected at the selecting, a plurality of cycles of the extracting, the generating, the first calculating, the second calculating, the first identifying, the second identifying, and the computing; and averaging for each of the remaining explanatory variable groups, a plurality of the weighted correct answer percentages computed for each of the remaining explanatory variable groups at the computing to output a weighted average correct answer percentage that is a correct answer percentage indicative of the degree of coincidence between a measured value and a predicted value for the prediction algorithm and varying depending on the weight variable, wherein the outputting includes displaying in a graph, the weighted average correct answer percentage for each of the remaining explanatory variable groups.

12. A data analyzing apparatus comprising:

a memory device storing a set of measured values that include a set of positive case measured values for which an objective variable for an explanatory variable group of one or more explanatory variables represents a positive case and a set of negative case measured values for which the objective variable for the explanatory variable group represents a negative case;

an extractor that randomly extracts a positive case measured value group and a negative case measured value group from the set of measured values such that the positive case measured values and the negative case measured values extracted are equivalent in number;

a generator that based on the positive case measured value group and the negative case measured value group extracted by the extractor, generates a prediction equation that predicts the objective variable for a prediction algorithm;

a first calculator that calculates a first predicted value group by substituting into the prediction equation generated by the generator, each remaining positive case measured value group that remains after elimination of the positive case measured value group from the set of positive case measured values;

a second calculator that calculates a second predicted value group by substituting into the prediction equation generated by the generator, each remaining negative case measured value group that remains after elimination of the negative case measured value group from the set of negative case measured values;

a first identifier that identifies among the first predicted value group calculated by the first calculator, a first coincident-case count of predicted values that coincide with the positive case measured values originally substituted into the prediction equation and a first non-coincident-case count of predicted values that do not coincide with the positive case measured values;

a second identifier that among the second predicted value group calculated by the second calculator, identifies a second coincident-case count of predicted values that coincide with the negative case measured values originally substituted into the prediction equation and a second non-coincident-case count of predicted values that do not coincide with the negative case measured values;

a computing device that based on identification results obtained by the first and the second identifiers, computes a weighted correct answer percentage that is a correct answer percentage indicative of the degree of coincidence between a measured value and a predicted value for the prediction algorithm and varying depending on a weight variable; and an output unit that outputs a computation result obtained by the computing device.

13. The data analyzing apparatus according to claim 12, wherein the extractor, the generator, the first calculator, the second calculator, the first identifier, the second identifier, and the computing device respectively execute a plurality of processing cycles, and a plurality of the weighted correct answer percentages computed by the computing device are averaged to output a weighted average correct answer percentage that is a correct answer percentage indicative of the degree of coincidence between a measured value and a predicted value for the prediction algorithm and varying depending on the weight variable.

14. The data analyzing apparatus according to claim 12, wherein for each prediction algorithm, the extractor, the generator, the first calculator, the second calculator, the first identifier, the second identifier, and the computing device respectively execute a plurality of processing cycles, for each prediction algorithm, a plurality of the weighted correct answer percentages computed for each prediction algorithm by the computing device are averaged to output a weighted average correct answer percentage that is a correct answer percentage indicative of the degree of coincidence between a measured value and a predicted value for the prediction algorithm and varying depending on the weight variable, and the output unit displays in a graph, the weighted average correct answer percentage for each prediction algorithm.

15. The data analyzing apparatus according to claim 12 and further comprising a selector that selects an unselected explanatory variable from the explanatory variable group, wherein the extractor, the generator, the first calculator, the second calculator, the first identifier, the second identifier, and the computing device respectively execute a plurality of processing cycles, for each explanatory variable selected by the selector, for each of the explanatory variables, a plurality of the weighted correct answer percentages computed for each of the explanatory variables by the computing device are averaged to output a weighted average correct answer percentage that is a correct answer percentage indicative of the degree of coincidence between a measured value and a predicted value for the prediction algorithm and varying depending on the weight variable, and the output unit displays in a graph, the weighted average correct answer percentage for each of the explanatory variables.

16. The data analyzing apparatus according to claim 12 and further comprising a selector that selects an unselected explanatory variable from the explanatory variable group, wherein the generator, the first calculator, the second calculator, the first identifier, the second identifier, and the computing device respectively execute a plurality of processing cycles, for each remaining explanatory variable group not selected by the selector, for each of the remaining explanatory variable groups, a plurality of the weighted correct answer percentages computed for each of the remaining explanatory variable groups by the computing device are averaged to output a weighted average correct answer percentage that is a correct answer percentage indicative of the degree of coincidence between a measured value and a predicted value for the prediction algorithm and varying depending on the weight variable, and the output unit displays in a graph, the weighted average correct answer percentage for each of the remaining explanatory variable groups.

* * * * *